(12) United States Patent
Lee et al.

(10) Patent No.: US 9,918,240 B2
(45) Date of Patent: Mar. 13, 2018

(54) WIRELESS COMMUNICATION USING MULTI-DIMENSIONAL ANTENNA CONFIGURATION

(71) Applicant: INTERDIGITAL PATENT HOLDINGS, INC., Wilmington, DE (US)

(72) Inventors: Moon-il Lee, Farmingdale, NY (US); Allan Y. Tsai, Boonton, NJ (US); Shahrokh Nayeb Nazar, Montreal (CA); Changsoo Koo, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/039,669

(22) Filed: Sep. 27, 2013

(65) Prior Publication Data
US 2014/0098689 A1 Apr. 10, 2014

Related U.S. Application Data

(60) Provisional application No. 61/707,706, filed on Sep. 28, 2012.

(51) Int. Cl.
*H04W 24/08* (2009.01)
*H04B 7/04* (2017.01)
*H04B 7/06* (2006.01)

(52) U.S. Cl.
CPC .......... *H04W 24/08* (2013.01); *H04B 7/0469* (2013.01); *H04B 7/0626* (2013.01); *H04B 7/0639* (2013.01)

(58) Field of Classification Search
CPC .. H04B 7/0469; H04B 7/0639; H04B 7/0626; H04B 7/0632; H04B 7/041;
(Continued)

(56) References Cited

U.S. PATENT DOCUMENTS

2011/0216846 A1* 9/2011 Lee et al. .................. 375/295
2012/0069887 A1* 3/2012 Park ..................... H04B 7/0417
375/224
(Continued)

FOREIGN PATENT DOCUMENTS

CN 101867461 A1 10/2010
JP 2011-234265 A 11/2011
(Continued)

OTHER PUBLICATIONS

Alcatel-Lucent Shanghai Bell et al: "Considerations on CSI feedback enhancements for high-priority antenna configurations", 3GPP Draft; R1-112420; vol. RAN WG1, no. Athens, Greece; Aug. 22, 2011, Aug. 18, 2011 (Aug. 18, 2011), XR050537814, [retrieved on Aug. 18, 2011].*
(Continued)

*Primary Examiner* — Ian N Moore
*Assistant Examiner* — Brian T Le
(74) *Attorney, Agent, or Firm* — Condo Roccia Koptiw LLP

(57) ABSTRACT

Communications may be performed in a communications system using multi-dimensional antenna configurations. A WTRU may receive communications from a base station via one or more channels. The communications may be performed using multiple component codebooks. The WTRU may send channel state information (CSI) feedback for each component codebook to the base station for consideration when performing communications with the WTRU. The WTRU may determine the CSI feedback for each component codebook based on channel measurements. The component codebooks may include a horizontal component codebook and/or a vertical component codebook. The WTRU may send the CSI feedback for each component codebook to the base station independently or in the form of
(Continued)

a composite codebook. The WTRU may determine a composite codebook a function of the component codebooks.

18 Claims, 29 Drawing Sheets

(58) Field of Classification Search
CPC .. H04B 7/0456; H04B 7/0617; H04B 7/0478; H04B 7/063; H04B 7/024; H04B 7/0634; H04B 7/0486; H04B 7/0482; H04B 17/24; H04W 24/08; H04L 25/03898; H04L 25/03343; H04L 25/0204; H04L 1/0026; H04L 1/202; H04L 5/03426
See application file for complete search history.

(56) References Cited

U.S. PATENT DOCUMENTS

| | | | |
|---|---|---|---|
| 2013/0148515 A1* | 6/2013 | Ribeiro | H04L 5/0094 370/252 |
| 2013/0195035 A1 | 8/2013 | Taoka et al. | |
| 2013/0308715 A1* | 11/2013 | Nam et al. | 375/267 |
| 2014/0226742 A1 | 8/2014 | Yu et al. | |

FOREIGN PATENT DOCUMENTS

| | | |
|---|---|---|
| WO | WO 2010/079748 A1 | 7/2010 |
| WO | WO 2011/098670 A1 | 8/2011 |
| WO | WO 2011/111975 A2 | 9/2011 |
| WO | WO 2013/024351 A1 | 2/2013 |
| WO | WO 2014/046485 A1 | 3/2014 |

OTHER PUBLICATIONS

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.

3rd Generation Partnership Project (3GPP), TS 36.212 V10.1.0, "Technical Specification Group Radio Access Network, Evolved Universal Terrestrial Radio Access (E-UTRA), Multiplexing and Channel Coding (Release 10)", Mar. 2011, pp. 1-76.

3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Mar. 2011, pp. 1-115.

3rd Generation Partnership Project (3GPP), TS 36.214 V10.1.0, "Technical Specification Group Radio Access Network, Evolved Universal Terrestrial Radio Access (E-UTRA), Physical Layer, Measurements (Release 10)", Mar. 2011, pp. 1-13.

3rd Generation Partnership Project(3GPP), TS 36.321 V10.4.0, "Technical Specification Group Radio Access Network, Evolved Universal Terrestrial Radio Access (E-UTRA), Medium Access Control (MAC) Protocol Specification (Release 10)", Dec. 2011, pp. 1-54.

3rd Generation Partnership Project(3GPP), TS 36.331 V10.4.0, "Technical Specification Group Radio Access Network, Evolved Universal Terrestrial Radio Access (E-UTRA), Radio Resource Control (RRC), Protocol Specification (Release 10)", Dec. 2011, pp. 1-296.

* cited by examiner

WIRELESS COMMUNICATION USING MULTI-DIMENSIONAL ANTENNA CONFIGURATION

CROSS REFERENCE TO RELATED APPLICATIONS

This application claims the benefit of U.S. Provisional Patent Application No. 61/707,706, filed on Sep. 28, 2012 the contents of which are hereby incorporated by reference herein.

BACKGROUND

Communications may be performed in a wireless communications system using multiple antennas. Multiple antennas may be implemented at a transmitting device and/or a receiving device in a wireless communications system. The use of multiple antennas at the transmitting device and the receiving device may be referred to as multiple-input-multiple-output (MIMO). The multi-antenna communications may be performed using a multi-dimensional antenna configuration. The use of multiple antennas at a transmitting device and/or a receiving device may increase performance in the wireless communications system.

While a multi-dimensional antenna configuration may be implemented for performing wireless communications, the multi-antenna communications are performed based on one-dimensional techniques for performing wireless communications. For example, a one-dimensional codebook structure, feedback scheme, and reference signal (RS) structure may be implemented for multi-antenna communications. These one-dimensional techniques may not provide desired performance for multi-dimensional antenna configurations.

SUMMARY

Systems, methods, and apparatuses are disclosed for performing communications using multi-dimensional antenna configurations. A WTRU may receive communications from a base station via one or more channels. The WTRU may measure the channels to determine channel state information (CSI) for the channels. For example, the WTRU may measure CSI reference signals (CSI-RS) to determine the CSI. The WTRU may determine CSI feedback for being sent to the base station. The CSI feedback may be based on the measurements performed on channels. The WTRU may send the CSI feedback to a base station for consideration by the base station in performing communications with the WTRU.

The communications from the base station may be performed using multiple component codebooks. The WTRU may determine the CSI feedback for each component codebook based on the channel measurements. The CSI feedback may be determined by measuring a CSI-RS associated with each component codebook. The component codebooks may include a horizontal component codebook and/or a vertical component codebook. When the component codebooks include a horizontal component codebook and a vertical component codebook, the WTRU may measure a CSI-RS associated with the horizontal component codebook and a CSI-RS associated with the vertical component codebook.

The WTRU may send the CSI feedback to the base station using one or more communications. The WTRU may send the CSI feedback for each component codebook to the base station independently. The CSI feedback may include a precoder matrix index (PMI) for each component codebook. The PMI for each component codebook may be sent to the base station together or separately. The WTRU may determine a composite codebook that is created as a function of the component codebooks and may send the composite codebook to the base station. The composite codebook may be created as a function of the horizontal and/or vertical codebooks. The composite codebook may also be created as a function of the horizontal and/or vertical polarization. The feedback for the composite codebook may include a rate indicator (RI) and/or a channel quality indicator (CQI).

DETAILED DESCRIPTION

Figure 1A:
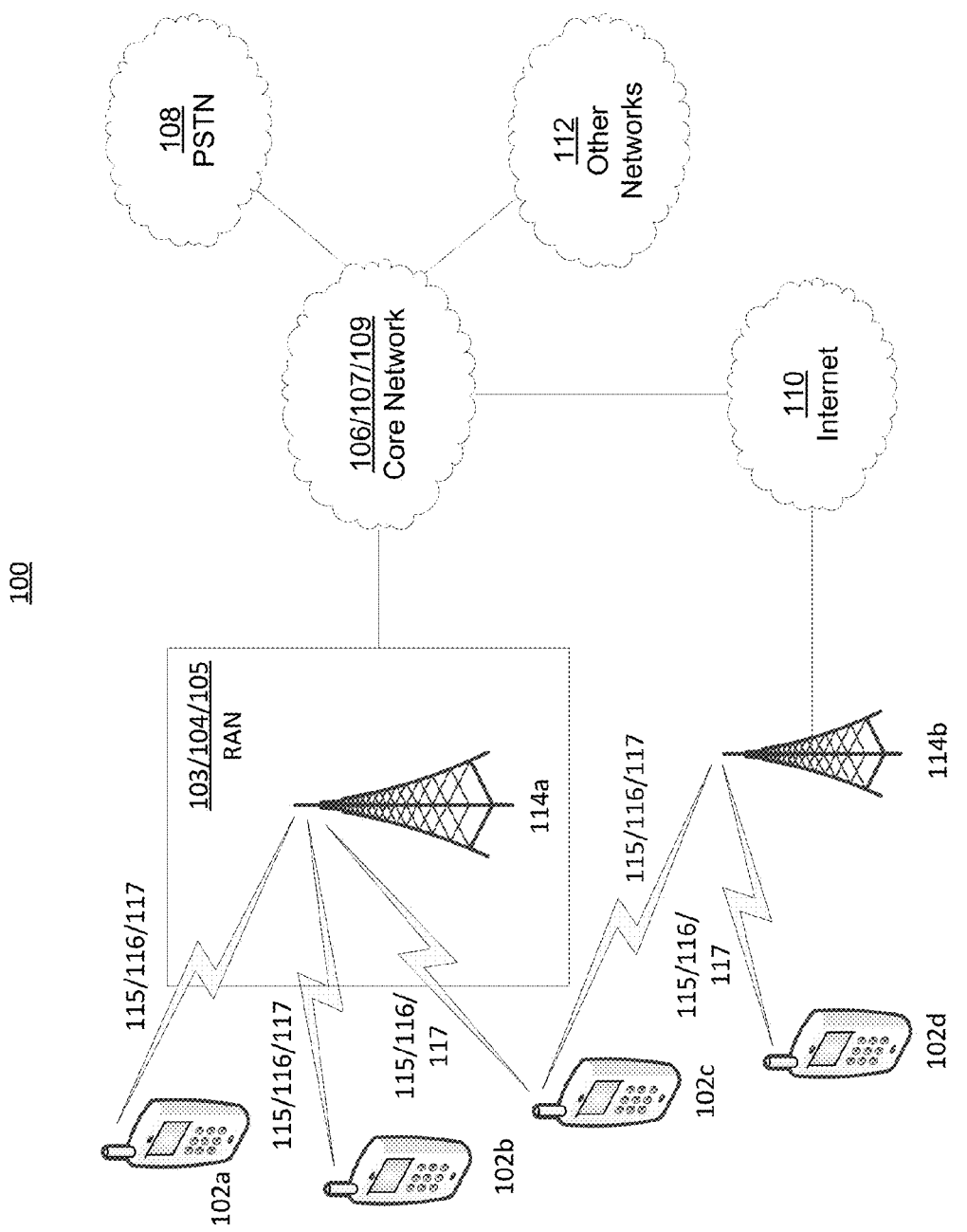
FIG. 1A is a system diagram of an example communications system.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and/or other networks 112, though any number of WTRUs, base stations, networks, and/or network elements may be implemented. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and/or the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and/or the like. While the base stations 114a, 114b are each depicted as a single element, the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one example, the base station 114a may include three transceivers, i.e., one for each sector of the cell. In another example, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

The communications system 100 may be a multiple access system and may employ one or more channel access schemes, such as CDMA, TDMA, FDMA, OFDMA, SC-FDMA, and/or the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

The base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and/or the like.

The base station 114b in FIG. 1A may be a wireless router, a Home Node B, a Home eNode B, or an access point, for example, and may utilize any suitable RAT for facilitating wireless connectivity in a localized area, such as a place of business, a home, a vehicle, a campus, and/or the like. The base station 114b and the WTRUs 102c, 102d may implement a radio technology such as IEEE 802.11 to establish a wireless local area network (WLAN). The base station 114b and the WTRUs 102c, 102d may implement a radio technology such as IEEE 802.15 to establish a wireless personal area network (WPAN). The base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
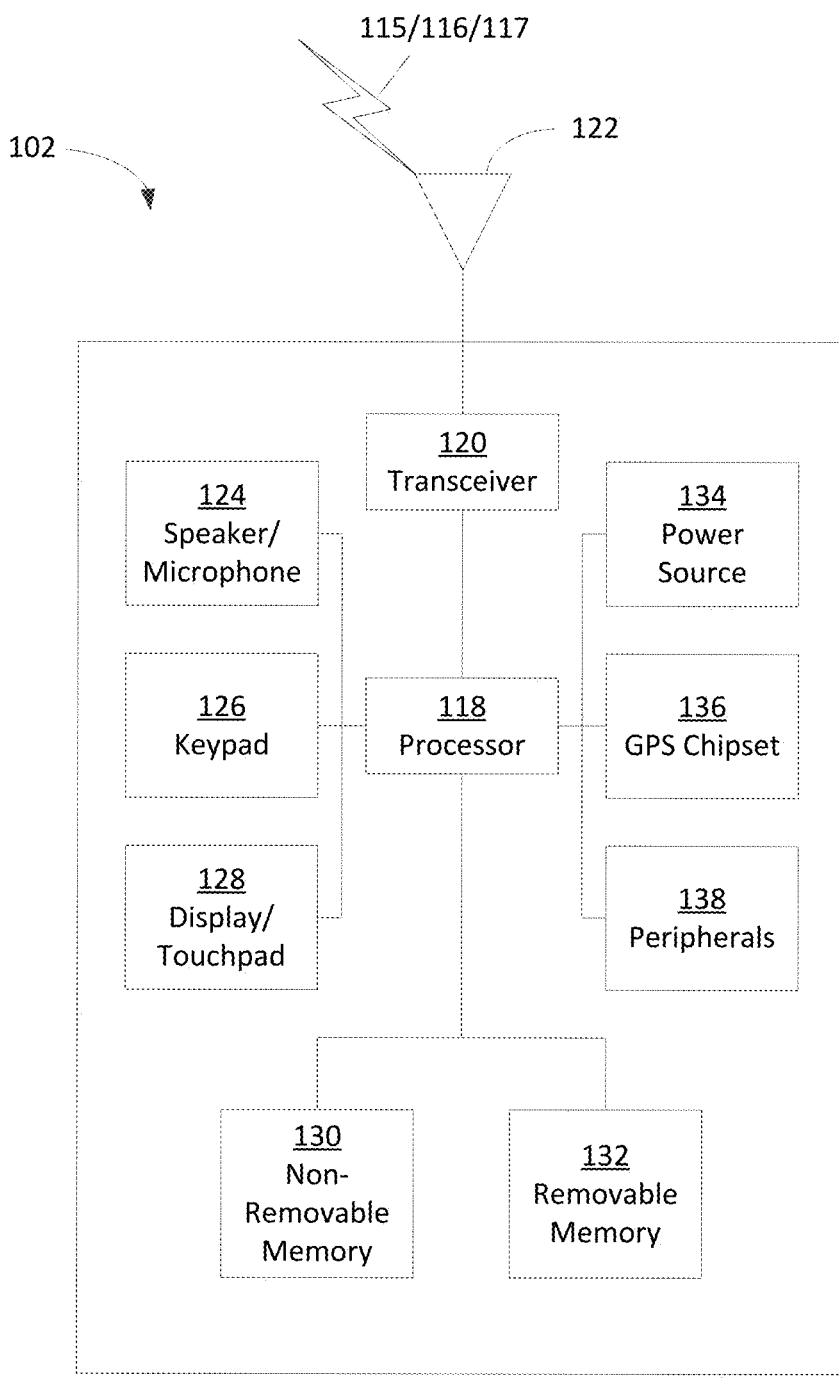
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. The WTRU 102 may include any sub-combination of the foregoing elements. The base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. The transmit/receive element 122 may be configured to transmit and/or receive any combination of wireless signals.

Although the transmit/receive element 122 is depicted in FIG. 1B as a single element, the WTRU 102 may include any number of transmit/receive elements 122. The WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. The WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. The processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and/or the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. The WTRU 102 may acquire location information by way of any suitable location-determination method while remaining consistent with an embodiment.

The processor 118 may be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and/or the like.

Figure 1C:
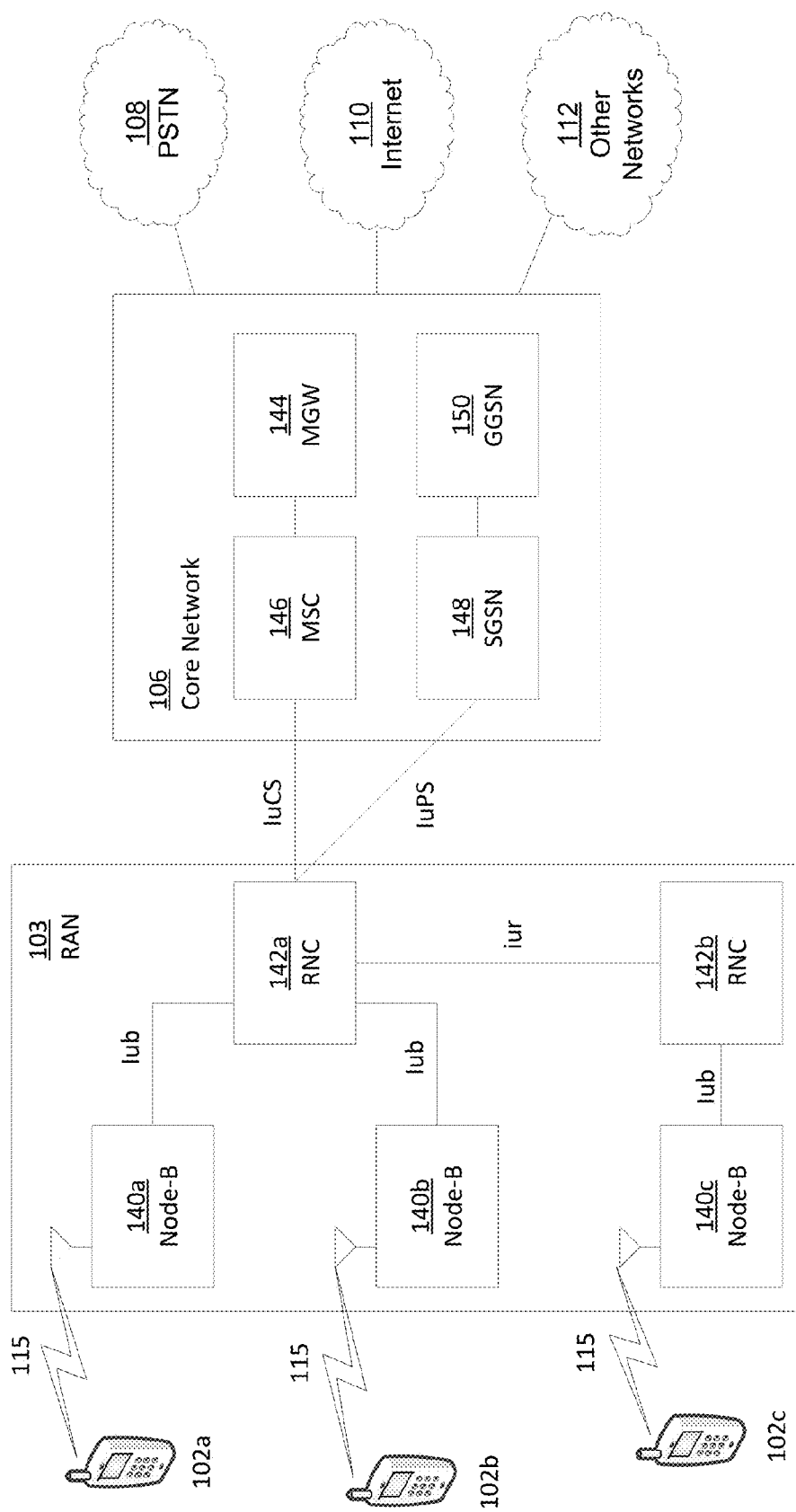
FIG. 1C is a system diagram of an example radio access network and an example core network that may be used within the communications system illustrated in FIG. 1A.

FIG. 1C is a system diagram of the RAN 103 and the core network 106. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. The RAN 103 may include any number of Node-Bs and RNCs.

As shown in FIG. 1C, the Node-Bs 140a, 140b may be in communication with the RNC 142a. The Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. Each of the RNCs 142a, 142b may be configured to carry out or support other functionality, such as outer loop power control, load control, admission control, packet scheduling, handover control, macrodiversity, security functions, data encryption, and/or the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may be connected to the networks 112, which may include other wired or wireless networks that are owned and/or operated by other service providers.

Figure 1D:
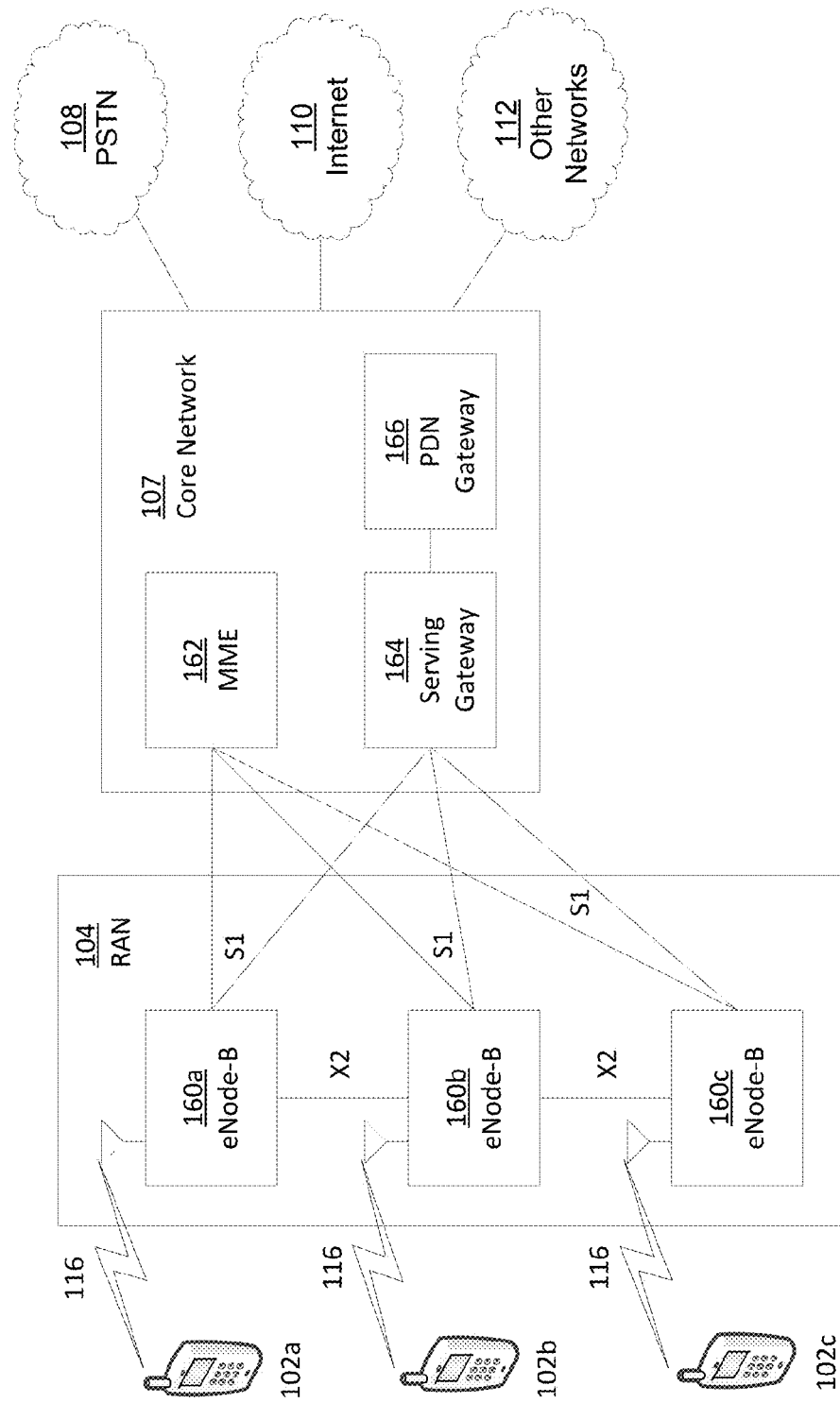
FIG. 1D is a system diagram of another example radio access network and an example core network that may be used within the communications system illustrated in FIG. 1A.

FIG. 1D is a system diagram of the RAN 104 and the core network 107. As noted above, the RAN 104 may employ an E-UTRA radio technology to communicate with the WTRUs 102a, 102b, 102c over the air interface 116. The RAN 104 may be in communication with the core network 107.

The RAN 104 may include eNode-Bs 160a, 160b, 160c, though the RAN 104 may include any number of eNode-Bs. The eNode-Bs 160a, 160b, 160c may each include one or more transceivers for communicating with the WTRUs 102a, 102b, 102c over the air interface 116. The eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and/or the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and/or a packet data network (PDN) gateway 166. While each of the foregoing elements are depicted as part of the core network 107, any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and/or the like. The MME 162 may provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and/or the like.

The serving gateway 164 may be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. The core network 107 may provide the WTRUs 102a, 102b, 102c with access to the networks 112, which may include other wired or wireless networks that are owned and/or operated by other service providers.

Figure 1E:
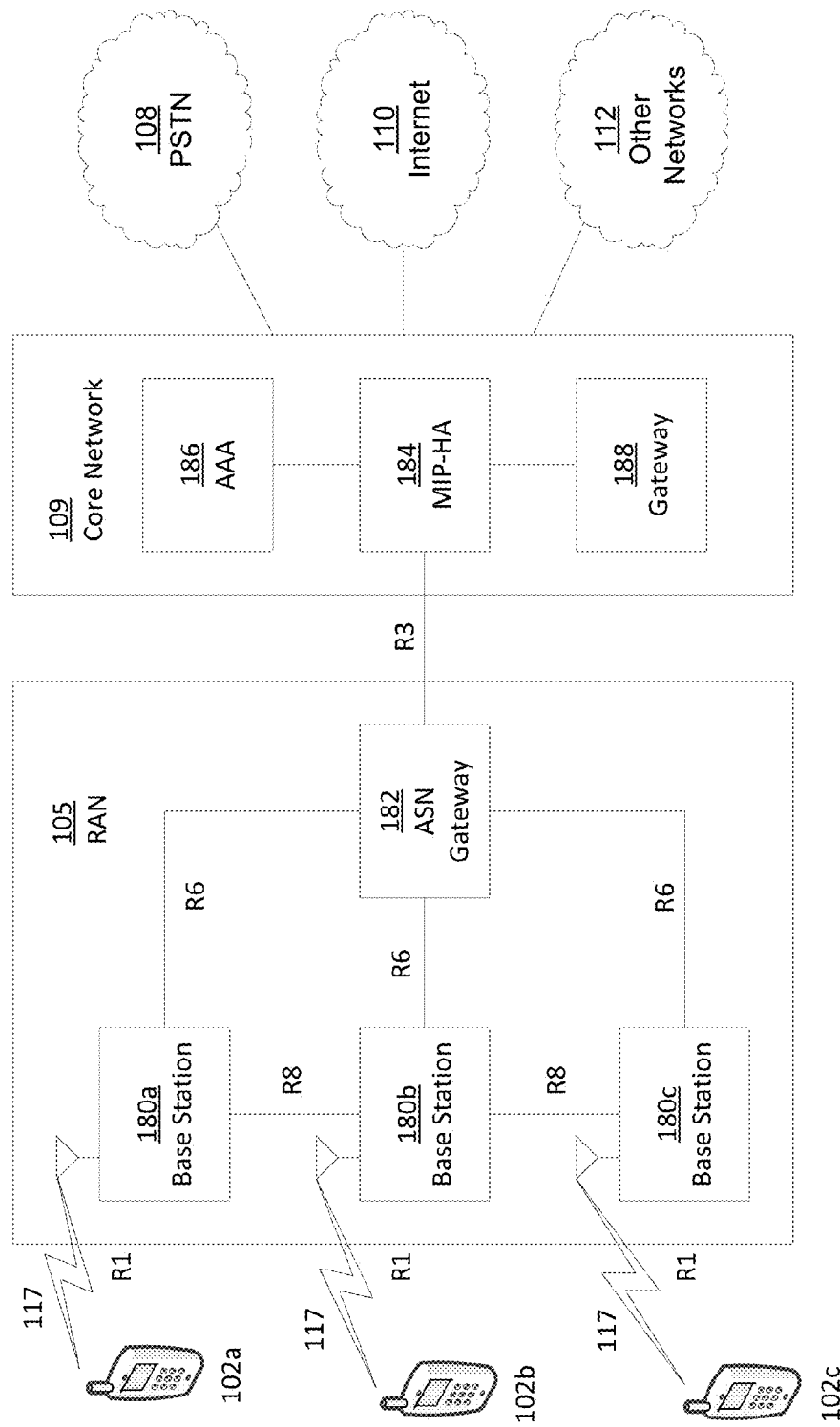
FIG. 1E is a system diagram of another example radio access network and an example core network that may be used within the communications system illustrated in FIG. 1A.

FIG. 1E is a system diagram of the RAN 105 and the core network 109. The RAN 105 may be an access service network (ASN) that employs IEEE 802.16 radio technology to communicate with the WTRUs 102a, 102b, 102c over the air interface 117. The communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and/or an ASN gateway 182, though the RAN 105 may include any number of base stations and/or ASN gateways. The base stations 180a, 180b, 180c may each be associated with a particular cell (not shown) in the RAN 105 and may each include one or more transceivers for communicating with the WTRUs 102a, 102b, 102c over the air interface 117. The base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and/or the like. The ASN gateway 182 may serve as a traffic aggregation point and may be responsible for paging, caching of subscriber profiles, routing to the core network 109, and/or the like.

The air interface 117 between the WTRUs 102a, 102b, 102c and the RAN 105 may be defined as an R1 reference point that implements the IEEE 802.16 specification. Each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and/or a gateway 188. While each of the foregoing elements are depicted as part of the core network 109, any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. The gateway 188 may provide the WTRUs 102a, 102b, 102c with access to the networks 112, which may include other wired or wireless networks that are owned and/or operated by other service providers.

Although not shown in FIG. 1E, the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The communications systems described herein may perform multi-antenna communications using a multi-dimensional antenna configuration. The multi-antenna communications may include information sent from a base station to a WTRU and/or feedback from the WTRU to the base station. The WTRU may perform measurements on multiple channels. The measurements may be performed for multiple reference signals. The measurements performed on the reference signals may be used to determine channel state information (CSI). The WTRU may report CSI feedback to the base station that may be used by the base station when performing communications with the WTRU.

A reference signal may be classified as WTRU-specific reference signaling (WTRU-RS) and/or cell-specific reference signaling (CRS). The WTRU-RS may be used for a WTRU so that the RS may be transmitted for the resources allocated to the WTRU. The CRS may be shared by WTRUs in a cell, such as each WTRU in a cell for example. The CRS may be transmitted in a wideband manner. According to the usage of the reference signal, the reference signal may be differentiated as a demodulation reference signal (DM-RS) and/or a channel-state-information reference signal (CSI-RS). The DM-RS may be used for a WTRU for demodulation. The DM-RS may be precoded. The precoding may be to exploit beamforming gain. The DM-RS may be WTRU-specific and may not be shared with other WTRUs, such as other WTRUs in the same cell. When the DM-RS is WTRU-specific, the DM-RS may be transmitted in the time/frequency resources allocated for the WTRU.

Figure 2:
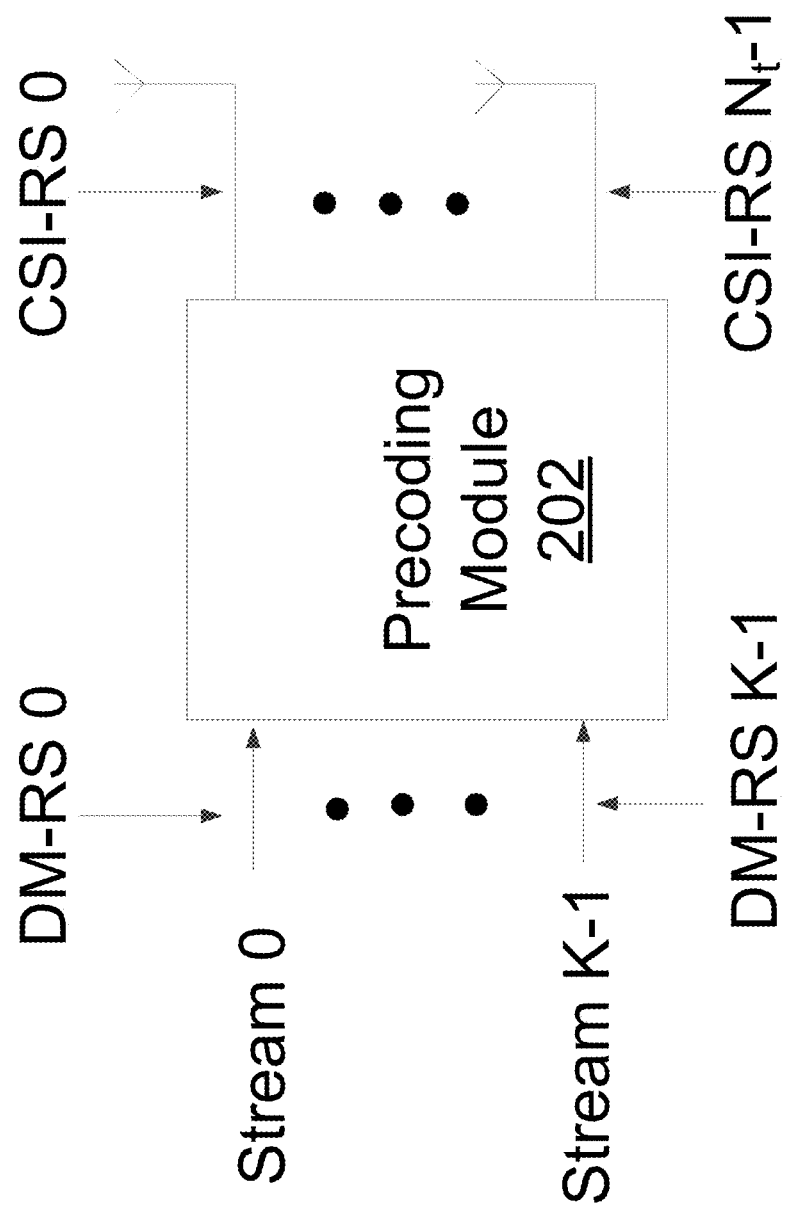
FIG. 2 is a diagram depicting an example of a precoded WTRU-specific a demodulation reference signal (DM-RS) configuration.

FIG. 2 is a diagram depicting an example of a precoded WTRU-specific DM-RS configuration. The DM-RS configuration may include a precoding module 202 for precoding DM-RS. The precoding module 202 may receive one or more data streams for transmission, where the number of layers of data that may be received by the precoding module 202 may be represented by the value K. For example, the precoding module 202 may receive data streams from stream 0 to stream K−1. Each data stream may include a DM-RS. As shown in FIG. 2, stream 0 may include a DM-RS 0 and stream K−1 may include a DM-RS K−1, with each stream from 1 to K including a corresponding DM-RS. The precoding module 202 may receive a data stream, insert the DM-RS for each stream, and/or perform precoding. The DM-RS may be used to estimate the channel for each stream and demodulate data.

Each data stream received by the precoding module 202 may be precoded with a CSI-RS value for transmission. For example, the precoding module 202 may precode each data stream from stream 0 to stream K−1 with a CSI-RS value. Each CSI-RS value may correspond to a different antenna port. Antenna port 1 may have a CSI-RS value 0 and antenna port $N_t$ may have a CSI-RS value $N_t-1$, wherein the number of antenna ports may be from 1 to $N_t$.

FIG. 2 shows that if precoded DM-RS is employed, the RS may be precoded with the same precoding used for the data symbol. The number of RS sequences may correspond to the number of layers K that may be transmitted. K may be equal to or smaller than antenna ports $N_t$.

In FIG. 2, the K streams may be allocated for a WTRU or shared with multiple WTRUs. If multiple WTRUs share the K streams, the co-scheduled WTRUs may share time/frequency resources at the same time. If precoded DM-RS is used for demodulation, a measurement reference signal may be used for a WTRU to measure channel state information. The measurement reference signal may be a CSI-RS.

Figure 3:
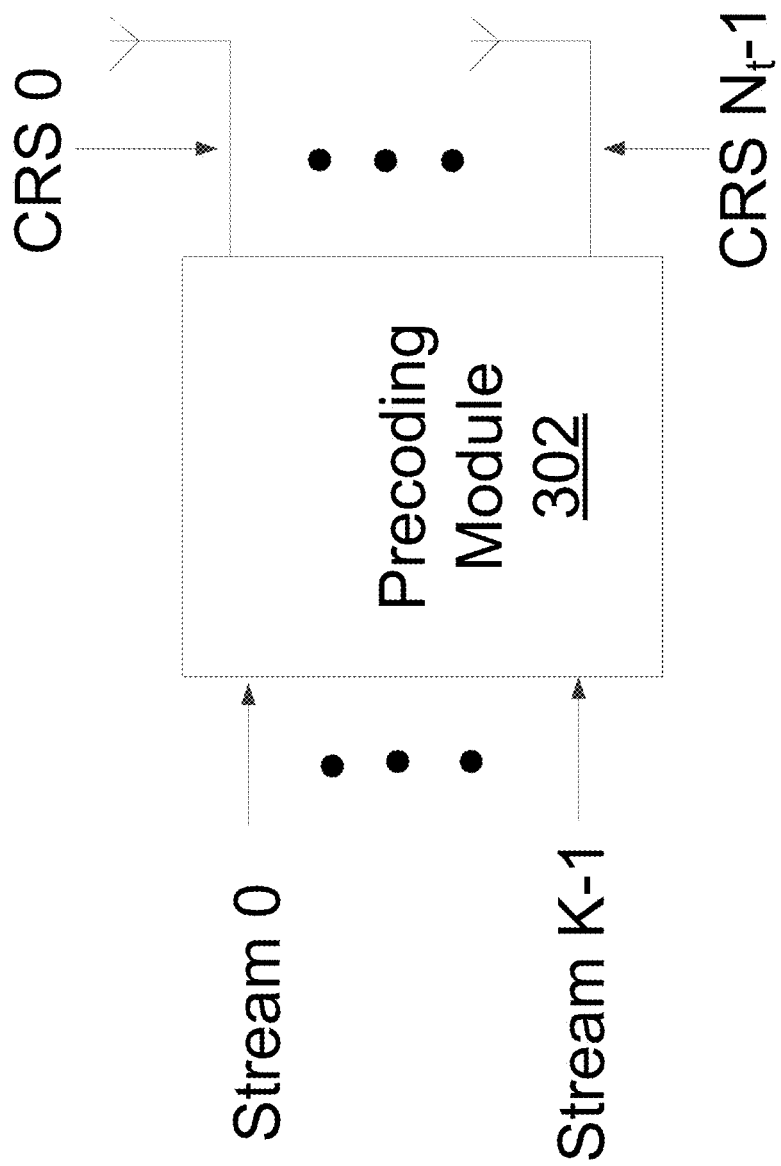
FIG. 3 is a diagram depicting an example of a non-precoded cell-specific RS (CRS) configuration.

FIG. 3 is a diagram depicting an example of a non-precoded CRS configuration. FIG. 3 shows an example of a MIMO transmitter for precoded data and non-precoded CRS transmission. CRS may be implemented for one or more WTRUs. For example, CRS may be implemented for each WTRU in a cell. CRS may be used for demodulation and/or measurement. Since the CRS may be shared by each WTRU, non-precoded RS may be used to keep the cell coverage uniform. The precoded RS may have different cell coverage according to the directions due to the beamforming effect. A WTRU transparent antenna virtualization may be used, for example, if the number of physical antenna elements and logical antenna ports may be different.

The RS sequences may be transmitted on each antenna port irrespective of the number of streams. For example, the precoding module 302 may receive data streams from stream 0 to stream K−1, for K data streams. Each data stream output by the precoding module 302 may be inserted with a CRS value for transmission. Each CRS value may correspond to a different antenna port. Antenna port 1 may have a CRS value 0 and antenna port $N_t$ may have a CRS value $N_t-1$, wherein the number of antenna ports may be from 1 to $N_t$.

Various types of RS structures may be implemented. The RS structure may be provided for wireless communication systems, such as third generation partnership project (3GPP) systems (e.g., LTE systems) or similar communications systems.

Figure 4:
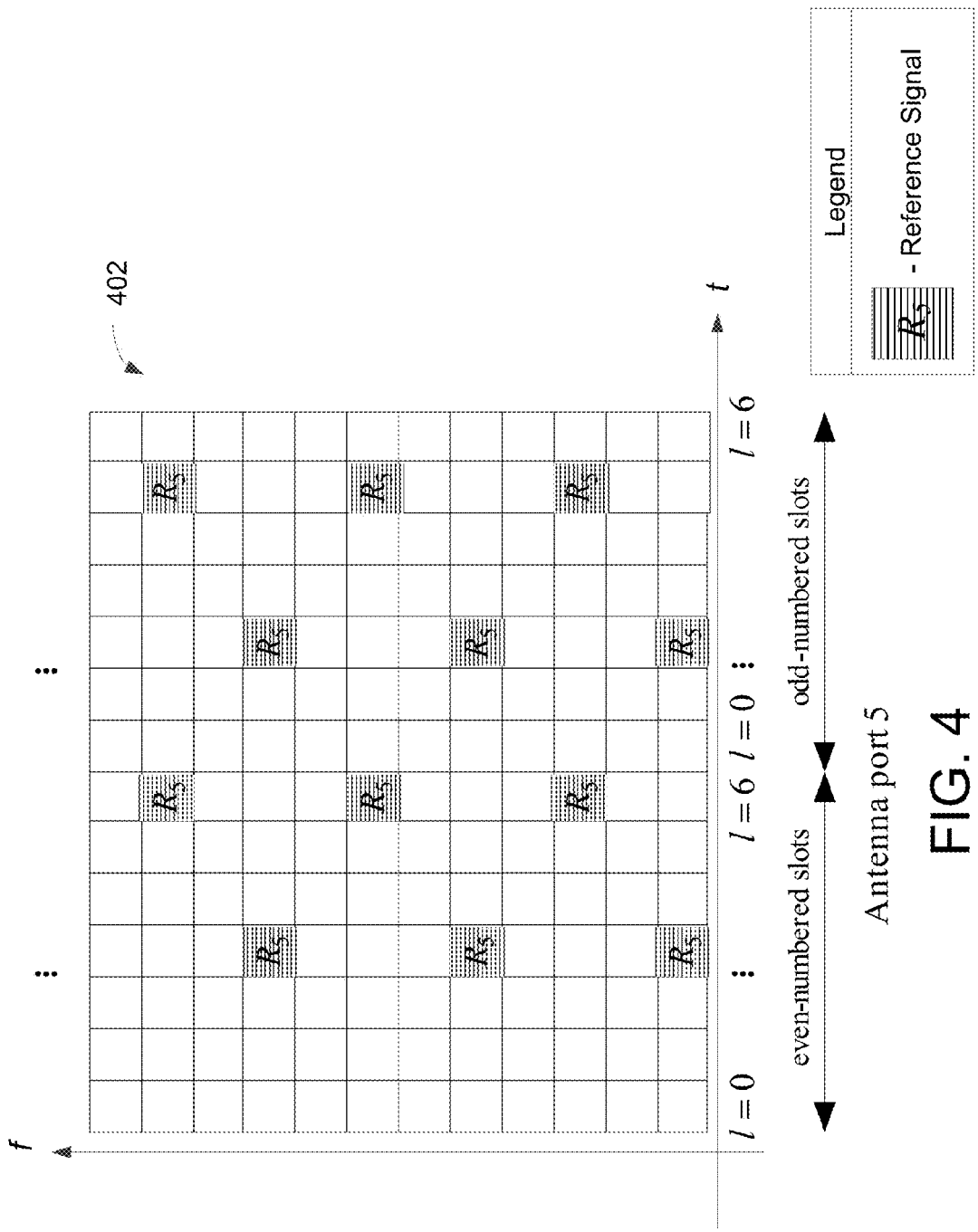
FIG. 4 is a diagram depicting an example of a WTRU-specific DM-RS pattern.

FIG. 4 is a diagram depicting an example of a WTRU-specific DM-RS pattern 402. The DM-RS pattern 402 may be used for normal cyclic prefix (CP). The DM-RS pattern 402 may be used in a communication system (e.g., LTE system) to support non-codebook based transmission at a base station. The DM-RS pattern 402 may indicate antenna port-5. The antenna port-5 may support single layer transmission. The antenna port-5 may be transmitted with CRS for measurement. The DM-RS pattern 402 indicates a time-frequency resource element (RE) position for the antenna port 5. Another DM-RS pattern may indicate another antenna port.

Figure 5A:
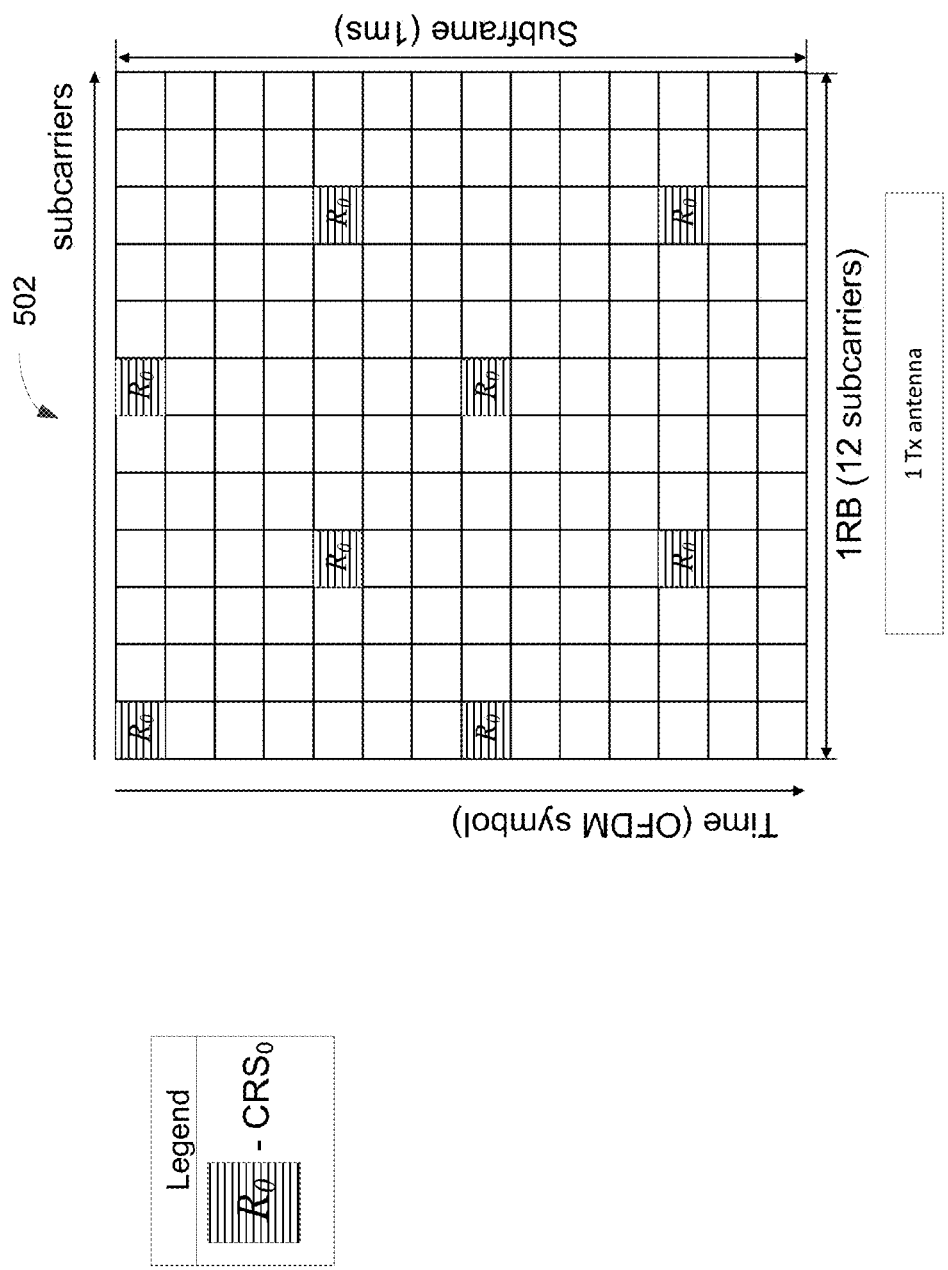
FIGS. 5A-5C are diagrams that depict example CRS patterns that may be configured according to a number of antenna ports.
Figure 5B:
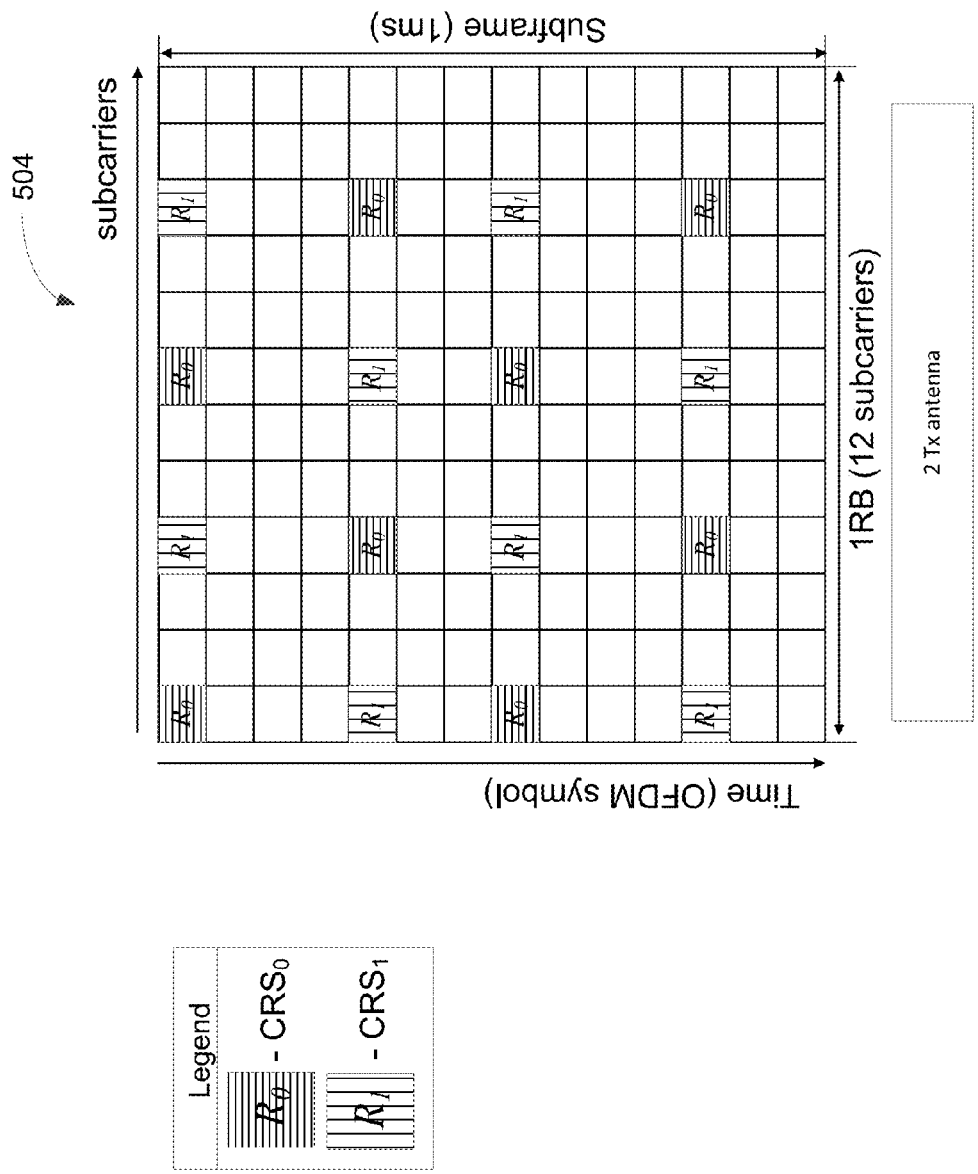
Figure 5C:
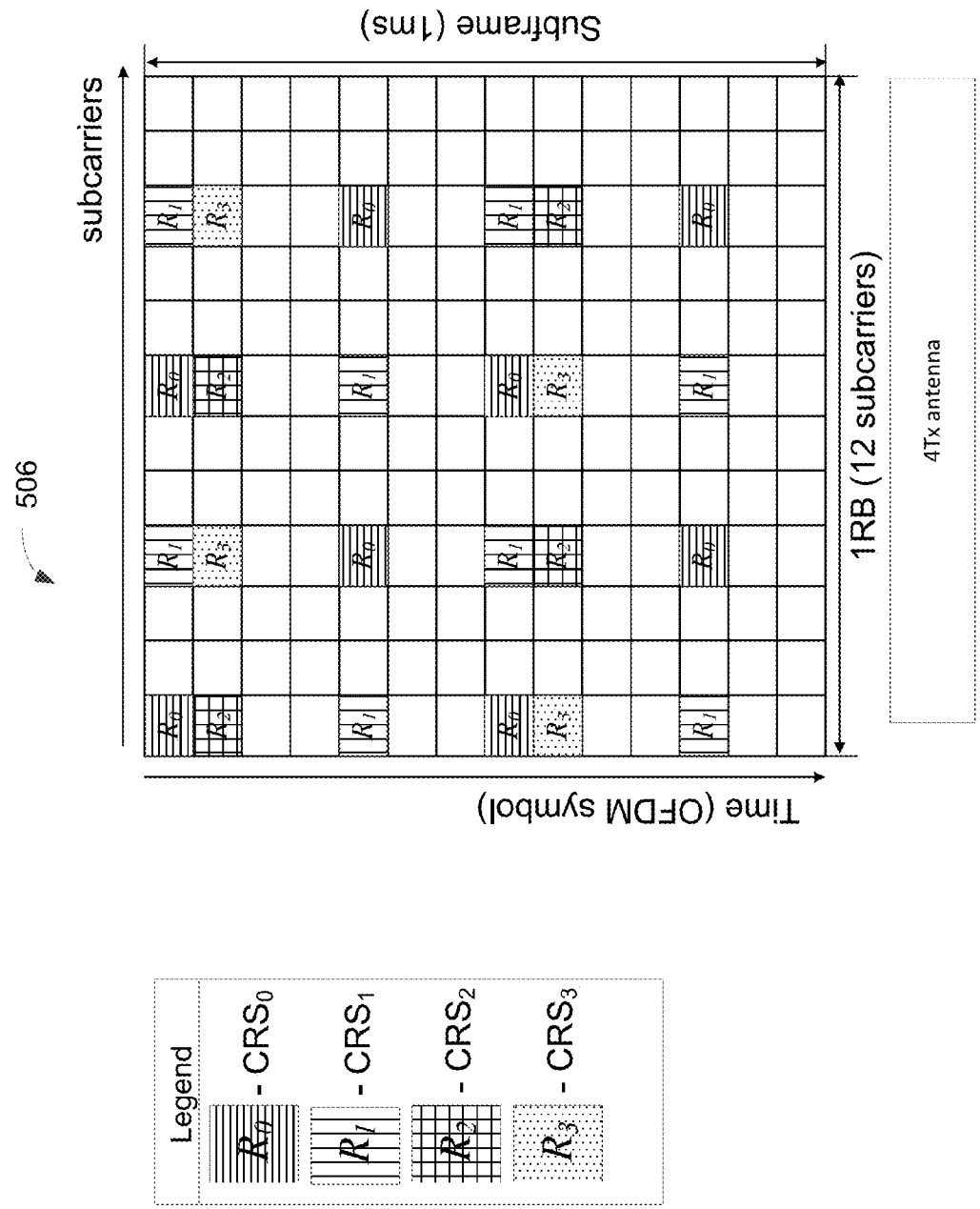

FIGS. 5A-5C are example diagrams depicting example CRS patterns 502, 504, 506 that may be configured according to the number of antenna ports. The RS overhead for CRS may be greater than the RS overhead for a DM-RS pattern. FIGS. 5A-C show the CRS patterns 502, 504, and 506 for 1, 2, and 4 antenna ports, respectively, for normal CP. The CRS patterns 502, 504, 506 for each antenna port may be mutually orthogonal in a time and/or a frequency domain. The CRS patterns 502, 504, 506 may be for a resource block (RB) that includes a number of REs. The RB may include 12 subcarriers. The RB may be transmitted over a period of time, such as a one millisecond subframe for example. The RB may be transmitted using orthogonal frequency-division multiplexing (OFDM). The example CRS patterns 502, 504, and 506 are provided as examples, and are not limited to a specific resource block size, subframe, number of subcarriers, or any other configuration described herein.

FIG. 5A depicts a CRS pattern 502 that may be implemented for one antenna port. Each $R_0$ in the CRS pattern 502 may indicate a CRS for antenna port 0 that may be transmitted on a subcarrier in a period of time. The $R_0$ may be transmitted from a transmitting device, such as a base station, to a receiving device, such as a WTRU.

FIG. 5B depicts a CRS pattern 504 that may be implemented for two antenna ports. Each $R_0$ in the CRS pattern 504 may indicate a CRS for antenna port 0 that may be transmitted on a subcarrier in a period of time. Each $R_1$ in the CRS pattern 504 may indicate a CRS for antenna port 1 that may be transmitted on a subcarrier in a period of time. Transmission of an $R_0$ and an $R_1$ may alternate across a number of subcarriers in a RB. An $R_0$ and an $R_1$ may be separated by one or more subcarriers. Transmission of an $R_0$ and an $R_1$ may alternate over a period of time for the same subcarrier. The $R_0$ and the $R_1$ transmission may be separated by a period of time. The period of time from an $R_1$ transmission to an $R_0$ transmission may be different than the period of time from an $R_0$ transmission to an $R_1$ transmission. The $R_0$ and the $R_1$ may be transmitted from a transmitting device, such as a base station, to a receiving device, such as a WTRU.

FIG. 5C depicts a CRS pattern 506 that may be implemented for four antenna ports. Each $R_0$ in the CRS pattern 506 may indicate a CRS for antenna port 0 that may be transmitted on a subcarrier in a period of time. Each $R_1$ in the CRS pattern 506 may indicate a CRS for antenna port 1 that may be transmitted on a subcarrier in a period of time. Each $R_2$ in the CRS pattern 506 may indicate a CRS for antenna port 2 that may be transmitted on a subcarrier in a period of time. Each $R_3$ in the CRS pattern 506 may indicate a CRS for antenna port 3 that may be transmitted on a subcarrier in a period of time.

The CRS pattern for antenna port 0 and antenna port 1 may be the same, or similar, to the CRS pattern 504 illustrated in FIG. 5B. The $R_2$ and/or $R_3$ may be transmitted in a time period adjacent to the time period within which the $R_0$ or $R_1$ are transmitted in the CRS pattern for antenna port 0 and antenna port 1. The $R_0$, $R_1$, $R_2$, and/or $R_3$ may be transmitted from a transmitting device, such as a base station, to a receiving device, such as a WTRU.

The CRS antenna ports may be interfered with by data transmitted in other antenna ports. To avoid interference between antenna ports, the data REs located at the RE in which any CRS antenna ports may be transmitted may be muted. A predefined RS sequence (e.g., pseudo-random and/or the like) maybe transmitted on the RE location for the CRS ports so as to minimize inter-cell interference. This may improve channel estimation accuracy (e.g., from CRS). The pseudo-ransom sequences may be applied in OFDM symbol level in a subframe. The sequence may be defined as a function of the physical cell-ID, subframe number, and/or the position of the OFDM symbol. For example, there may be multiple (e.g., two) CRS antenna ports in an OFDM symbol per physical RB (PRB). The number of PRBs in a communications system may vary. For example, the number of PRBs in an LTE communication system may vary from six to one-hundred and ten. The number of CRS for an antenna port in an OFDM symbol including RS may be $2 \times N_{RB}$. The sequence length may be $2 \times N_{RB}^{DL}$. $N_{RB}$ may denote a number of RBs corresponding to a bandwidth. The sequence may be binary or complex. The m-the complex symbol r(m) of the sequence is shown in Equation 1:

$$r(m) = \frac{1}{\sqrt{2}}(1 - 2 \cdot c(2m)) + j\frac{1}{\sqrt{2}}(1 - 2 \cdot c(2m+1)), \quad \text{Equation 1}$$

$$m = 0, 1, \ldots, 2N_{RB}^{DL} - 1,$$

where $N_{RB}^{DL}$ may denote the number of RBs corresponding to the maximum bandwidth in the communications system and j may be an imaginary number. For example, $N_{RB}^{DL}$ may be one-hundred and ten for an LTE communications system. The c may denote the pseudo-random sequence with length-31. The c may be defined with Gold-sequence. If a DM-RS is configured, Equation 2 may be used:

$$r(m) = \frac{1}{\sqrt{2}}(1 - 2 \cdot c(2m)) + j\frac{1}{\sqrt{2}}(1 - 2 \cdot c(2m+1)), \quad \text{Equation 2}$$

$$m = 0, 1, \ldots, 12N_{RB}^{PDSCH} - 1$$

where $N_{RB}^{PDSCH}$ may denote the number of RBs allocated for a WTRU. As shown, the sequence length may vary according to the number RBs allocated for a WTRU.

To reduce the overall RS overhead, a DM-RS based downlink transmission may be implemented. The CRS-based downlink transmission may transmit RS sequences for each physical antenna port. The DM-RS-based downlink transmission may reduce the RS overhead compared to CRS-based downlink transmission, since the same number of RSs as the number of layers may be used for DM-RS. The number of layers may be equal to or smaller than the number of physical antenna ports.

Figure 6:
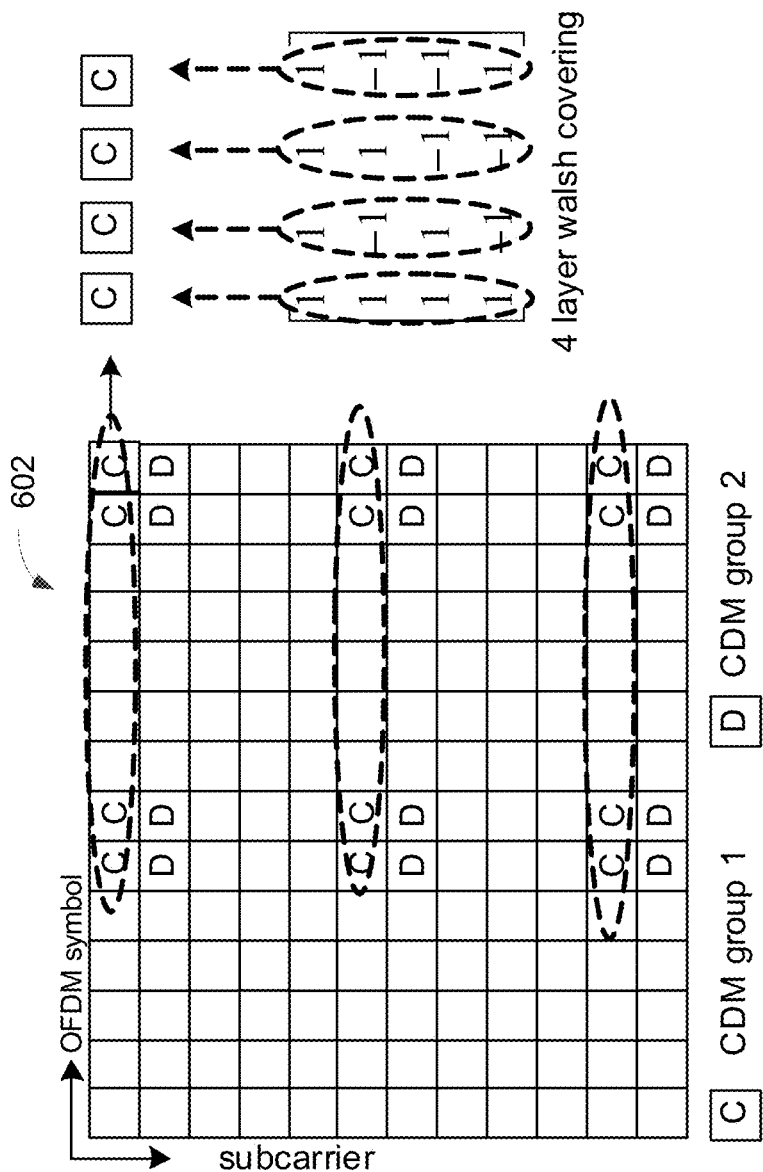
FIG. 6 is a diagram that depicts an example DM-RS pattern that may support multiple layers.

FIG. 6 is a diagram that depicts an example DM-RS pattern 602 that may support multiple layers. Up to 8 layers may be supported in the DM-RS pattern 602. The DM-RS pattern 602 may be included in a PRB for a subframe with CP. Multiple CDM groups may be used for multiplexing. As shown in FIG. 6, CDM group 1 is indicated with a C, while CDM group 2 is indicated with a D. Multiple layers may be included in each CDM group. Up to 8 layers may be multiplexed using CDM group 1 and CDM group 2 in the DM-RS pattern 602. For the CDM multiplexing for each CDM group, 4×4 Walsh spreading may be used. Up to 4 layers may be included in each CDM group. Each layer in the CDM group may include a code that may cover a different DM-RS port. For example, the code 1, 1, 1, 1 may indicate a first group, the code 1, −1, 1, −1 may indicate a second group, the code 1, 1, −1, −1 may indicate a third group, and/or the code 1, −1, −1, 1 may indicate a fourth group. Similar codes may be used for CDM group 1 and CDM group 2. Each code may identify a different antenna port within the CDM group.

Since the DM-RS may be used for demodulation purposes, a time/frequency sparse CSI-RS may be used for measurement purposes. The CSI-RS may be transmitted with a duty cycle {5, 10, 20, 40, 80} ms in the physical downlink shared channel (PDSCH) region. A number of CSI-RS patterns may be used in a subframe.

Figure 7A:
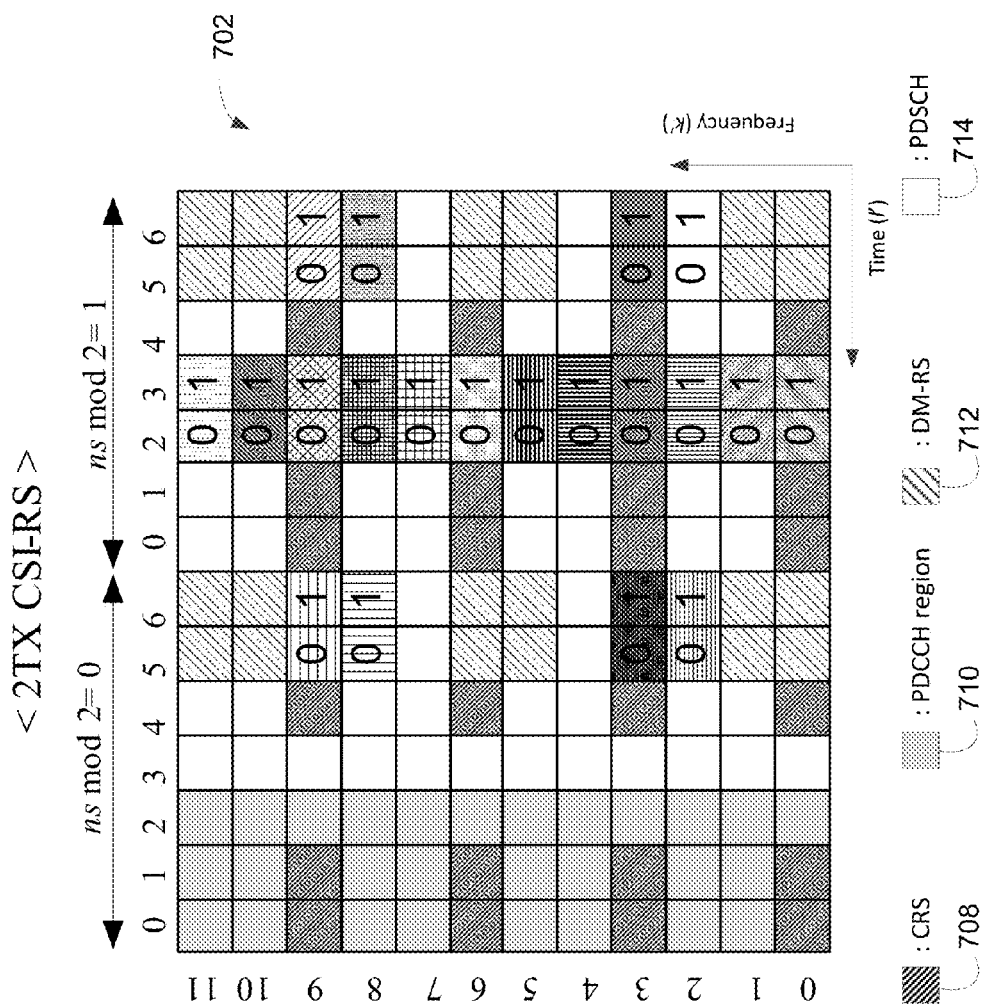
FIGS. 7A-7C are diagrams that depict an example channel state information (CSI) reference signal (CSI-RS) pattern based on a number of antenna ports.
Figure 7B:
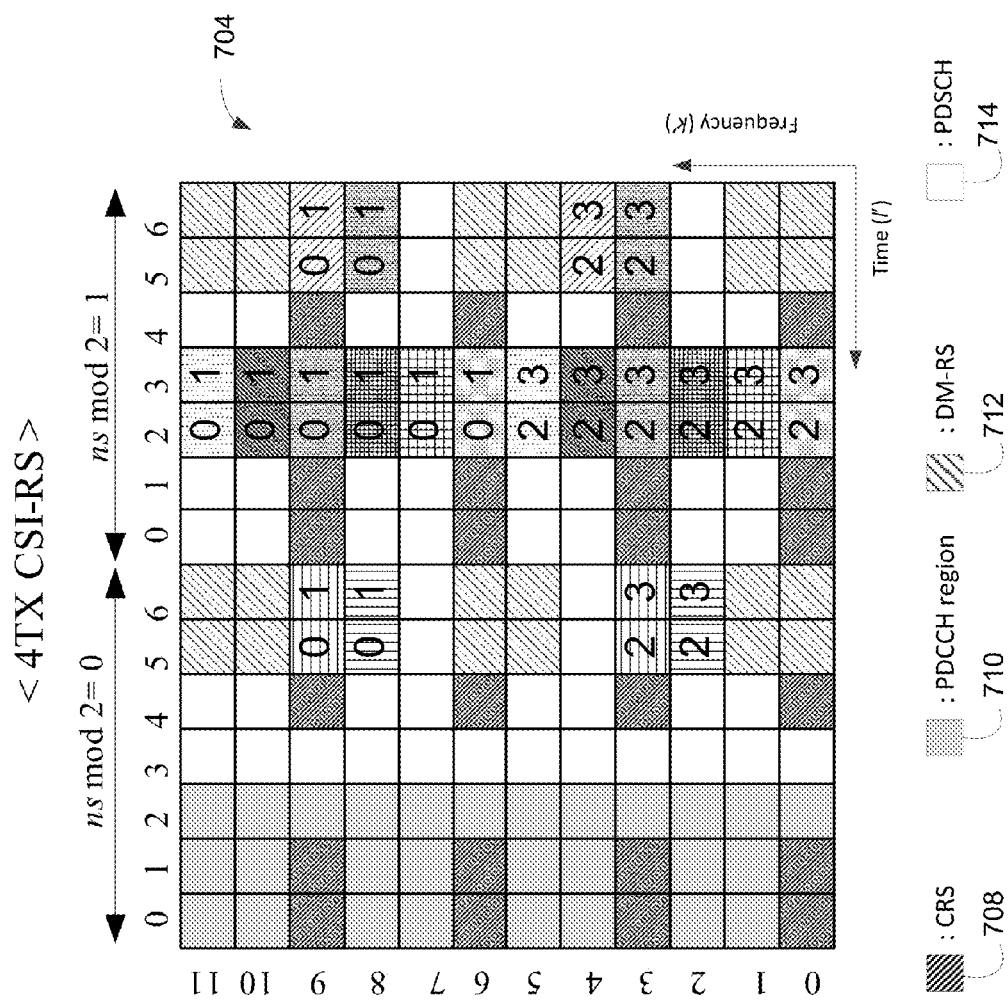
Figure 7C:
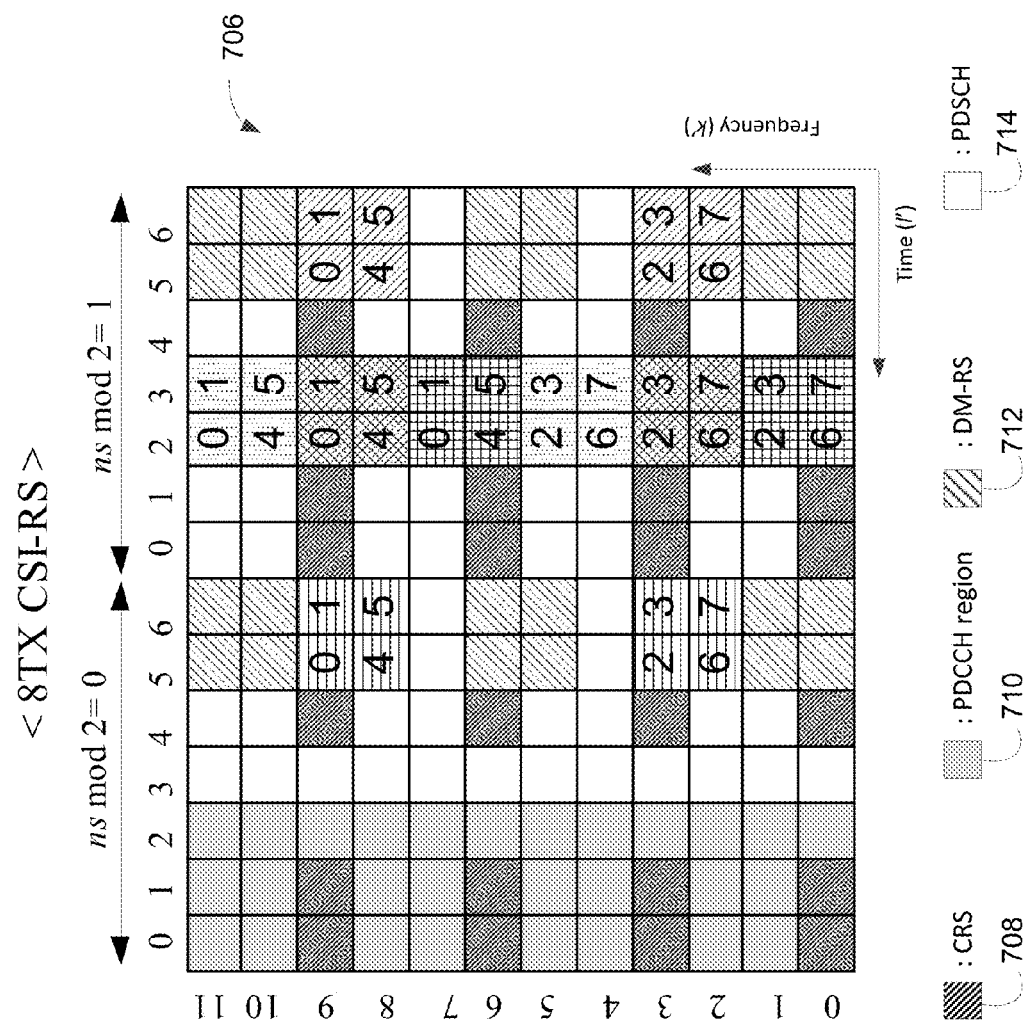

FIGS. 7A-7C are diagrams that depict example CSI-RS patterns in a time-frequency domain. As shown in FIGS. 7A-7C RBs 702, 704, 706 may include a set of REs for a CSI-RS configuration for a multi-transmission antenna. The RBs 702, 704, 706 may also include a CRS 708, a PDCCH region 710, a DM-RS 712, and/or a PDSCH 714.

FIG. 7A is a diagram that depicts an example RB 702 that includes a set of REs for a CSI-RS configuration for two transmission antennas. Each '01' pair having the same color/shade indicates a set of REs for a CSI-RS configuration. The RB 702 includes a configuration for 20 CSI-RS patterns in a subframe. ns mod 2=0 may indicate a slot (e.g., first slot) of the subframe. ns mod 2=1 may indicate the next slot (e.g., second slot) of the subframe.

FIG. 7B is a diagram that depicts an example RB 704 that includes a set of REs for a CSI-RS configuration for four transmission antennas. Each of the '01' and '23' sets having the same color/shade indicates a set of REs for a particular CSI-RS configuration. The RB 704 includes a configuration for 10 CSI-RS patterns in a subframe.

FIG. 7C is a diagram that depicts an example RB 706 that includes a set of REs for a CSI-RS configuration for eight transmission antennas. Each of the '01,' '23,' '45,' and '67' sets having the same color/shade indicates a set of REs for a particular CSI-RS configuration. The RB 706 includes a configuration for 5 CSI-RS patterns in a subframe.

Various codebooks may be implemented for performing communications in a communications system. The codebooks may be used for modulation (e.g., precoding) and/or demodulation of the communications between a base station and a WTRU. The WTRU may receive communications from a base station and may send feedback information to the base station that may be used to perform code-book based precoding for the communications transmitted to the WTRU.

Figure 8:
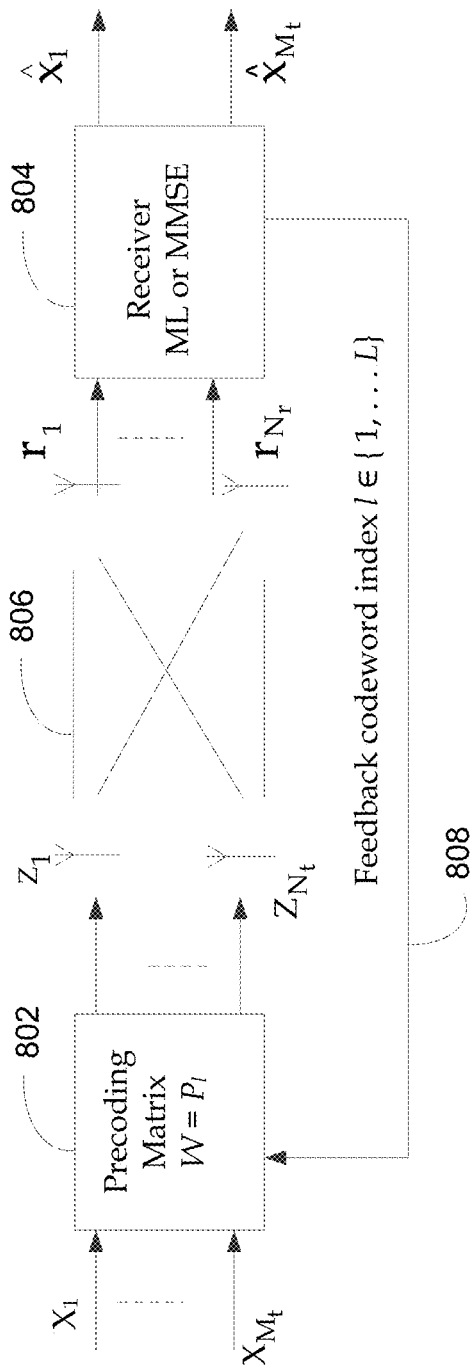
FIG. 8 is a diagram illustrating an example of codebook-based precoding with feedback information.

FIG. 8 is a diagram illustrating an example of codebook-based precoding that may be performed with feedback information 808. As shown in FIG. 8, wireless communications may be sent from a base station 802 to a WTRU 804. The wireless communications may be sent over a MIMO channel 806. The base station 802 may transmit multiple data streams $X_1$ to $X_{Mt}$. The base station 802 may include multiple antenna ports $Z_1$ to $Z_{Nt}$ for a number of transmit antennas from 1 to Nt. The WTRU 806 may receive signals $r_1$ to $r_{Nr}$ at receive antennas from 1 to Nr. The WTRU 804 may determine the data streams $\hat{X}_1$ to $\hat{X}_{Mt}$ from the received information. The data streams $\hat{X}_1$ to $\hat{X}_{Mt}$ may be determined using MIMO receivers, such as a maximum likelihood (ML) receiver and/or a maximum mean square error (MMSE) receiver for example.

The base station 802 may include a precoder that may use a precoding matrix codebook W. The precoding matrix codebook W may include a number of precoding matrices P, that may each be associated with a precoding matrix index 1. The data streams $X_1$ to $X_{Mt}$ may be received at the precoder. The precoder may select a precoding matrix or matrices for precoding the data streams $X_1$ to $X_{Mt}$. The precoding matrix may be selected by the precoder based on the feedback information 808 received from the WTRU 804. The feedback information 808 may be based on channel state information measured by the WTRU 804. The feedback information 808 may include a precoding matrix index/in a codebook, the channel state information, and/or other information that may be used by the precoder. The precoder may perform precoding using the feedback information 808, or the precoder may ignore the feedback information 808.

The codebook W may include a set of precoding vectors/matrices for a number of antenna ports. Each precoding vector/matrix in the codebook W may be used for a rank. The rank may indicate the number of data streams in the spatial domain. Each precoding vector/matrix may have its own index/for a rank. The index/may be used by the WTRU 804 to inform the base station 802 of a preferred precoding vector/matrix index or determined precoding vector/matrix index. The preferred or determined precoding vector/matrix may be based on a rule at the WTRU 804 receiver for a data stream. The index/may be used by the base station 802 to inform the WTRU 804 of the precoding vector/matrix that may be applied to a transmission. The precoding vector/matrix identified by the index/may be used on the transmission that includes the index 1.

Codebook-based precoding may be used to lower control signaling/feedback overhead. Codebook-based precoding may have performance degradation, as codebook-based precoding may have a finite number of precoding vector/matrix compared to non-codebook based precoding. TABLE 1 and TABLE 2 below show example codebooks for 2Tx antenna ports and 4Tx antenna ports, respectively.

TABLE 1

2Tx Downlink Codebook

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

As shown in TABLE 1, the codebook for 2Tx may include seven precoding vectors/matrices. The identity matrix may be used for open-loop transmission. Six precoding vectors/matrices may be utilized for closed-loop transmission.

matrix. The variable $u_n$ and the number of layers v may denote a seed vector for the precoding vector/matrix generation for each precoding index and rank. The 4Tx codebook in TABLE 2 has sixty-four precoding matrix indexes and sixteen precoding matrix indexes may be used for the transmission rank. The codebooks shown above may have common properties, such as the constant modulus (CM) property, the nested property, and/or the constrained alphabet. For the CM property, each element in each precoding vector/matrix may have a unit power. For the nested property, a lower rank precoding vector/matrix may be a column subset of a higher rank precoding vector/matrix. For the constrained alphabet, the precoding alphabet may be constrained by $$\left\{\pm 1, \pm j, \pm \frac{(1+j)}{\sqrt{2}}, \pm \frac{(-1+j)}{\sqrt{2}}\right\}.$$

CSI feedback may be used to report information from the WTRU to the base station. Various types of reporting channels may be used for CSI feedback, such as the physical uplink control channel (PUCCH) and/or the physical uplink shared channel (PUSCH) for example. TABLE 3 illustrates example reporting modes using PUCCH and PUSCH.

TABLE 3

Reporting Modes

| Scheduling Mode | Periodic CSI reporting channel | Aperiodic CSI reporting channel |
|---|---|---|
| Frequency non-selective | PUCCH | |
| Frequency selective | PUCCH | PUSCH |

The PUCCH reporting channel may provide robust CSI feedback while allowing a lower feedback overhead than the PUSCH reporting channel. The PUCCH reporting channel may be used for frequency non-selective and frequency selective scheduling modes. The frequency non-selective mode may include a wideband CSI reporting. The frequency

TABLE 2

4Tx Downlink Codebook

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ 1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In TABLE 2, $W_n^{\{s\}}$ may be defined as $W_n = I - 2u_n u_n^H / u_n^H u_n$ the set $\{s\}$ and I may denote a four-by-four identity selective mode may include a subband CSI reporting. The PUSCH may be used for frequency selective scheduling mode. The frequency selective mode may be used for PUSCH since subband CSI reporting may use a larger CSI feedback overhead compared to the wideband CSI reporting in frequency non-selective mode. The PUSCH reporting channel may allow a larger amount of feedback overhead with less reliability. The PUCCH reporting channel may be used for periodic CSI feedback for coarse link adaptation. The PUSCH reporting may be triggered aperiodically for finer link adaptation.

CSI feedback may be reported in the format of rank indicator (RI), precoder matrix index (PMI), and/or channel quality indicator (CQI). The RI and/or PMI may be calculated at a WTRU receiver. The RI may be calculated by selecting a rank in the predefined codebook. The PMI may be calculated by selecting a precoding matrix in the predefined codebook. A WTRU may determine the RI and/or the PMI that maximizes the WTRU throughput. The WTRU may determine the RI and/or the PMI based on the current estimated channel condition and/or a predefined rules at the WTRU. The predefined rules may indicate a fixed PMI and/or RI value within a subset, a desired PMI and/or RI value, an undesired PMI and/or RI value, and/or the like. The PMI and/or CQI may be classified into wideband, subband, and/or WTRU-selected subband. The RI may be reported in a wideband manner.

TABLE 4 shows details for CSI feedback according to the transmission mode.

include the subbands that provide a maximum CQI. The reporting mode 3-0 may be an HL configured subband CQI mode, which may use a wideband CQI and/or a subband CQI. The CQI may be used for a first codeword (CW). PMI may go unused for reporting mode 2-0 and/or reporting mode 3-0.

Transmission modes 1, 2, 3, 7, and/or 8 may use reporting mode 1-0 and/or reporting mode 2-0 for periodic feedback. The reporting mode 1-0 be a wideband CQI mode, which may use wideband CQI. The reporting mode 2-0 may be a WTRU selected subband CQI mode, which may use a wideband CQI and/or the WTRU may report CQI in a preferred subband in each portion of the bandwidth that is included in a reporting opportunity. The CQI may be used for a first CW. PMI may go unused for reporting mode 2-0 and/or reporting mode 3-0.

Transmission modes 4, 6, and/or 8 may use reporting mode 1-2, reporting mode 2-2, and/or reporting mode 3-1 for aperiodic feedback. The reporting mode 1-2 may be a wideband CQI/multiple PMI mode, which may use a CQI for each CW and/or a PMI for each subband. The reporting mode 2-2 may be a WTRU selected subband CQI/multiple PMI mode, which may use a CQI per CW and/or a PMI over the full bandwidth and the M preferred subbands. The reporting mode 3-1 may be an HL configured subband CQI/single PMI mode, which may use a wideband CQI and/or a subband CQI per CW.

TABLE 4

Details of CSI Feedback According to Reporting Modes

| Transmission Mode | Aperiodic Feedback | Periodic Feedback |
|---|---|---|
| 1 | Mode 2-0: WTRU selected sub band CQI: WB CQI + CQI over M best subbands | Mode 1-0: WB CQI |
| 2 | | Mode 2-0: WTRU Selected sub band CQI: WB CQI + WTRU reports CQI in preferred subband in each BW part, one BW part in each reporting opportunity |
| 3 | | |
| 7 | Mode 3-0: high layer(HL) configured subband CQI: WB CQI + subband CQI | |
| 8 | | |
| | CQI for first CW, No PMI | CQI for first CW, No PMI |
| 4 | Mode 1-2: WB CQI/Multiple PMI: CQI for each CW; PMI for each subband | Mode 1-1: WB CQI/Single PMI |
| 6 | | Mode 2-1: WTRU selected subband CQI/Single PMI ($N_{RB}^{DL} > 7$): WB CQI/PMI + WTRU reports CQI in preferred subband in each BW part |
| 8 | Mode 2-2: WTRU selected sub band CQI/Multiple PMI: CQI per CW and PMI, both over full BW and M best subbands | |
| | Mode 3-1: HL configured sub band CQI/Single PMI: WB CQI + subband CQI, both per CW | |
| 5 | Mode 3-1: HL configured sub band CQI/Single PMI: WB CQI + subband CQI, both per CW | |

Periodic feedback may be transmitted on the PUCCH channel. Periodic feedback may be sent on the PUSCH channel when it exists. Periodic reporting may use a sequence of different types of reports. The types of reports may include a subband CQI report, a wideband CQI/PMI report, an RI report, and/or a wideband CQI report. As shown in TABLE 4, a WTRU may have a number of transmission modes. Each transmission mode may implement one or more reporting modes for aperiodic feedback and/or periodic feedback.

Transmission modes 1, 2, 3, 7, and/or 8 may use reporting mode 2-0 and/or reporting mode 3-0 for aperiodic feedback. The reporting mode 2-0 may be a WTRU selected subband CQI mode, which may use a wideband CQI and/or a CQI over the M preferred subbands. The preferred subbands may Transmission modes 4, 6, and/or 8 may use reporting mode 1-1 and/or reporting mode 2-1 for periodic feedback. The reporting mode 1-1 may use a wideband CQI and/or a single PMI. The reporting mode 2-1 may be a WTRU selected subband CQI/single PMI mode, which may use a wideband CQI per CW and/or a PMI and the WTRU may report CQI in a preferred subband in each bandwidth portion that may be used for reporting. The preferred subband may be the subband that provides the highest CQI within each bandwidth portion.

Transmission mode 5 may use reporting mode 3-1 for aperiodic feedback. The reporting mode 3-1 may be an HL configured subband CQI/single PMI mode, which may use a wideband CQI and/or a subband CQI per CW.

Figure 9:
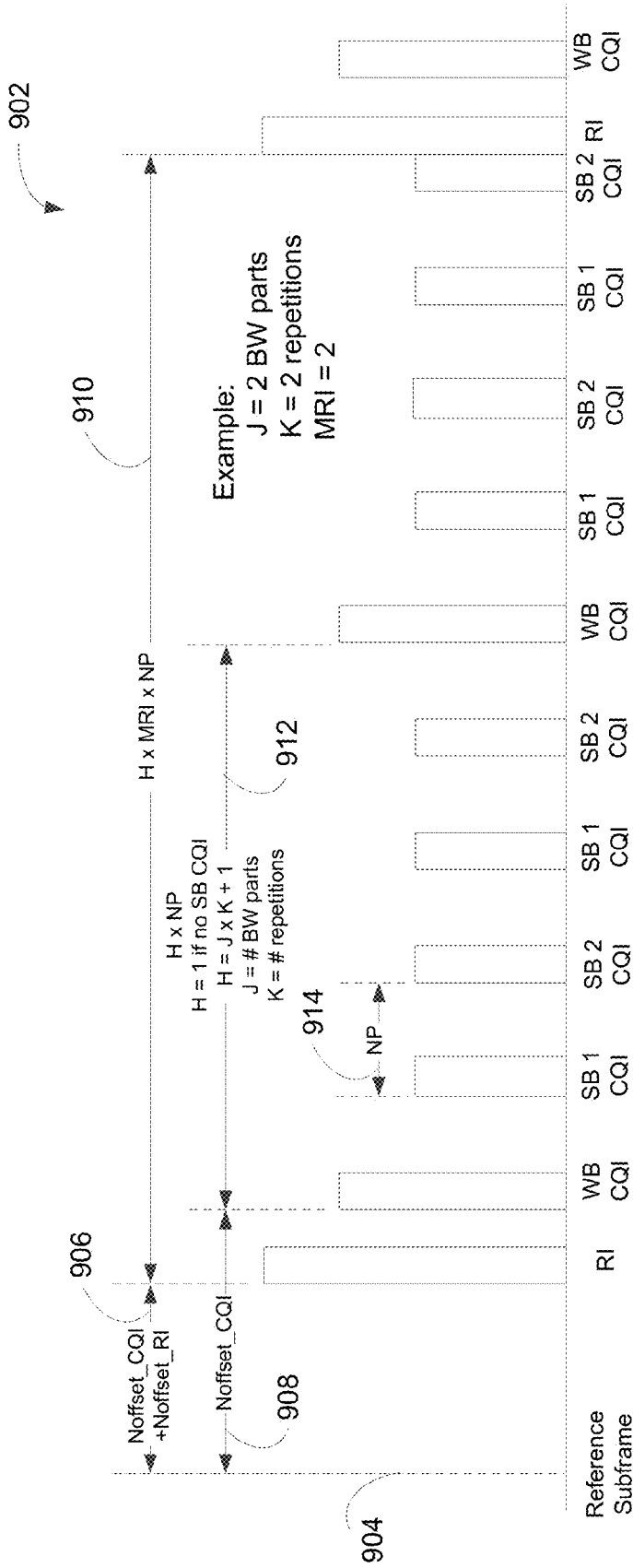
FIG. 9 is a graph illustrating an example periodic reporting sequence.

FIG. 9 is a graph 902 depicting an example periodic reporting sequence. The graph 902 is over time to indicate the time periods for feedback reporting. As shown in graph 902, the feedback reporting may be measured from a reference subframe 904. An RI offset 906 may be measured from the reference subframe 904 to the RI value. One or more WB CQI and/or PMI values may be reported after an RI value. A WB CQI and/or PMI value may be reported after the CQI offset 908 measured from the reference subframe 904. One or more SB CQI values may be reported after a WB CQI and/or PMI value.

Each feedback type may be reported again after a feedback cycle associated with the feedback type. An RI may be reported again after an RI cycle 910. The RI cycle 910 may include a delay of H×MRI×NP, where an NP and MRI may be an index that may be configured by higher layer signaling. A WB CQI and/or PMI may be reported again after a WB CQI and/or PMI cycle 912. The WB CQI and/or PMI cycle 912 may include a delay of H×NP. H may be calculated by J×K+1, where J may be the number of bandwidth portions and/or K may be the number of repetitions. H may be a value of one where there is no SB CQI reported after the WB CQI or PMI. An SB CQI may be reported again after an SB CQI cycle 914. The SB CQI cycle include a delay of NP.

PUSCH may be used for subband reporting. PUCCH may be used for wideband reporting. Aperiodic feedback may be requested by DCI Format 0 or DCI format 4. The aperiodic feedback may be requested when the CQI request bit is set. It may be transmitted on the PUSCH. Periodic PUCCH feedback may be extended to include other feedback types. The feedback types may include CQI feedback for WTRU selected sub-bands, subband CQI and second PMI feedback, wideband CQI and PMI feedback, wideband PMI feedback, RI feedback, wideband CQI, RI and wideband PMI feedback, and/or RI and precoding type indicator (PTI) feedback. In a report that includes RI and PTI feedback, the PTI may be used for 8 transmit antenna ports, since 8 Tx precoder may be defined with dual codebook.

In a communications system, multiple antenna transmission schemes (e.g., MIMO schemes) may be used to handle various WTRU channel characteristics and/or system environments. The schemes may be categorized into open-loop and/or closed-loop schemes. A closed-loop scheme may use CSI feedback from a WTRU. The CSI feedback may be used to increase peak/average data rate, for example, by optimizing precoding weight and/or rank according to the channel condition. An open-loop scheme may provide robustness when a CSI may be unavailable at a base station. In a communications system, codebook based precoding may be adopted as a closed-loop multiple antenna transmission scheme. Space-time block code and/or cyclic-delay diversity (CDD) based precoding may be used for open-loop schemes.

Space-time block coding may be used to increase spatial diversity gain by transmitting multiple copies of a data stream with a spatial modulation across a number of antennas. A WTRU may receive the data stream through different spatial channel that may improve the reliability of data-transfer. The reliability of the data-transfer may be improved since there may be a higher chance to receive the data stream in one spatial channel if another spatial channel suffers from deep fading. An example of space-time frequency block code for 2Tx, where CRS ports {0, 1} may be used for demodulation, may be illustrated in Equation 3:

$$\frac{1}{\sqrt{2}}\begin{bmatrix} S_1 & -S_2^* \\ S_2 & S_1^* \end{bmatrix} \quad \text{Equation 3}$$

An example of space-time frequency block code for 4Tx, where CRS ports {0, 1, 2, 3} may be used for demodulation, may be illustrated in Equation 4:

$$\frac{1}{\sqrt{2}}\begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix} \quad \text{Equation 4}$$

In Equation 3 and Equation 4, * may denote a complex conjugate and S may indicate a symbol.

Cyclic delay diversity (CDD) may be a transmit diversity mechanism that may be implemented by applying a different phase delay (e.g., cyclic phase delay) for each OFDM subcarrier. CDD may be used in spatial multiplexing to increase diversity between two spatial paths. For example, one antenna may transmit a copy of data and another antenna may transmit a cyclic shifted version of the data. For CDD-based precoding, time delay diversity may increase frequency selectivity. The time delay diversity may increase frequency selectivity by combining delayed signals at the receiver that may increase frequency selectivity of the channel.

TABLE 5 shows an example transmission mode and an associated DL MIMO transmission schemes for PDSCH transmissions.

TABLE 5

Transmission Modes

| Transmission mode (TM) | Transmission Scheme of PDSCH |
|---|---|
| 1 | Use single-antenna port, which may be referred to as port 0 |
| 2 | Use transmit diversity |
| 3 | Use transmit diversity if the associated rank indicator is 1, otherwise use large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise transmit diversity |
| 8 | If the WTRU is configured without PMI/RI reporting: if the number of PBCH antenna ports is one, single-antenna port, port 0; otherwise transmit diversity<br>If the WTRU is configured with PMI/RI reporting: closed-loop spatial multiplexing |
| 9 | If the WTRU is configured without PMI/RI reporting: if the number of PBCH antenna ports is one, single-antenna port, port 0; otherwise transmit diversity<br>Closed-loop spatial multiplexing with up to 8 layer transmission, ports 7-14 |

Transmission modes one through six may use CRS for demodulation and/or measurement. For transmission modes seven and/or eight, the CRS may be used for measurement and/or DM-RS may be used for demodulation. Transmission mode nine may use DM-RS for demodulation and/or CSI-RS for measurement. When a MIMO transmission scheme is applied to PDSCH transmission, according to TABLE 5 if the corresponding transmission mode is configured for PDSCH transmission, the same MIMO transmission scheme may be applied to other types of transmission, such as BCH and/or L1/L2 control signaling, for example. As such, transmit diversity may be applied for the control channel regardless of the physical downlink shared channel transmission mode which may be used. Transmit diversity may use the signals that originate from multiple sources that have been modulated with the same information-bearing signals and that may vary in their transmission characteristics. Transmit diversity may be used to overcome the adverse effects from wireless multi-path channels. When using diversity transmission and reception, the amount of received signal improvement may depend on the degree of freedom of the MIMO channel and/or correlation properties of transmit antennas. Although a MIMO transmission scheme may be associated with a transmission mode, transmission modes three through nine may fall-back to transmit diversity without transmission mode reconfiguration.

A two-dimensional antenna configuration may be implemented for communications in a wireless communications system. An antenna may include a column of vertical stacked dipoles or patch-elements in front of a reflector, which may create a beam having a vertical beamwidth and/or a horizontal beamwidth. The column of dipoles may include four vertical stacked dipoles. The beam may be approximately ten to fifteen degrees vertical beamwidth and/or around seventy-five degrees horizontal beamwidth. The two-dimensional antenna may be used to cover a cell sector. The cell sector may be a 120-degree sector. The antenna area may be increased or decreased in the horizontal and/or vertical dimension. The antenna area may be increased and/or decrease and may still cover the same sector. This antenna configuration may be referred to as a grid-antenna or planar array antenna. The antenna elements may be uniformly distributed (e.g., in XZ plane) at the base station.

Electrical down-tilt may be applied by feeding two or three baseline antennas with appropriately phased replicas of the same signal. The appropriate phase-offset may be given by Equation 5:

$$\varphi_{e1} = \frac{2\pi d_z}{\lambda} \sin(\theta_{downtilt}),\qquad\text{Equation 5}$$

where $\theta_{downtilt}$ downtilt may be the downtilt angle, $d_z$ may be the distance between the baseline antennas in a Z-plane, and/or may be the wavelength. By downtilting the effective path-loss, slope may be increased which may increase cell isolation and may allow increased cell load. The use of downtilt may result in an increased network capacity. By stacking antennas horizontally, an antenna array may be created which may be used for smart antenna techniques. One such technique may include beamforming, whereby the signals transmitted to a mobile station may be phased in accordance with the position of the mobile-station. Beamforming may be performed using Equation 6:

$$\varphi_{az} = \frac{2\pi d_x}{\lambda} \cos(\phi_{MS}),\qquad\text{Equation 6}$$

where $\phi_{MS}$ may be the azimuth angle for a WTRU and/or $d_x$ may be the distance between the baseline antennas in the X-plane. In this antenna configuration, the covariance of MIMO channel may have a structure that may be implemented for WTRU feedback of channel state information.

Figure 10A:
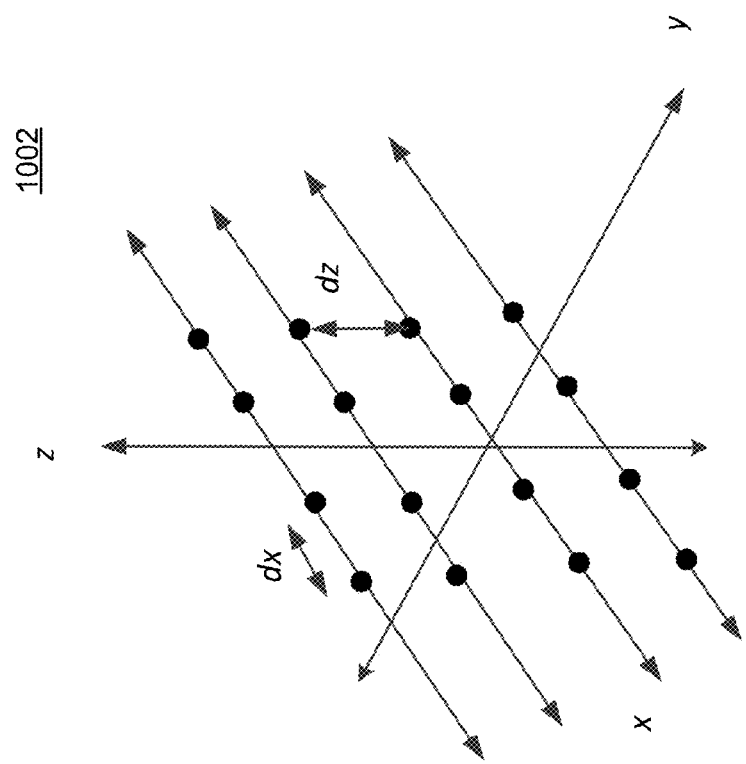
FIGS. 10A-10C are graphs illustrating example forms of beamforming.
Figure 10B:
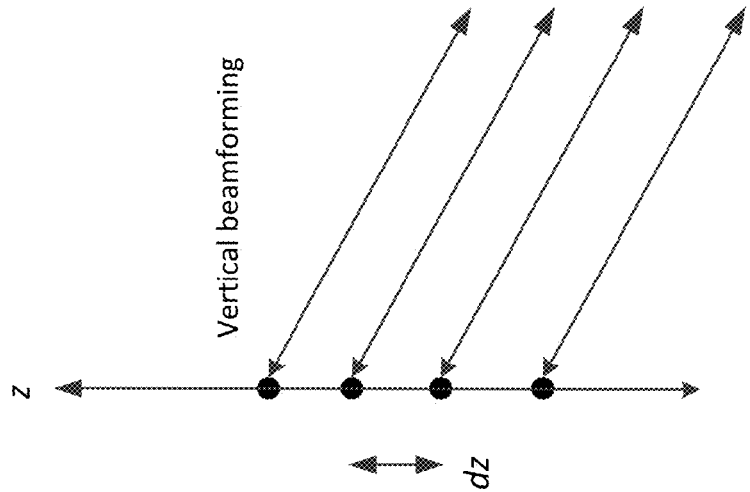
Figure 10C:
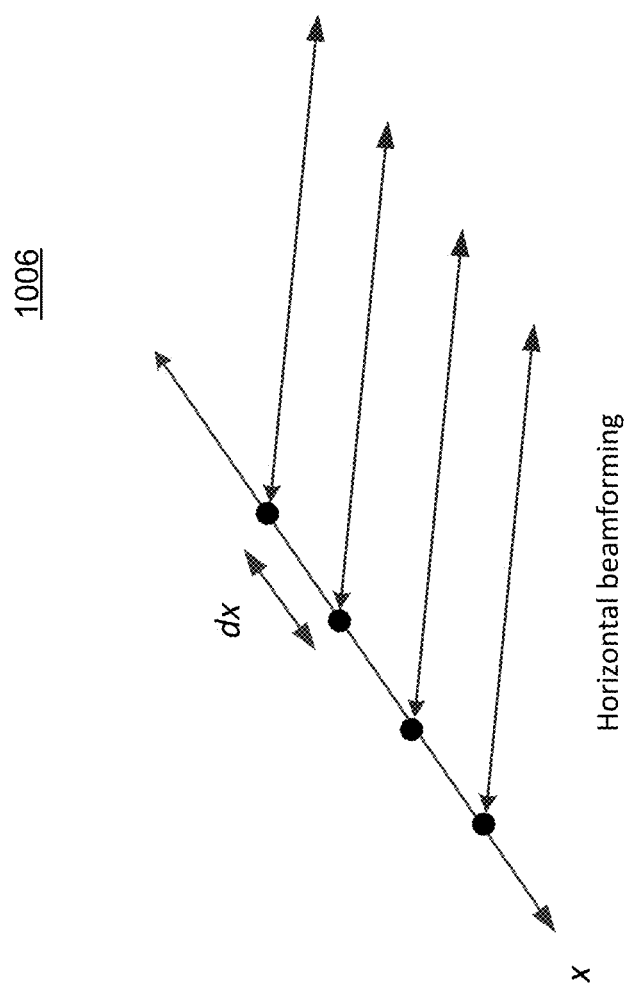

FIGS. 10A-10C illustrate example forms of beamforming. FIG. 10A is a graph 1002 depicting an example of a uniform planary array (UPA) on an XZ-plane. The graph 1002 includes sixteen points. Each point may indicate an antenna port in a two-dimensional antenna configuration. Four antennas may be configured to transmit in each row of graph 1002. Four antennas may be stacked for transmission in each column of graph 1002. The distance dx may be the distance between two adjacent antenna ports on the x-axis. The distance dz may be the distance between two adjacent antenna ports on the z-axis.

FIG. 10B is a graph 1004 depicting an example for vertical beamforming. The graph 1004 includes four points on the z-axis. Each point on the z-axis may indicate a location of an antenna port in a vertical antenna configuration. Four antennas may be stacked for transmission in graph 1004. The distance dz may be the distance between two adjacent antenna ports on the z-axis.

FIG. 10C shows an example of horizontal beamforming. The graph 1006 includes four points on the x-axis. Each point on the x-axis may indicate a location of an antenna port in a horizontal antenna configuration. Four antennas may be aligned for transmission in graph 1004. The distance dx may be the distance between two adjacent antenna ports on the x-axis.

In three-dimensional channel modeling, the departure and arrival angles may be modeled using the azimuth angle in the XY-plane and/or the elevation angle with respect to the Z axis. The XYZ-plane (e.g., cartesian coordination) may be converted to a spherical coordinate.

Figure 11:
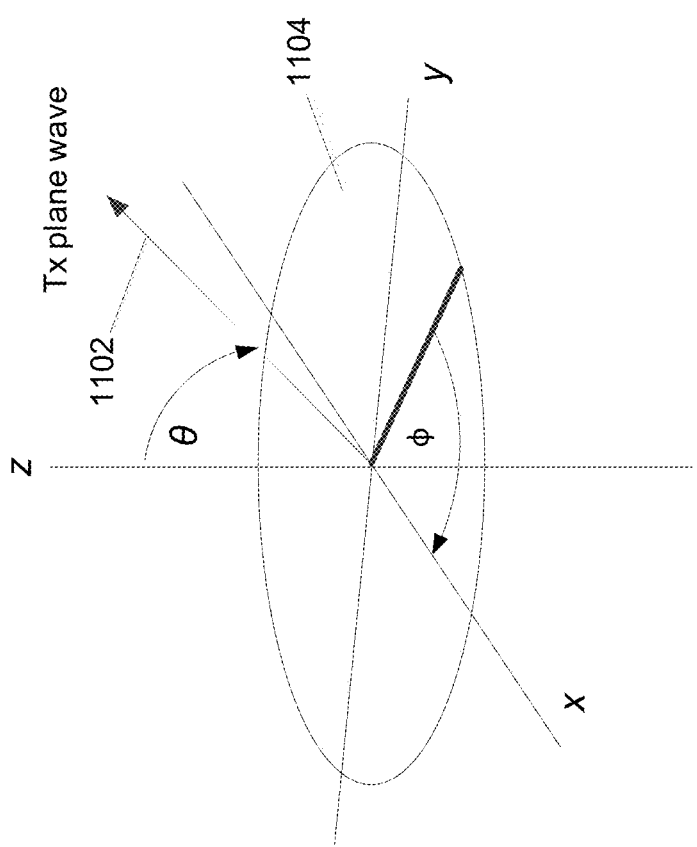
FIG. 11 is a graph illustrating an example of a three-dimensional spherical coordinate system for a channel model.

FIG. 11 is a diagram illustrating an example of a three-dimensional spherical coordinate system for a channel model. As shown in FIG. 11, a transmission plane may include three-dimensional characteristics. A transmission wave 1102 in the communication plane may be located at an angle Φ from the x-axis on the XY-plane 1104. The transmission wave may be elevated to an angle θ from the z axis.

When modeling a three-dimensional channel model, the full 3D antenna response of the mobile antennas may be taken into account. The channel coefficients (e.g., WINNER-II channel model) from Tx antenna element s to Rx antenna element u for cluster n may be given as shown in Equation 7:

$$h_{u,s,n}^{3D}(t;\tau) = \sum_{m=0}^{M-1} g(\theta_{n,m}^s, \phi_{n,m}^s, \theta_{n,m}^u, \phi_{n,m}^u) \qquad\text{Equation 7}$$

$$\exp^{(jk_{n,m}^{AoA} \circ r_u)} \exp^{(jk_{n,m}^{AoD} \circ r_s)} \exp^{(-j\frac{2\pi}{\lambda} v_{n,m} t)} \delta(\tau - \tau_{n,m}),$$

where $$k_{n,m}^{AOA} = -\frac{2\pi}{\lambda}[\sin\theta_{n,m}^u \cos\phi_{n,m}^u,\ \sin\theta_{n,m}^u \sin\phi_{n,m}^u,\ \cos\theta_{n,m}^u]$$

may be the angle of arrival (AoA) unit vector or wavenumber corresponding to direction ($\theta_{n,m}^u$, $\phi_{n,m}^u$), $$k_{n,m}^{AOD} = -\frac{2\pi}{\lambda}[\sin\theta_{n,m}^s \cos\phi_{n,m}^s,\ \sin\theta_{n,m}^s \sin\phi_{n,m}^s,\ \cos\theta_{n,m}^s]$$

may be the angle of departure (AoD) unit vector respectively, ○ may be denoted as Hadamard vector operation, $v_{n,m}$ may be the Doppler frequency of ray n, m, $r_s$, $r_u$ may be the location vectors of element s and u in the XYZ-plane (cartesian coordination) respectively, and/or the scalar may be expressed as shown in Equation 8 (e.g., by expressing the response vector in spherical components):

$$g(\theta^s_{n,m}, \phi^s_{n,m}, \theta^u_{n,m}, \phi^u_{n,m}) = \begin{bmatrix} \chi^V_u \\ \chi^H_u \end{bmatrix} \begin{bmatrix} \alpha^{VV}_{n,m} & \alpha^{VH}_{n,m} \\ \alpha^{HV}_{n,m} & \alpha^{HH}_{n,m} \end{bmatrix} \begin{bmatrix} \chi^V_s \\ \chi^H_s \end{bmatrix}, \quad \text{Equation 8}$$

$$\text{where } \begin{bmatrix} \chi^V_u \\ \chi^H_u \end{bmatrix} = \begin{bmatrix} \cos\varsigma\sin\theta^u_{n,m} + \sin\varsigma\cos\theta^u_{n,m}\sin\phi^u_{n,m} \\ \sin\varsigma\cos\phi^u_{n,m} \end{bmatrix},$$

$$\begin{bmatrix} \chi^V_s \\ \chi^H_s \end{bmatrix} = \begin{bmatrix} \cos\varsigma\sin\theta^s_{n,m} + \sin\varsigma\cos\theta^s_{n,m}\sin\phi^s_{n,m} \\ \sin\varsigma\cos\phi^s_{n,m} \end{bmatrix},$$

$\alpha^{VV}_{n,m}$, $\alpha^{VH}_{n,m}$ may be the complex gain of vertical-to-vertical and vertical-to-horizontal polarizations of ray n,m respectively and $\varsigma$ may be the angle of an ideal dipole antenna with polarization vector p tilted from the Z axis. $\tau_{n,m}$ may be the m-th multipath delay in the nth cluster.

Figure 12:
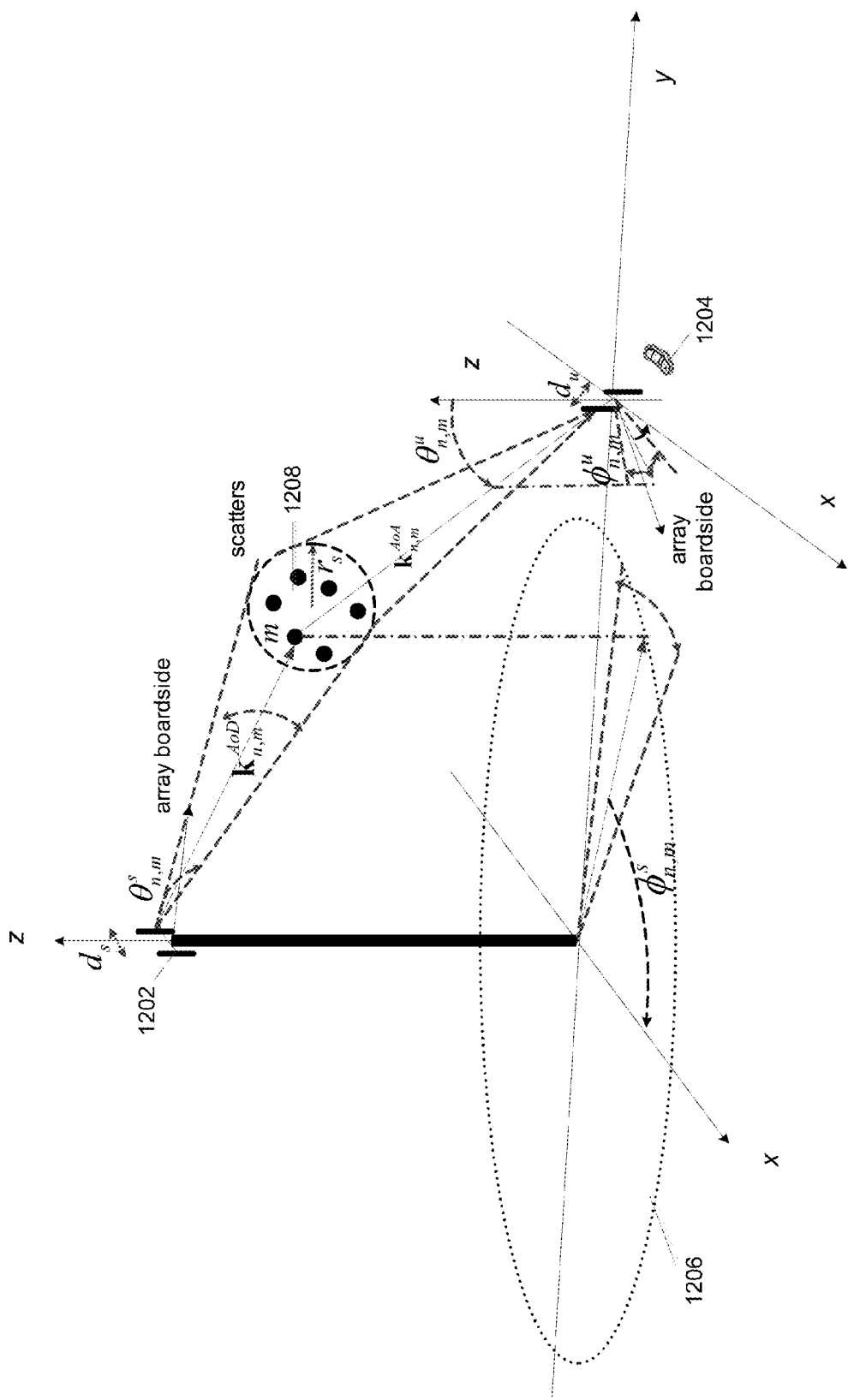
FIG. 12 is a graph illustrating an example of a three-dimensional channel model.

FIG. 12 is a diagram illustrating an example of a three-dimensional channel model. The three dimensional channel model shows communications that may be transmitted from a base station 1202 to a WTRU 1204. The base station 1202 may transmit information from multiple antennas. The transmissions may be sent along different paths on the XY-plane 1206. The elevation characteristics may be measured on the z-axis of the three-dimensional plane. The transmissions may scatter in different directions along the three-dimensional plane based on the initial transmission direction and/or interference along those paths. The scattered transmissions may be grouped into clusters, such as cluster 1208. The scattered transmissions may be received at multiple antennas at the WTRU 1204.

As illustrated in FIG. 12, $\theta^u_{n,m}$ may be the elevation (e.g., vertical) angle of arrival (EAoA) of the nth cluster of the m-the path receive at uth antenna element. $\theta^s_{n,m}$ may be the elevation angle of departure (EAoD) of the nth cluster of the m-the path transmit at the sth antenna element. $\phi^u_{n,m}$ may be the azimuth angle of departure (A-AoA) of nth cluster of m-the path transmit at the uth antenna element. $\phi^s_{n,m}$ may be the azimuth angle of departure (A-AoD) of the nth cluster of the m-the path transmit at the sth antenna element. $k^{AoA}_{n,m}$ may be the AoA unit vector of the nth cluster of the m-the path. $k^{AoD}_{n,m}$ may be the AoD unit vector of the nth cluster of the m-the path. $r_s$ may be the radius of scatters. $d_u$ may be the receive antenna spacing. $d_s$ may be the transmit antenna spacing.

If there are $N_c$ clusters, the three-dimensional MIMO channel model may be expressed as $$h_{u,s}(t,\tau) = \sum_{n=0}^{N_C-1} h_{u,s,n}(t,\tau).$$

For urban macro-cell channel, the number of clusters may be assumed to be one, e.g., the channel coefficient between s transmit antenna and u receive antenna may be equal to $h_{u,s}(t,\tau) = h_{u,s}^{3D}(t; \tau)$. The underscript notation n may be dropped for urban macro-cell channel and the 3D channel model is simplified as shown in Equation 9:

$$h_{u,s}(t;\tau) = \sum_{m=0}^{M-1} g(\theta^s_m, \phi^s_m, \theta^u_m, \phi^u_m) \quad \text{Equation 9}$$

$$\exp^{(jk^{AoA}_m \circ r_u)} \exp^{(jk^{AoD}_m \circ r_s)} \exp^{(-j\frac{2\pi}{\lambda}v_m t)} \delta(\tau - \tau_m),$$

A two-dimensional antenna configuration may allow multi-antenna transmissions from a larger number of antennas at a base station transmitter with limited space by implementing antennas in the horizontal and/or vertical dimensions. A precoder may support horizontal and/or vertical beamforming. A transmitter may support horizontal and/or vertical beamforming. A codebook may support a larger number of antenna ports (e.g., larger than 8 antenna ports) when horizontal and/or vertical beamforming are implemented in a two-dimensional antenna configuration. Associated CSI feedback procedures may be used for horizontal and/or vertical beamforming.

Reference signals may be implemented for a WTRU to report CSI feedback using the two-dimensional antenna configuration. Due to the larger number of antenna ports (e.g., larger than 8) in a two-dimensional antenna configuration as compared to a one-dimensional antenna configuration, the reference signal overhead may increase as the number of antenna ports increase. Reference signal overhead may be reduced for two-dimensional antenna configurations, while minimizing performance impacts.

When a two-dimensional antenna configuration is implemented, transmission schemes may implement three-dimensional MIMO. A transmit diversity scheme may support multiple antenna ports, such as two or four antenna ports. Space-frequency block codes (SFBC) may be used in the case of two antenna ports, as illustrated in Equation 3 for example. A combination of SFBC and frequency-switched transmit diversity (FSTD) may be used in the case of 4 antenna ports, as illustrated in Equation 4 for example. Transmit diversity schemes may be implemented for the antennas. The transmit diversity schemes may use CRS to perform channel estimation at a WTRU receiver. Stand-alone carrier type (CT) that may be transmitted for demodulation may rely on reference signaling other than CRS, so a non-CRS based transmit diversity scheme may be implemented. The stand-alone CT may transmit no CRS for demodulation. Transmit diversity schemes in a two-dimensional antenna configuration may be implemented to adapt to the control channel. The transmit diversity schemes in a two-dimensional antenna configuration may implement a fallback transmission from PDSCH transmission. A multi-user MIMO (MU-MIMO) transmission scheme may be implemented in the horizontal domain. MU-MIMO transmission schemes in two-dimensional antenna configuration may be used to exploit MU diversity in the two-dimensional spatial domain.

If $N_h \times N_v$ antenna elements/ports are used at the base station, precoding weights for the antenna ports may be defined to form a beam, where $N_h$ and $N_v$ may denote the number of antenna elements/ports in a horizontal and a vertical domain, respectively. The total number of transmit antenna elements/ports in two-dimensional domain may be $N_t = N_h \times N_v$. If multiple layers (e.g., multiple ranks or multiple data streams) are transmitted, the precoding weights may be used per layer. This may call for $N_h \times N_v \times N_{rank}$ precoding weights, where $N_{rank}$ may be the number of transmission layers or data streams transmitted together in the same time/frequency resource through multiple transmit antenna ports. A rank may include a number of data streams and/or number of layers, which may be used interchangeably.

The antenna configuration of $N_h \times N_v$ may be indicated to a WTRU. A WTRU may use blind detection to measure the number of antenna ports from a broadcasting channel or the reference signal which may be transmitted in a predefined subframe. The broadcasting channel may include a master information block (MIB) and/or a system information block (SIB) that may indicate the number of antenna ports. The SIB may be an SIB-x, where x may indicate a number associated with the SIB. For example, the SIB-x may be a number of SIBs from SIB-1 to SIB-12. A WTRU may receive the antenna configuration information from the broadcasting channel. A WTRU may receive the antenna configuration information from higher layer signaling, such as the RRC layer signaling for example. A WTRU may detect the antenna configuration implicitly. The WTRU may implicitly detect the antenna configuration based on the configuration of the CSI-RS. A non-zero power CSI-RS configuration may include the antenna configuration.

The codebook-based precoding may be used by the transmitting unit, such as the base station for example, for multiplexing (e.g., precoding) data streams and/or forming beams prior to transmission. The beams may be formed with a limited CSI feedback from a WTRU. The codebook-based precoding may be used by the receiving unit, such as the WTRU for example, to demultiplex the received data streams. The receiving unit may send feedback to the transmitting unit that may indicate precoder information within the codebook that may be determined and/or selected based on the current channel condition estimated at the WTRU. The WTRU may determine and/or select a PMI. The PMI may satisfy a predefined condition at the WTRU. For example, the PMI may indicate a precoder vector/matrix within the codebook that may be used to provide the highest throughput performance with a measured channel. The predefined condition may indicate a PMI value within a subset of the codebook that may be used to provide the highest throughput performance, an undesired PMI value, and/or the like.

The codebook structure or precoder structure may include multiple components. The $N_h \times N_v \times N_{rank}$ precoding weights may be determined using a composition of multiple codebook components. The composition of multiple codebook components may imply that the $N_h \times N_v \times N_{rank}$ precoding weights may be determined by a composition of one or more precoding weights from one or more of the codebook components. For example, $N_h \times N_v$ precoding weights may be determined by the number of precoding weights $N_h$ from a first codebook component and the number of precoding weights $N_v$ from a second codebook component. The codebook structure may include two or more codebook components. The composite codebook $V_c$ for a two-dimensional antenna configuration may be defined as a function of two components codebooks, such as a vertical codebook $V_v$ and a horizontal codebook $V_h$. The vertical codebook $V_v$ may refer to a codebook for vertical antennas. The horizontal codebook $V_h$ may refer to a codebook for horizontal antennas. The composite codebook may be expressed as $V_c = f(V_h, V_v)$, where the Kronecker product may be used as a function for $f(\cdot)$. If a Kronecker product is used as a function for $f(\cdot)$, the composite precoder codebook may be expressed as $V_c = V_h \otimes V_v$. Another example for the function $f(\cdot)$ may be an inner product of the matrices.

Multiple functions $f(\cdot)$ may be used. For example, a system configuration may implicitly define which function may be used to form the composite codebook $V_c$. The system configuration may include a number of antenna ports, an antenna configuration, and/or a transmission mode. The number of antenna ports may indicate the number of vertical antennas and/or the number of horizontal antennas. The antenna configuration may indicate a one-dimensional antenna configuration, a two-dimensional antenna configuration, or other antenna configuration. The transmission mode may be configured for PDSCH transmission. An indication bit may be included in the broadcasting channel or higher layer signaling (e.g., RRC) that may indicate the antenna configuration. The broadcasting channel may include an MIB or an SIB-x.

The indicated antenna configuration may be used to determine the codebook structure at the receiving unit. The codebook may be a Kronecker product based multi-component codebook. The Kronecker product may be used as a composition of codebook components. For example, two codebook components may be defined as a first component codebook and a second component codebook. One component codebook may be a horizontal codebook $V_h$ and/or another component codebook may be a vertical codebook $V_v$. The horizontal codebook $V_h$ may be a vector or a matrix for the number of antenna elements/ports in the horizontal domain $N_h$. The vertical codebook $V_v$ may be a vector or a matrix for the number of antenna elements/ports in the vertical domain $N_v$. By using the Kronecker product, the composite codebook $V_c$ may be defined as shown in Equation 10:

$$V_c = V_h \otimes V_v, \quad \text{Equation 10}$$

where $\otimes$ may denote the Kronecker product. In the case of single layer (e.g., rank-1) transmission, the $N_t \times 1$ precoding weights for the composite codebook $V_c$ may be generated from the Kronecker product of the horizontal codebook $V_h$ and the vertical codebook $V_v$, where the horizontal codebook $V_h$ and the vertical codebook $V_v$ may be the $N_h \times 1$ vector and the $N_v \times 1$ vector, respectively. According to the antenna indexing in the vertical and the horizontal domain, the order of the Kronecker product may be changed to be opposite as shown in Equation 11:

$$V_c = V_v \otimes V_h. \quad \text{Equation 11}$$

The component codebook may be a vector or matrix based on rank transmissions that are higher than one. The rank may include the number of data streams in the horizontal domain and/or the vertical domain. In the horizontal domain, the maximum transmission rank may be a min($N_h$, $N_r$), where $N_r$ may denote the number of antennas at a receiving unit. An example codebook is shown in TABLE 6, where the number of transmit antennas in the horizontal domain $N_h$ and the number of antennas in the vertical domain $N_v$ may or may not be the same.

TABLE 6

Kronecker Product Based Codebook

| Rank | $V_c$ | $V_h$ | $V_v$ |
|---|---|---|---|
| 1 | $V_v^1 \otimes V_h^1$ | $V_h^1 = N_h \times 1$ | $V_v^1 = N_v \times 1$ |
| 2 | $V_v^1 \otimes V_h^2$ | $V_h^2 = N_h \times 2$ | $V_v^1 = N_v \times 1$ |
| . | . | . | . |
| . | . | . | . |
| . | . | . | . |
| $N_{rank}$ | $V_v^1 \otimes V_h^{N_{rank}}$ | $V_h^{N_{rank}} = N_h \times N_{rank}$ | $V_v^1 = N_v \times 1$ |

The codebook shown in TABLE 6 may be expanded for transmissions in the horizontal domain. In the vertical domain, the maximum transmission rank may be min($N_v$, $N_r$). The codebook for transmissions in the vertical domain may be expanded similar to the codebook shown in TABLE 6, where $V_h^1 = N_h \times 1$ may be fixed for higher rank transmission and the vertical codebook $V_v$ may be determined according to the rank as $V_v^{Nrank} = N_v \times N_{rank}$.

The rank may be expanded in a codebook in the vertical and the horizontal domain. The maximum transmission rank may be min($N_t$, $N_r$). Portions of the codebook may be implemented for odd-numbered rank and/or even-numbered rank, such as when the rank is higher than 2 for example. TABLE 7 shows codebook examples for odd-numbered rank and even-numbered rank. As shown in TABLE 7, the composite codebook may be defined as $V_v^{Nrank/2} \otimes V_h^{Nrank/2}$ an even numbered rank. For an odd-numbered rank, the codebook may be a combination of even-numbered rank codebook and odd-numbered rank codebook. TABLE 7 shows examples of how the even-numbered rank and odd-numbered rank may be combined. As also shown in TABLE 7, the codebook for $N_{rank}$ may be defined and a lower rank in the codebook may be a column subset of the $N_{rank}$ in a codebook. For example, the rank-3 codebook may be defined by selecting three columns of $N_{rank}$ codebook, such as when the $N_{rank}$ codebook is larger than three for example. While TABLE 7 shows multiple examples for calculating a composite codebook $V_c$ based on rank, one or both examples may be included in a codebook for calculating the composite codebook $V_c$.

TABLE 7

Kronecker Product Based Codebook

| Rank | $V_c$ | $V_c$ |
|---|---|---|
| 1 | $V_c^1 = V_v^1 \otimes V_h^1$ | $V_c^1 = V_c^{Nrank}$ (column subset) |
| 2 | $V_c^2 = V_v^1 \otimes V_h^2$ | $V_c^2 = V_c^{Nrank}$ (column subset) |
| 3 | $V_c^3 = [V_c^1, V_c^2]$ | $V_c^3 = V_c^{Nrank}$ (column subset) |
| 4 | $V_c^4 = V_v^2 \otimes V_h^2$ | $V_c^4 = V_c^{Nrank}$ (column subset) |
| 5 | $V_c^5 = [V_c^2, V_c^3]$ | $V_c^5 = V_c^{Nrank}$ (column subset) |
| . | . | . |
| . | . | . |
| . | . | . |
| $N_{rank} - 1$ | $V_c^{Nrank-1} = [V_c^{\lfloor Nrank/2 \rfloor}, V_c^{\lceil Nrank/2 \rceil}]$ | $V_c^{Nrank-1} = V_c^{Nrank}$ (column subset) |
| $N_{rank}$ | $V_c^{Nrank} = V_v^{Nrank/2} \otimes V_h^{Nrank/2}$ | $V_c^{Nrank} = V_v^{Nrank/2} \otimes V_h^{Nrank/2}$ |

The horizontal codebook $V_h$ and the vertical codebook $V_v$ may have the same codebook structure. If the number of antenna elements/ports (e.g., $N_h$ and/or $N_v$) is larger than 2, the component codebook may be split into sub-component codebooks. The sub-component codebook for the horizontal domain may be referred to as $w^h$. The sub-component codebook for the vertical domain may be referred to as $w^v$. The composite codebook structure may be expressed as $V_c = f(g(w^h, V_h^c), g(w^v, V_v^c))$, where $V_h = g(w^h, V_h^c)$ and $V_v = g(w^v, V_v^c)$ and where the function $g(\cdot)$ denotes a function to determine a component codebook structure with a sub-component codebook. If $g(\cdot)$ is a Kronecker product based codebook, the composite codebook $V_c$ may be expressed as $V_c = (w^h \otimes V_h^c) \otimes (w^v \otimes V_v^c)$. If a Kronecker-based codebook for a component codebook is determined as described herein, the sub-component codebook for the horizontal domain $w^h$ and/or the sub-component codebook for the vertical domain $w^v$ may be co-phasing vectors/matrices that may be used to vary the phases of the signals transmitted from the polarized antenna elements/ports. The phases may be aligned for transmissions in polarized antenna elements/ports to increase beam gain. The precoding vector/matrix $V_h^c$ may be the precoding vector/matrix for the portion of the composite codebook $V_c$ that may correspond to the horizontal domain. The precoding vector/matrix $V_h^c$ may be the precoding vector/matrix of $N_h/2$. The precoding vector/matrix $V_v^c$ may be the precoding vector/matrix for the portion of the composite codebook $V_v^c$ that may correspond to the vertical domain. The precoding vector/matrix $V_v^c$ may be the precoding vector/matrix of $N_v/2$.

The $g(\cdot)$ may be defined as at least one of the forms shown in TABLE 8. The co-phasing sub-component codebook $w^h$ may be represented as $$\begin{bmatrix} 1 \\ \alpha \end{bmatrix},$$

where $\alpha$ may denote a co-phasing value that may be used to vary the phase of the signals transmitted from the polarized antenna elements/ports (e.g., V-pol and H-pol). The phases may be aligned for transmissions in the polarized antenna elements/ports to increase beam gain. The codebook structure shown in TABLE 8 may be used for cross-polarized antenna elements, such as in one antenna dimension or a multi-antenna dimension.

TABLE 8

Examples for Component Codebook Structure

| Kronecker product form | Inner product form | Combined form |
|---|---|---|
| $V_h = \begin{bmatrix} 1 \\ \alpha \end{bmatrix} \otimes V_h^c$ | $V_h = \begin{bmatrix} V_h^c & 0 \\ 0 & V_h^c \end{bmatrix} \begin{bmatrix} 1 \\ \alpha \end{bmatrix}$ | $V_h = \begin{bmatrix} V_h^c \\ \alpha V_h^c \end{bmatrix}$ |

The $\alpha$ may be defined as $\alpha = e^{-j\theta_k}$, $k=0, 1, \ldots, N_c-1$, where $N_c$ may denote the size of a sub-component co-phasing codebook and $j$ may be an imaginary number value.

Codebook structures may be implemented for a multi-dimensional (e.g., two-dimensional) cross-polarized antenna configuration. If the component codebooks are defined as Kronecker product based, the composite codebook $V_c$ for a two-dimensional cross-polarized antenna configuration may be defined as shown in Equation 12:

$$V_c = \left( \begin{bmatrix} 1 \\ \alpha \end{bmatrix} \otimes V_h^c \right) \otimes \left( \begin{bmatrix} 1 \\ \beta \end{bmatrix} \otimes V_v^c \right), \quad \text{Equation 12}$$

where the $\alpha$ and/or $\beta$ may be one of $e^{-j\theta_k}$, $k=0, 1, \ldots, N_c-1$. Antenna correlation between polarized antennas may be relatively low as compared to co-polarized antennas. The composite codebook $V_c$ may be expressed as shown in Equation 13:

$$V_c = (w_{2 \times 1}^h \otimes V_h^c) \otimes (w_{2 \times 1}^v \otimes V_v^c). \quad \text{Equation 13}$$

A set of co-phasing vectors may be included in a codebook. A co-phasing vector may be selected for each sub-component codebook of a codebook. TABLE 9 shows an example of co-phasing vectors as a codebook. The co-phasing vector may be extended to matrices to support higher rank transmission (e.g., higher than one). For example, the co-phasing vector may be used in the horizontal or vertical domain for a one-dimensional transmission, while the co-phasing matrix may be used in the horizontal and vertical domain for two-dimensional transmissions. The index may be used to indicate the co-phasing vector and/or co-phasing matrix. The index may be sent from the base station to the WTRU to indicate the co-phasing vector and/or co-phasing matrix to use for demodulation. The index may be sent in the feedback information from the WTRU to the base station to indicate a preferred co-phasing vector and/or co-phasing matrix. While TABLE 9 shows a codebook for a one-dimensional and a two-dimensional antenna configuration, the codebook may be extended past a two-dimensional antenna configuration. The composite codebook may be defined as $V_c = (w^h \otimes V_h^c) \otimes (w^v \otimes V_v^c)$.

TABLE 9

Example of the Co-phasing Sub-component Vector/Matrix as a Codebook

| Index | co-phasing vector | co-phasing matrix |
|---|---|---|
| 0 | $\begin{bmatrix} 1 \\ 1 \end{bmatrix}$ | $\begin{bmatrix} 1 & 1 \\ 1 & -1 \end{bmatrix}$ |
| 1 | $\begin{bmatrix} 1 \\ -1 \end{bmatrix}$ | $\begin{bmatrix} 1 & 1 \\ j & -j \end{bmatrix}$ |
| 2 | $\begin{bmatrix} 1 \\ j \end{bmatrix}$ | |
| 3 | $\begin{bmatrix} 1 \\ -j \end{bmatrix}$ | |

Antenna partitioning based multi-component codebooks may be used. An antenna partitioning matrix for a multi-dimensional (e.g., two-dimensional) antenna configuration may be used to select a subset of antenna ports for transmissions. A WTRU may report a precoding weight for the reduced number of antenna ports, which may allow reduced complexity for CSI feedback calculation and/or flexible multi-user scheduling.

The antenna partitioning matrix may be defined as an $N_h \times N_v$ or an $N_v \times N_h$ matrix. Each antenna port in the matrix may have a '0' or '1' to indicate which antenna ports are selected. For example, if a 4×4 two-dimensional antenna configuration is used, a set of antenna partitioning matrices may be defined as a codebook as shown in the TABLE 10.

TABLE 10

Example Set of Antenna Partitioning Matrices (A)

| Index-0 | Index-1 | Index-2 | Index-3 |
|---|---|---|---|
| $\begin{bmatrix} 1 & 1 & 1 & 1 \\ 0 & 0 & 0 & 0 \\ 0 & 0 & 0 & 0 \\ 0 & 0 & 0 & 0 \end{bmatrix}$ | $\begin{bmatrix} 1 & 0 & 0 & 0 \\ 1 & 0 & 0 & 0 \\ 1 & 0 & 0 & 0 \\ 1 & 0 & 0 & 0 \end{bmatrix}$ | $\begin{bmatrix} 1 & 0 & 1 & 0 \\ 0 & 1 & 0 & 1 \\ 1 & 0 & 1 & 0 \\ 0 & 1 & 0 & 1 \end{bmatrix}$ | $\begin{bmatrix} 0 & 1 & 0 & 1 \\ 1 & 0 & 1 & 0 \\ 0 & 1 & 0 & 1 \\ 1 & 0 & 1 & 0 \end{bmatrix}$ |

| Index-4 | Index-5 | Index-6 | Index-7 |
|---|---|---|---|
| $\begin{bmatrix} 1 & 1 & 0 & 0 \\ 1 & 1 & 0 & 0 \\ 0 & 0 & 0 & 0 \\ 0 & 0 & 0 & 0 \end{bmatrix}$ | $\begin{bmatrix} 0 & 0 & 0 & 0 \\ 0 & 0 & 0 & 0 \\ 1 & 1 & 0 & 0 \\ 1 & 1 & 0 & 0 \end{bmatrix}$ | $\begin{bmatrix} 0 & 0 & 1 & 1 \\ 0 & 0 & 1 & 1 \\ 0 & 0 & 0 & 0 \\ 0 & 0 & 0 & 0 \end{bmatrix}$ | $\begin{bmatrix} 1 & 1 & 1 & 1 \\ 1 & 1 & 1 & 1 \\ 1 & 1 & 1 & 1 \\ 1 & 1 & 1 & 1 \end{bmatrix}$ |

The antenna partitioning matrix may be defined as an $N_t \times N_t$ diagonal matrix. The diagonal elements may be '0' or '1' according the selection of antenna ports. $A_p = \text{diag}(A)$ may be used to represent the diagonal antenna partitioning matrix. For example, the index-0 antenna partitioning matrix (A) may be represented as a diagonal antenna partitioning matrix ($A_p$), which may be expressed according to the mapping rule as a horizontal first or vertical first mapping. If a horizontal first mapping is used, the diagonal antenna partitioning matrix $A_p$ for the index-0 may be expressed as $A_p = \text{diag}([1\ 1\ 1\ 1\ 0\ 0\ 0\ 0\ 0\ 0\ 0\ 0\ 0\ 0\ 0\ 0])$, where the first row of the matrix may be followed by subsequent rows in the matrix. If vertical first mapping is used, the diagonal antenna partitioning matrix $A_p$ may be expressed as $A_p = \text{diag}([1\ 0\ 0\ 0\ 1\ 0\ 0\ 0\ 1\ 0\ 0\ 0\ 1\ 0\ 0\ 0])$, where the first column of the matrix may be followed by subsequent columns in the matrix. If an antenna partitioning matrix is configured, a receiving device may measure the channels from the partitioned number of antenna ports $N_L$, which may be the same as the number of non-zero elements in the antenna partitioning matrix.

The antenna partitioning may be performed using multiple antenna partitioned sets. The sets may be mutually exclusive, such that an antenna port in one set may be excluded in another set. The union of each antenna partitioned set may become the $N_h \times N_v$ antenna ports. For example, the antenna partitioned sets {index-4, index-5, index-6, and index-7} in Table 10 may be the selected antenna partitioned sets. The selected antenna partitioned set may be indicated to a WTRU. The selected antenna partitioned set may be indicated explicitly or implicitly. The WTRU may indicate a desired antenna partitioned set to the base station via feedback information.

A codebook may be established for a set of antenna partitioning matrices. The set of antenna partitioning matrices may be considered as a part of a codebook. A WTRU may report an index for an antenna partitioning matrix and/or a PMI which may be calculated based on the antenna partitioning matrix reported. A set of antenna partitioning matrices may include a matrix with each element in the matrix having the value '0'. Each element in the antenna partitioning matrix may indicate an antenna port. If a WTRU is configured with an antenna partitioning matrix with each element in the matrix having a value '0', the WTRU may refrain from reporting CSI and/or the WTRU may measure CSI-RS. A set of antenna partitioning matrices may include a matrix with each element in the matrix having a value '1' (e.g., as shown index-7 in the TABLE 10). If a WTRU is configured with an antenna partitioning matrix with each element in the matrix having a value 1', a WTRU may report CSI for the antennas without antenna partitioning. At least one antenna partitioning matrix in the set may be used to select horizontal antennas. In TABLE 10, index-0 may be an antenna partitioning matrix that may be used to select horizontal antennas. At least one antenna partitioning matrix in the set may be used to select vertical antennas. In TABLE 10, index-1 may be an antenna partitioning matrix that may be used to select vertical antennas. The selected number of antenna ports with antenna partitioning matrix may be one of a set of antenna ports, where the set of antenna ports may include {1, 2, 4, 8, 16, 64} for example.

The associated codebook may be different for the selected antenna partitioning matrix. A WTRU may determine an associated codebook according to the antenna partitioning or the selected antenna subset. The associated codebook may be different in terms of the number of antenna ports, codebook structure, and/or codebook type. If an antenna partitioning matrix index reduces antenna dimension from two-dimensions to one-dimension (e.g., such as index-0 and index-1 in TABLE 10) the codebook $V_v$ may be defined as described herein. For example, if the second dimension of a two-dimensional matrix is reduced to the horizontal dimension, as shown in index-0 in TABLE 10, the codebook may be defined as $V_c=V_h(i_h)$, where $i_h$ may denote an index for horizontal codebook $V_h$. If the second dimension of the two-dimensional matrix is reduced to the vertical dimension, as shown in index-1 in TABLE 10, the codebook may be defined as $V_c=V_v(i_v)$, where $i_v$ may denote an index for vertical codebook $V_v$.

TABLE 11 shows three types of composite codebooks that may be used according to the antenna partitioning matrix.

TABLE 11

Associated Codebook ($V_c$) According to the Antenna Partitioning Matrix

| Index set 1 | Index set 2 | Index set 3 |
|---|---|---|
| $V_h$ | $V_v$ | $f(V_h, V_v)$ |

When the composite codebooks in TABLE 11 are implemented, the CSI reporting types according to the associated codebook may be defined as illustrated in TABLE 12.

TABLE 12

Associated Codebook According to the Antenna Partitioning Matrix

| Index set 1 | Index set 2 | Index set 3 |
|---|---|---|
| $i_h$ | $i_v$ | $i_h$ and $i_v$ |

If a WTRU measures CSI from the partitioned number of antenna ports $N_L$, the codebook used for the partitioned number of antenna ports $N_L$ may be different according to the antenna partitioning matrix index as shown in TABLE 11. For example, if the partitioned number of antenna ports $N_L$ include the antenna ports in the horizontal domain, index-set 1 may be used to indicate a preferred precoding vector/matrix in the horizontal codebook $V_h$. If the partitioned number of antenna ports $N_L$ include the antenna ports in the vertical domain, index-set 2 may be used to indicate a preferred precoding vector/matrix in the vertical codebook $V_v$. If the partitioned number of antenna ports $N_L$ include the antenna ports in the horizontal domain and the vertical domain, index-set 3 may be used to indicate the composite codebook of horizontal and vertical component codebooks $f$ ($V_h$, $V_v$). If the composite codebook structure is $V_c=(w^h \otimes V_h^c) \otimes (w^v \otimes V_v^c)$, the associated codebook according to the antenna partitioning matrix may be determined or defined as shown in TABLE 13.

TABLE 13

Associated Codebook ($V_c$) According to the Antenna Partitioning Matrix with Sub-component Codebooks

| Case-1 | Case-2 | Case-3 | Case-4 | Case-5 | Case-6 |
|---|---|---|---|---|---|
| $g(w^h, V_h^c)$ | $g(w^v, V_v^c)$ | $V_h^c$ | $V_v^c$ | $f(V_h^c, V_v^c)$ | $f(g(w^h, V_h^c), g(w^v, V_v^c))$ |

As shown in TABLE 13, the codebook structure may be determined among the candidates in a multi-dimensional antenna configuration. The codebook structure may be determined according to the subset of antennas selected by an antenna partitioning matrix. The antenna polarization may be indicated as V-pol for the vertical polarization and/or H-pol for the horizontal polarization in a cross-polarized antenna setup. If the V-pol antenna ports and/or the H-pol antenna ports are selected with an antenna partitioning matrix, a co-phasing sub-component precoder index may not be reported from a WTRU.

A WTRU may perform measurements on incoming transmissions. The WTRU may measure precoding weight, CQI, and/or rank from the measurement RS to report if configured. A WTRU may calculate reference signal power for transmission point selection and/or cell selection/re-selection procedure. A WTRU may select a reference signal based on the received signal power. For example, the WTRU may select the reference signal based on the highest received power for the vertical beam selection. A vertical beam may be a CSI-RS. If multiple CSI-RS reuse patterns are configured for a WTRU, a CSI-RS may be selected as the WTRU may select a preferred vertical beam. A WTRU may select one or more pairs of reference signals based on a criteria. The criteria may include the highest received SNR, the top N highest received SNR, and/or the received power for one or more pairs of transmit antennas or ports.

If a WTRU measures channels for a number of vertical and horizontal antenna ports $N_v \times N_h$, the measurement RS may support one or more properties. For example, the measurement RS may be transmitted with a duty cycle from a base station, such as an eNB for example. A WTRU configured with the measurement RS may calculate a CSI from the measurement RS. The measurement RS may be in a subframe. Multiple measurement RSs may be configured for a WTRU. A duty cycle for each measurement RS may be configured separately. To reduce control signaling overhead, an offset between configured measurement RSs may be indicated to the WTRU. A different number of antenna ports may be configured for each measurement RS. A transmission power of each measurement RS may be different. For example, the reference PDSCH transmit power for CSI feedback $p_c$ may be defined per measurement RS. If a PMI/CQI and/or RI is reported, each measurement RS may have different associated codebook for the PMI/CQI and/or RI reporting. A WTRU may report a single PMI/CQI and/or RI for the multiple configured measurement RSs.

A measurement RS may include vertical and/or horizontal antenna properties. As a measurement RS, CSI-RS may include a vertical and/or horizontal property so that a WTRU may differentiate whether a CSI-RS may be from a horizontal antenna configuration or a vertical antenna configuration. The CSI-RS may be a CSI-RS for vertical antennas (V-CSI-RS) or a CSI-RS for horizontal antennas (H-CSI-RS). The H-CSI-RS and the V-CSI-RS may be separately configurable and/or may be orthogonal in time. For example, the H-CSI-RS and V-CSI-RS may use a different subframe period and/or subframe offset in the CSI-RS subframe configuration. The H-CSI-RS and V-CSI-RS may use a different frequency or subcarrier when the H-CSI-RS and V-CSI-RS are uncorrelated. The H-CSI-RS and the V-CSI-RS may be transmitted in the same subframe by using a common subframe period configuration.

A measurement RS may include a cell-specific and/or WTRU-specific configuration. The cell-specific measurement RS may have a larger number of antenna ports as compared with the WTRU-specific measurement RS. The cell-specific measurement RS may be a cell-specific CSI-RS (C-CSI-RS). The WTRU-specific measurement RS may be a WTRU-specific CSI-RS (W-CSI-RS). The cell-specific measurement RS may be a full CSI-RS (F-CSI-RS). The C-CSI-RS and the F-CSI-RS may be used interchangeably.

The WTRU-specific measurement RS may be a partial CSI-RS (P-CSI-RS). The W-CSI-RS and the P-CSI-RS may be used interchangeably.

Among the number of vertical and horizontal antenna elements/ports $N_v \times N_h$, a subset or multiple subsets may be measurement reference signals for a WTRU. The subset of antenna ports may be selected as described herein. For example, the vertical antenna elements/ports $N_v$ may be selected for a measurement RS transmission. The horizontal antenna elements/ports $N_h$ may be selected for a measurement RS transmission. A subset of vertical and/or horizontal antenna elements/ports may be selected for a measurement RS transmission.

Various types of parameters for a measurement RS may be configurable via higher layer signaling and/or broadcast signaling. For example, these parameters may include a number of RS ports for vertical and/or horizontal beams, a configuration for sequence generation and/or mapping to REs, a subframe configuration, a subframe configuration period, a subframe offset, and/or the like.

CSI-RS may be used for full antenna dimensions. A set of measurement RSs may be transmitted from two-dimensional antenna elements so that a WTRU may measure spatial channels from the measurement RS. The association between antenna elements and reference signals may be a one-to-one mapping. An antenna port may be defined as a reference signal so that the association between antenna element and reference signal may be defined as an association between elements to ports, where an element may be a logical antenna seen by a WTRU.

Figure 13:
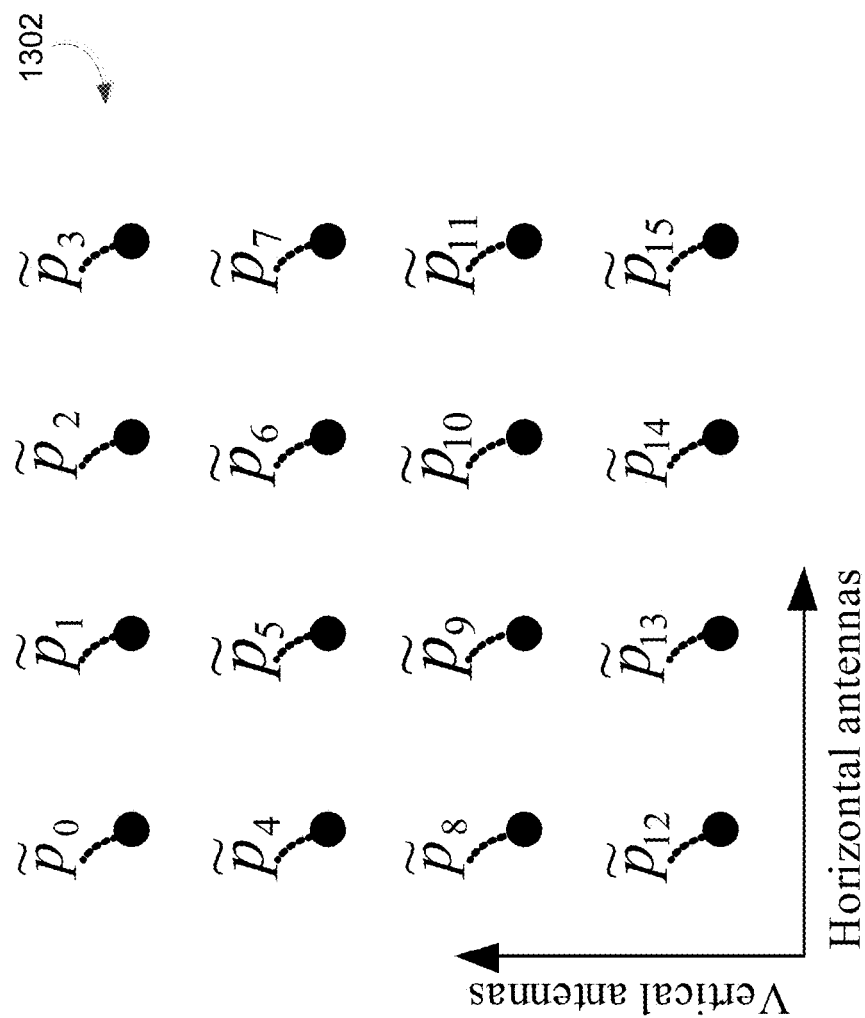
FIG. 13 is a diagram that depicts an example antenna element mapping with a two-dimensional antenna configuration.

FIG. 13 is a diagram depicting an antenna element mapping with a two-dimensional antenna configuration. As shown in FIG. 13, each antenna element $\tilde{p}_0, \tilde{p}_1, \ldots, \tilde{p}_{15}$ may be mapped onto a two-dimensional antenna configuration 1302. The two-dimensional antenna configuration 1302 is a 4×4 two-dimensional antenna configuration. If full antenna dimensions are used, each of the antenna elements for each of the antenna ports $\tilde{p}_0, \tilde{p}_1, \ldots, \tilde{p}_{15}$ may be seen by a WTRU. If partial antenna dimensions are used, the subset of the antenna ports $\tilde{p}_0, \tilde{p}_1, \ldots, \tilde{p}_{15}$ may be seen by the WTRU. There may be antenna ports (e.g., reference signals) for each of the antenna element. The antenna ports $p_0, p_1, \ldots, p_{15}$ may be defined and may be mapped one-to-one as $p_i = \tilde{p}_i$, i=0, ..., 15. In this case, the antenna element and port may be considered as the same unit.

Each antenna element/port $\tilde{p}_0, \tilde{p}_1, \ldots, \tilde{p}_{15}$ may have a corresponding index. In FIG. 13, the antenna elements/ports are indexed in horizontal antenna first, but the antenna elements/ports may be indexed in vertical antenna first or in a random manner. The antenna ports in the antenna configuration 1302 may indicate the two-dimensional antenna position, such as $p_{m,n}$, where m and n may indicate the horizontal and vertical antenna index, or vice-versa.

The measurement RS (e.g., antenna ports, CSI-RS, etc.) may be transmitted in a backward compatible manner by aggregating multiple CSI-RS patterns. The CSI-RS patterns may be legacy (e.g., Rel-10) CSI-RS patterns. The number of antenna ports in a two-dimensional configuration may be divisible by 2, 4, and/or 8. The number of antenna ports for a CSI-RS pattern may be the same as the number of horizontal antenna ports and/or vertical antenna ports in a two-dimensional configuration. For example, if a 4×8 (e.g., $N_v \times N_h$) two-dimensional antenna configuration is used, the CSI-RS pattern aggregation may be performed by aggregating multiple eight-port CSI-RS reuse patterns. The number of vertical antenna port $N_v$ CSI-RS patterns may be aggregated for the number of horizontal antenna ports $N_h$ to form the $N_v \times N_h$ antenna configuration, or vice-versa.

The number of antenna ports for a CSI-RS pattern may be the largest number divisible for the total number of antenna ports in a two-dimensional configuration. For example, if a 3×4 (e.g., $N_v \times N_h$) two-dimensional antenna configuration is used, the largest divisible number among {2, 4, 8} may be four. The CSI-RS patterns for four ports may be aggregated to form the $N_v \times N_h$ antenna configuration.

Figure 14A:
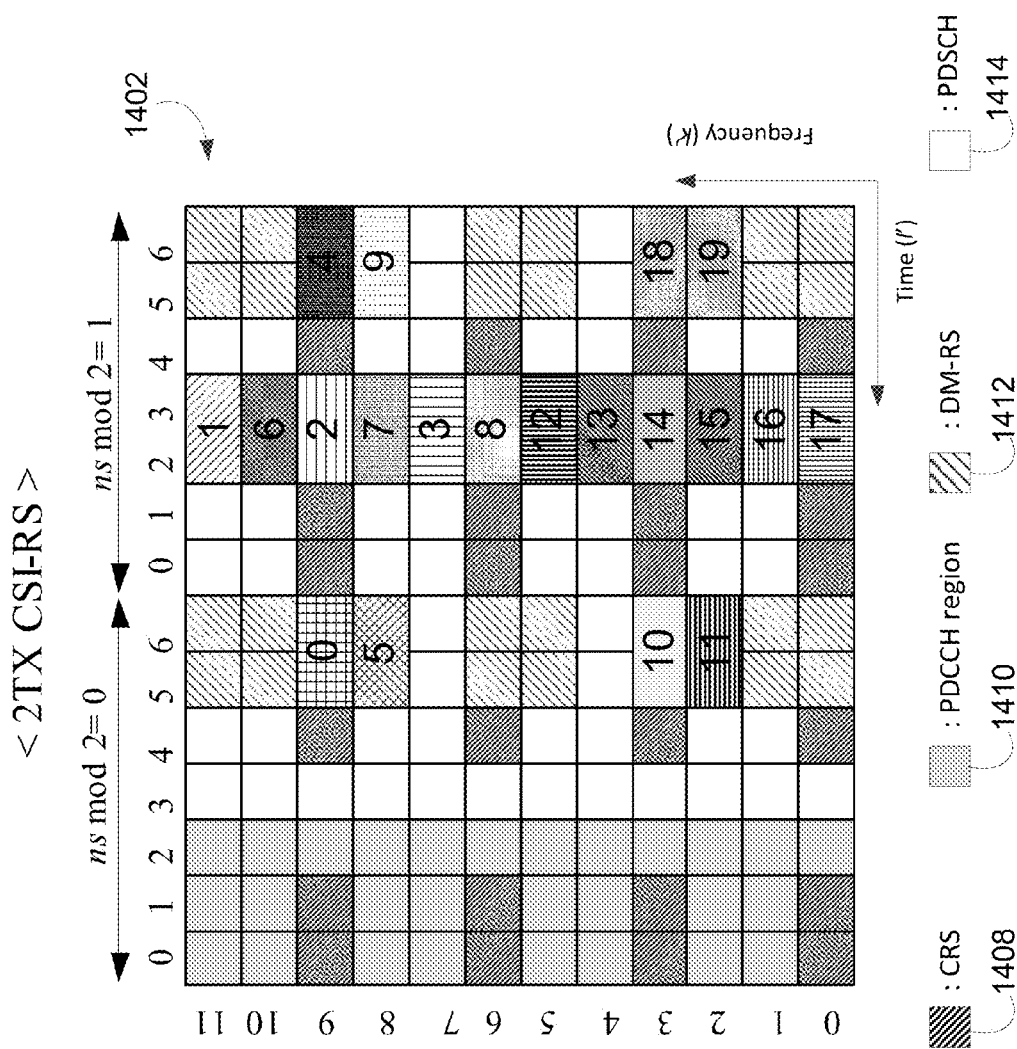
FIGS. 14A-14C are diagrams that depict example CSI-RS patterns.
Figure 14B:
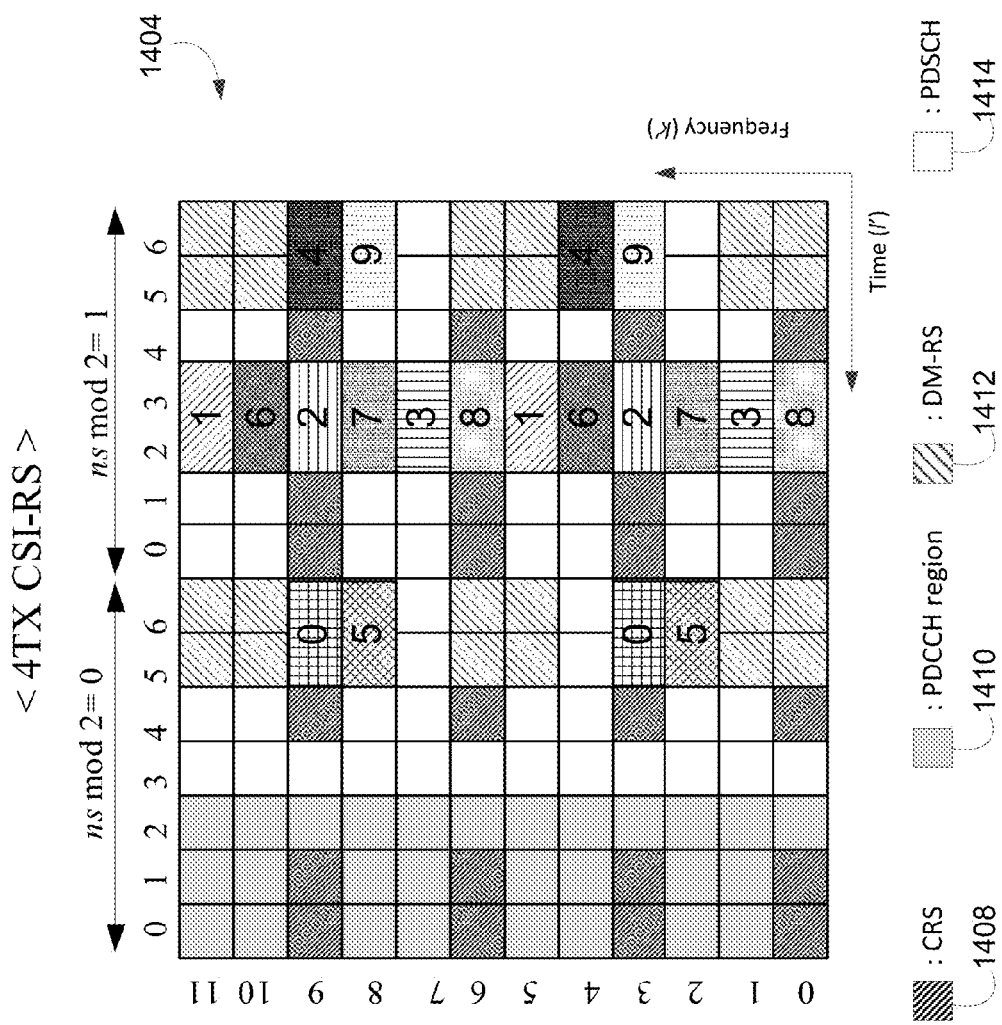
Figure 14C:
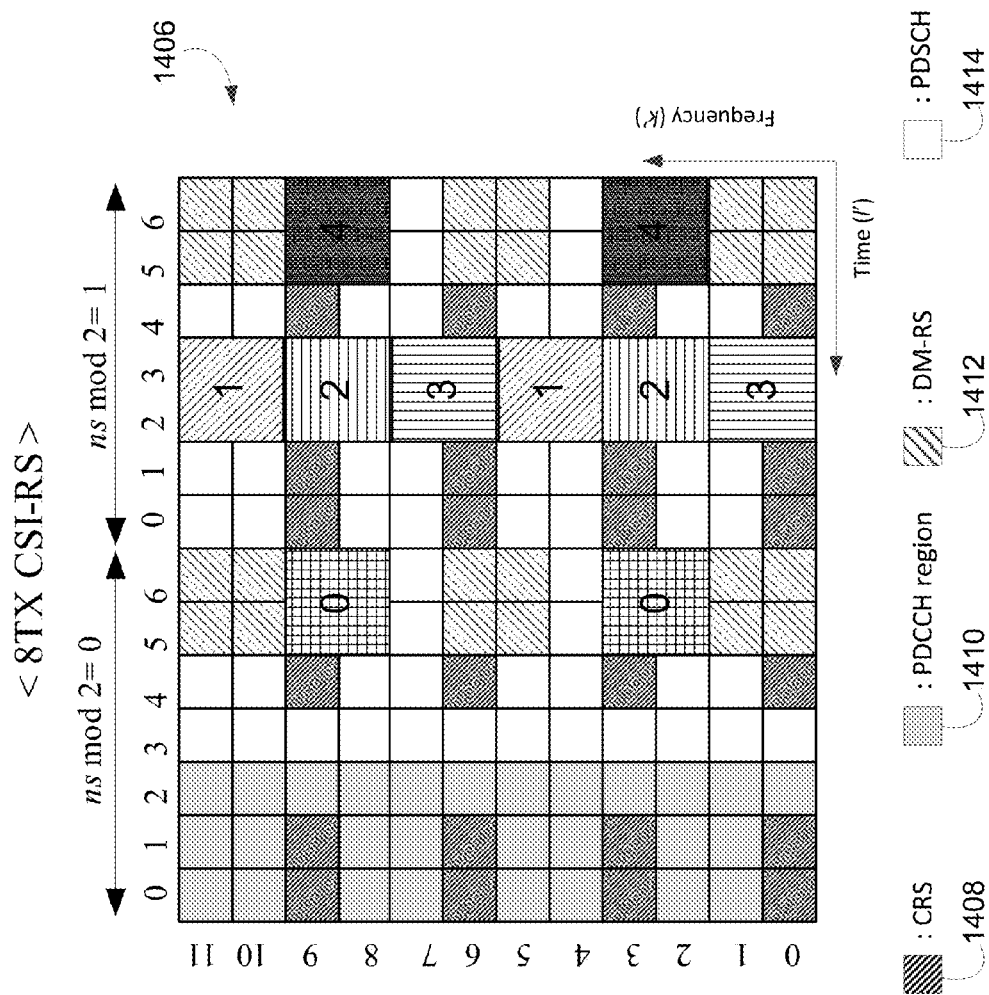

FIGS. 14A-14C are diagrams that depict example CSI-RS patterns. FIGS. 14A-14C include RBs 1402, 1404, 1406 that show CSI-RS patterns that may be implemented and/or reused. The RBs 1402, 1404, 1406 may also include a CRS 1408, a PDCCH region 1410, a DM-RS 1412, and/or a PDSCH 1414. The CSI-RS patterns shown in FIGS. 14A-14C are in a time-frequency domain.

FIG. 14A is a diagram that depicts an example RB 1402 that includes a set of REs for a CSI-RS configuration for two transmission antennas. Each of the REs having the same color/shade indicate REs for a particular CSI-RS configuration. The RB 1402 includes a configuration for 20 CSI-RS patterns in a subframe. The RB 1402 includes a CSI-RS reuse pattern that may be implemented for a two antenna port CSI-RS configuration. If the number of antenna ports for two-dimensional antenna configuration is divisible by two, the two-port CSI-RS pattern may be reused multiple times (e.g., once for each multiple of two). The two-port CSI-RS pattern may be reused irrespective of the total number of antenna ports. In FIG. 14A, the configurations from zero to $(N_v \times N_h/2)-1$ may be aggregated in the 2Tx CSI-RS patterns.

FIG. 14B is a diagram that depicts an example RB 1404 that includes a set of REs for a CSI-RS configuration for four transmission antennas. Each of the REs having the same color/shade indicate REs for a particular CSI-RS configuration. The RB 1404 includes a configuration for 10 CSI-RS patterns in a subframe. If the number of antenna ports for two-dimensional configuration is divisible by four, the four-port CSI-RS pattern may be reused multiple times (e.g., once for each multiple of four). The four-port CSI-RS pattern may be reused irrespective of the total number of antenna ports. In FIG. 14B, the configurations from zero to $(N_v \times N_h/4)-1$ are aggregated in the 4Tx CSI-RS patterns.

FIG. 14C is a diagram that depicts an example RB 1406 that includes a set of REs for a CSI-RS configuration for eight transmission antennas. Each of the REs having the same color/shade indicate REs for a particular CSI-RS configuration. The RB 1406 includes a configuration for 5 CSI-RS patterns in a subframe. If the number of antenna ports for a two-dimensional configuration is divisible by eight, the multiple eight-port CSI-RS patterns may be reused multiple times (e.g., once for each multiple of eight). The eight-port CSI-RS pattern may be reused irrespective of the total number of antenna ports. In FIG. 14C, the configurations from zero to $(N_v \times N_h/8)-1$ are aggregated in the 8Tx CSI-RS patterns. FIGS. 14A-14C illustrate a CSI-RS reuse pattern according to the configuration number and the number of antenna ports. The multiple CSI-RS reuse patterns may be configured by higher layer or broadcasted.

Antenna ports may be alternated according to the PRB index. A WTRU may receive a subset of antenna ports in a subset of a PRB index and another subset of antenna ports in another subset of a PRB index. In a first subset of a PRB index, a WTRU may receive the CSI-RS for a first set of antenna ports (e.g., $p_0, p_1, \ldots, p_7$) and the WTRU may receive a second set of antenna ports (e.g., $p_8, p_9, \ldots, p_{15}$) in a second subset of a PRB index. The subset of a PRB index may be selected according to the odd or even numbered PRB index. If the subset number is larger than 2, the PRB index for each set may be selected in an interlaced manner, which may include a modulo operation with the subset number. For example, the subsets may be allocated cyclicly. The subset number for a given PRB may be selected by PRB index mod($N_{sets}$), where $N_{sets}$ may be the number of sets. When multiple subsets are defined, antenna partitioning matrices shown in TABLE 10 may be used to indicate which subset of antenna ports are selected.

In a 4×4 (e.g., $N_v \times N_h$) configuration, 25 RBs may be available. One eight-port CSI-RS pattern, or two four-port CSI-RS patterns for example, may be configured. A WTRU may determine that the ports $p_0, p_1, \ldots, p_7$ in the even numbered RB may be mapped to $\tilde{p}_0, \tilde{p}_1, \ldots, \tilde{p}_7$ and/or the ports $p_0, p_1, \ldots, p_7$ in the odd numbered RB may be mapped to $\tilde{p}_0, \tilde{p}_1, \ldots, \tilde{p}_{15}$. This configuration may be defined as $p_0, p_1, \ldots, p_{15}$. The $p_0, p_1, \ldots, p_7$ may be transmitted in an even numbered RB. The $p_8, p_9, \ldots, p_{15}$ may be transmitted in an odd numbered RB. A four-port CSI-RS pattern may be configured and a WTRU may determine that the ports $p_0, p_1, p_2, p_3$ in a PRB index $\{0, 4, 8, 12, 16, 20, 24\}$ may be mapped onto $\tilde{p}_0, \tilde{p}_1, \tilde{p}_2, \tilde{p}_3$, the ports $p_0, p_1, p_2, p_3$ in the PRB index $\{1, 5, 9, 13, 17, 21\}$ may be mapped onto $\tilde{p}_4, \tilde{p}_5, \tilde{p}_6, \tilde{p}_7$, and so on.

CSI-RS reuse patterns may be used when the CRS is not presented in the PDSCH region. The two-dimensional-CSI-RS may be transmitted with a duty cycle configured by higher layer signaling and/or a broadcasting channel. A subframe configurable as MBSFN subframe may be used for two-dimensional-CSI-RS transmission. A subframe not including CRS may be used for two-dimensional-CSI-RS transmission. A subset of antenna ports may be transmitted in a subset of PRB index and/or configured subframes. For multiple antenna port multiplexing, the orthogonal covering code (OCC) length may be used differently based on the total number of antenna ports in the two-dimensional configuration. The OCC may be used differently for different numbers of antenna ports to keep the 6 dB power ratio between the PDSCH and the antenna port. If an OCC length-x is used, a number of REs having the value x may be shared by a number of antenna ports having the value x. Each antenna port may be identified by the OCC index. The OCC index may be one of the spreading code. In an example, if an OCC length-4 is used, four REs may be shared by four antenna ports and each antenna port may be identified by the OCC index. In case of sixteen antenna ports, an OCC length-4 or more may be used. In case of thirty-two antenna ports, OCC length-8 or more may be used.

CSI-RS may use a reduced number of antennas. A set of measurement RS may be transmitted from a subset of two-dimensional antenna elements. A WTRU may estimate and/or measure a CSI reporting that may include a PMI, a rank, and/or a CQI. The association between antenna elements and reference signals may be defined differently based on one or more configurations. To reduce the number of antenna ports for CSI-RS, antenna virtualization, antenna partitioning, and/or spatial channel interpolation may be used.

Multiple types of CSI-RS may be configured for antenna virtualization, which may reduce the number of antennas ports so that the association between antenna elements and antenna ports may be defined as an antenna virtualization matrix. Each antenna type may include a subset of antennas. An antenna virtualization matrix may be, but is not limited to, a precoding matrix or antenna partitioning matrix for example. The antenna virtualization matrix may be selected from a first type of CSI-RS. The antenna virtualization matrix may be used to reduce the number of antenna ports. A second type of CSI-RS may be transmitted for the reduced antenna ports.

The first type of CSI-RS may be transmitted using vertical antennas. The second type of CSI-RS may be transmitted using horizontal antennas. The CSI-RS for vertical antennas may be referred to as V-CSI-RS. The CSI-RS for horizontal antennas may be referred to as H-CSI-RS. The number of antenna ports for V-CSI-RS include the number of vertical antenna ports $N_v$. The number of antenna ports for H-CSI-RS include the number of horizontal antenna ports $N_h$.

The V-CSI-RS and/or H-CSI-RS may be transmitted with a duty cycle. The duty cycle may be configured via higher layer signaling and/or broadcasting channels. The V-CSI-RS may have a longer duty cycle compared to the H-CSI-RS. For example, an integer multiple of the duty cycle for the H-CSI-RS may be used for V-CSI-RS, or vice versa. A WTRU may determine that a least one antenna port may be overlapped between H-CSI-RS and V-CSI-RS. The overlapped antenna port may transmit in H-CSI-RS and/or V-CSI-RS. The overlapped antenna port number may be indicated to a WTRU.

The first type of CSI-RS and/or the second type of CSI-RS may support full antenna dimensions. If the first type of CSI-RS and the second type of CSI-RS support full antenna dimensions, the CSI-RS may be transmitted in each of the antenna elements. The first type of CSI-RS and/or the second type of CSI-RS may support reduced antenna ports. If the first type of CSI-RS and the second type of CSI-RS support reduced antenna ports, the CSI-RS may be transmitted in a subset of antenna elements. The CSI-RS for reduced antenna ports may be referred to as full CSI-RS (F-CSI-RS). The CSI-RS for partial antenna ports may be referred to as partial CSI-RS (P-CSI-RS). The F-CSI-RS may be a cell-specific CSI-RS, a full dimensional CSI-RS, a larger CSI-RS, and/or a long-term CSI-RS. The P-CSI-RS may be a WTRU-specific CSI-RS, a partial dimensional CSI-RS, a smaller CSI-RS, and/or a short-term CSI-RS.

The F-CSI-RS and/or P-CSI-RS may be transmitted with a duty cycle. The duty cycle may be configured via higher layer signaling and/or broadcasting channels. The F-CSI-RS may have a longer duty cycle than the P-CSI-RS. An integer multiple of the duty cycle for P-CSI-RS may be used for F-CSI-RS. The F-CSI-RS may be configured in a cell-specific manner.

The P-CSI-RS may be configured in a WTRU-specific manner. A WTRU may receive the configuration information of an F-CSI-RS from a broadcasting channel, an MIB, and/or an SIB-x. A WTRU may receive the configuration information of a P-CSI-RS from higher layer signaling (e.g., RRC signaling). A WTRU may report an antenna virtualization matrix based on F-CSI-RS. According to the P-CSI-RS configured, the set of antenna virtualization may be different for the same F-CSI-RS.

The CSI-RS may be configured by a broadcasting channel. The CSI-RS may be common for WTRUs in a cell. The CSI-RS may be configured in a WTRU-specific manner. One type of CSI-RS (e.g., first type of CSI-RS) may be configured by a broadcasting channel and/or maybe common for WTRUs in a cell, while another type of CSI-RS (e.g., second type of CSI-RS) may be configured in a WTRU-specific manner.

Different types of CSI-RS may be transmitted in a different subframe. For example, V-CSI-RS and H-CSI-RS may be transmitted in a different subframe. F-CSI-RS and P-CSI-RS may be transmitted in a different subframe.

Figure 15:
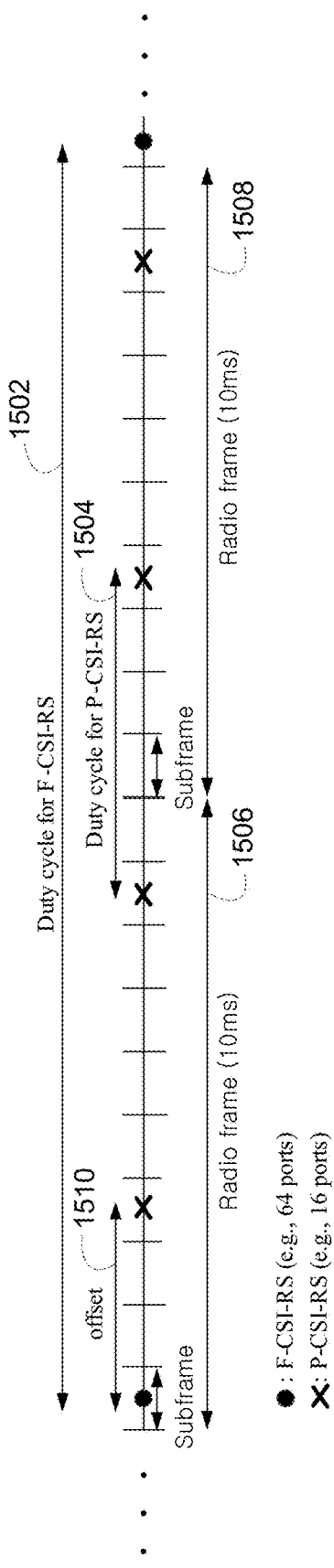
FIG. 15 is a diagram that depicts an example of a multiple CSI-RS type configuration.

FIG. 15 is a diagram that depicts an example of a multiple CSI-RS type configuration. The multiple CSI-RS configuration types may include an F-CSI-RS and a P-CSI-RS. The FCSI-RS may be 64 ports and/or the P-CSI-RS may be 16 ports for example. The F-CSI-RS may have a duty cycle 1502 between subframes. The duty cycle 1502 may include multiple radio frames 1506, 1508. Radio frames 1506, 1508 may be 10 ms radio frames. Each radio frame 1506, 1508 may include ten subframes. The duty cycle 1502 may be 20 subframes. There may be an offset 1510 from an F-CSI-RS subframe to a first P-CSI-RS subframe. The offset 1510 may be three subframes. The P-CSI-RS may include a duty cycle 1504 between subframes. The duty cycle 1504 may be 5 subframes, which may be a fraction of the subframes in the duty cycle 1502 for the F-CSI-RS. There may be four P-CSI-RS subframes between F-CSI-RS subframes.

If $N_v \times N_h$ two-dimensional configuration is used, the reduced antenna ports after antenna virtualization may be defined as the number of reduced antenna ports in the vertical direction by the number of reduced antenna ports in the horizontal direction $L_v \times L_h$, where $L_v \leq N_v$, $L_h \leq N_h$, and where the total number of reduced antenna ports may represented as $L_t = L_v \times L_h$. The antenna virtualization vector/matrix may be defined with a set of $N_t \times L_t$ antenna virtualization matrices. One or more of the antenna virtualization matrices may be used. The antenna virtualization vector/matrix may be defined with a fixed $N_t \times L_t$ antenna virtualization matrix that may be predefined according to the $L_t$. The antenna virtualization vector/matrix may be defined with a constant modulus based antenna virtualization matrix. Each element in the virtualization matrix may have the same amplitude with a different phase. The constant modulus based antenna virtualization matrix $W_{virtual}$ may be determined as shown in Equation 14:

$$W_{virtual} = P_{N_t \times L_t} = \begin{pmatrix} a_{0,0} & a_{0,1} & \cdots & a_{0,L_t-1} \\ a_{1,0} & a_{1,1} & \cdots & a_{1,L_t-1} \\ \vdots & \vdots & \ddots & \vdots \\ a_{N_t-1,0} & a_{N_t-1,1} & \cdots & a_{N_t-1,L_t-1} \end{pmatrix}, \quad \text{Equation 14}$$

where $a_{i,j} = e^{-j\theta_{i,j}}$, where the antenna virtualization matrix $W_{virtual}$ may be a matrix that indicates the antenna ports for a set $N_t \times L_t$, and where $a_{i,j}$ indicates each antenna element in rows i and columns j. The number of antenna ports that may be seen by a WTRU may be indicated by Lt.

The antenna virtualization vector/matrix may be defined using a CDD-based antenna virtualization matrix $W_{virtual}$. A phase shift matrix $D_{N_t \times N_t}$ may be used with a constant modulus matrix $P_{N_t \times L_t}$ as shown in Equation 15:

$$W_{virtual} = D_{N_t \times N_t} P_{N_t \times L_t} = \begin{pmatrix} 1 & 0 & \cdots & 0 \\ 0 & e^{-j\theta_0} & \cdots & 0 \\ \vdots & \vdots & \ddots & \vdots \\ 0 & 0 & \cdots & e^{-j\theta_{N_t-2}} \end{pmatrix} \quad \text{Equation 15}$$

$$\begin{pmatrix} a_{0,0} & a_{0,1} & \cdots & a_{0,L_t-1} \\ a_{1,0} & a_{1,1} & \cdots & a_{1,L_t-1} \\ \vdots & \vdots & \ddots & \vdots \\ a_{N_t-1,0} & a_{N_t-1,1} & \cdots & a_{N_t-1,L_t-1} \end{pmatrix},$$

where $a_{i,j} = e^{-j\theta_{i,j}}$.

The phase shift value may be predefined while the constant modulus matrix $P_{N_t \times L_t}$ may be selected in a set of the matrices. The phase shift value may be selected in a set of the phase shift value. The phase shift matrix may be defined as cycle delay in time domain.

The antenna elements may be partitioned for a WTRU and/or group of WTRUs so that spatial domain multiplexing between multiple WTRUs may be supported. A WTRU may not see the antenna elements not used for the WTRU in its CSI feedback estimation. For antenna partitioning, the antenna partitioning matrices in TABLE 10 may be used. A full matrix may be used. Index-7 in TABLE 10 depicts an example of a full matrix. A measurement RS may be transmitted with F-CSI-RS to indicate the full matrix. A partial matrix may be used for antenna element subset selection. Index-0 to index-6 in TABLE 10 depict examples of partial matrices. A measurement RS may be transmitted with P-CSI-RS to indicate the partial matrix that is used.

Spatial channel interpolation may be used to estimate channel information. If antenna correlation is high between two adjacent antenna elements, measurement reference signals may be transmitted onto a subset of two-dimensional antenna elements with antenna configuration information. A WTRU may interpolate the channels from the measurement reference signals transmitted from a subset of two-dimensional antenna elements to estimate the channel information for the antenna elements not having reference signals. The antenna configuration information for spatial channel interpolation may include antenna spacing between two adjacent antenna ports so that a WTRU may estimate antenna correlation levels. The antenna configuration information may include an antenna element type that may include dipole and/or cross-pol antennas. The antenna configuration information may include coefficients for a channel estimator, which may be used for spatial channel interpolation. A two-dimensional Wiener filter may be used for spatial channel interpolation and its associated coefficients may be configured or signalled via higher layer signaling. The antenna configuration information may include a location index for the antenna elements selected as a subset.

For the location index for antenna elements selected as a subset, the antenna element subset may be informed with the location index which may indicate the location in the two-dimensional antenna dimensions. The antenna element subset may be selected within a set of antenna element subset selection matrices. For example, if 4×4 two-dimensional antenna configuration is used, the set of antenna element subset selection matrices shown in TABLE 14 may be used. The antenna element number may follow the mapping rule illustrated in FIG. 13.

TABLE 14

A Set of Antenna Element Subset Selection Matrices

| Subset-1 | Subset-2 | Subset-3 | Subset-4 |
|---|---|---|---|
| $\begin{bmatrix} 1 & 1 & 1 & 1 \\ 0 & 0 & 0 & 0 \\ 1 & 1 & 1 & 1 \\ 0 & 0 & 0 & 0 \end{bmatrix}$ | $\begin{bmatrix} 1 & 0 & 1 & 0 \\ 1 & 0 & 1 & 0 \\ 1 & 0 & 1 & 0 \\ 1 & 0 & 1 & 0 \end{bmatrix}$ | $\begin{bmatrix} 1 & 0 & 1 & 0 \\ 0 & 1 & 0 & 1 \\ 1 & 0 & 1 & 0 \\ 0 & 1 & 0 & 1 \end{bmatrix}$ | $\begin{bmatrix} 0 & 1 & 0 & 1 \\ 1 & 0 & 1 & 0 \\ 0 & 1 & 0 & 1 \\ 1 & 0 & 1 & 0 \end{bmatrix}$ |
| $\tilde{p}_0, \tilde{p}_1, \tilde{p}_2, \tilde{p}_3,$ $\tilde{p}_8, \tilde{p}_9, \tilde{p}_{10}, \tilde{p}_{11}$ | $\tilde{p}_0, \tilde{p}_2, \tilde{p}_4, \tilde{p}_6,$ $\tilde{p}_8, \tilde{p}_{10}, \tilde{p}_{12}, \tilde{p}_{14}$ | $\tilde{p}_0, \tilde{p}_2, \tilde{p}_5, \tilde{p}_7,$ $\tilde{p}_8, \tilde{p}_{10}, \tilde{p}_{13}, \tilde{p}_{15}$ | $\tilde{p}_1, \tilde{p}_3, \tilde{p}_4, \tilde{p}_6,$ $\tilde{p}_9, \tilde{p}_{11}, \tilde{p}_{12}, \tilde{p}_{14}$ |

The antenna element subsets in TABLE 14 show that eight antenna ports may be used as eight antenna elements out of sixteen antenna elements so that the antenna ports $p_0$, $p_1, \ldots, p_7$ may be used to transmit antenna ports onto antenna elements selected according to the subset. The subset selection of the antenna element subset matrix may be based on horizontal antennas, as shown in subset-1 in TABLE 14 for example. The subset selection of the antenna element subset matrix may be based on vertical antennas, as shown in subset-2 in TABLE 14 for example. The antenna elements may be selected in an interlaced manner, as shown in subset-3 and/or subset-4 for example.

CSI-RS may be used for vertical beam selection, such as vertical sectorization for example. Narrow vertical beams may be formed that may utilize multiple antennas such that a wide beam may be sectorized with multiple narrow beams in the vertical direction. Vertical sectors may be orthogonal to one another such that the beams in a vertical sector may not be overlapped to the beams in other vertical sectors. A base station may transmit a set of vertical beam specific RSs (V-CSI-RS) on corresponding antenna ports for each of the vertical sectors. Since the beams in a vertical sector may not overlap with the beams in other vertical sectors, RS resource(s) for the beams in a vertical sector may be reused for the beams in other vertical sectors. The sectorization may be used to reduce overhead.

Multiple vertical beams, which may be overlapped in a vertical sector, may be transmitted concurrently. The concurrent transmission may improve capacity with MIMO in the vertical dimension. RSs may be scheduled hierarchically such that a WTRU may detect a desired vertical sector based on signal strength/SINR. The WTRU may estimate the channel transfer function (CTF) in the vertical sector, compute the SINR/CQI, and/or select the PMI/rank based on predetermined codebooks. The WTRU may report PMI, SINR/CQI, and/or vertical sector number to the base station on each scheduled reporting time.

The V-CSI-RS and the H-CSI-RS may be correlated, such that the vertical and horizontal beams in a vertical sector may be correlated with one another. Cross correlation of vertical and horizontal beams may be detected in a vertical sector by transmitting V-CSI-RS and H-CSI-RS from L×K antenna ports concurrently, where L may be the number of vertical beams and K may be the number of horizontal beams in a vertical sector. In an example where L=2 and K=4, 8 antenna ports may be used to form two vertical beams and four horizontal beams. A predetermined codebook size may be used that is 8×8, with a rank of eight.

The V-CSI-RS and the H-CSI-RS may be uncorrelated, such that the vertical beams in a vertical sector may be uncorrelated with the horizontal beams in the vertical sector. A base station may transmit V-CSI-RS and H-CSI-RS in different subframes. In an example where L=2 and K=4, two antenna ports may be used for two vertical beams for a given subframe, and four antenna ports for horizontal beams for a different subframe. A WTRU may estimate vertical and horizontal CTF independently. The WTRU may select the PMI/rank by using two separate predetermined codebooks. One of the predetermined codebooks may be a 2×2 codebook, with a rank of two, for vertical beams. The other predetermined codebook may be a 4×4 codebook, with a rank of four, for horizontal beams. The WTRU may create an 8×8 Kronecker product based on 2×2 and 4×4 precoders.

The base station may schedule V-CSI-RS and H-CSI-RS in the same subframe. In an example where L=2 and K=4, six antenna ports may be used for two vertical beams and four horizontal beams for a given subframe. The six antenna ports may be determined by adding the number of vertical beams L and the number of horizontal beams K in a vertical sector.

A WTRU may estimate vertical and horizontal CTF independently and may select the PMI/rank by using two separate predetermined codebooks. The two separate predetermined codebooks may include a codebook of 2×2, with a rank of 2, for vertical beams and a codebook 4×4, with a rank of 4, for horizontal beams. The WTRU may create an 8×8 Kronecker product based on the 2×2 and the 4×4 precoders.

The sectorization may be applied to horizontal dimension in the same, or similar, manner as described for the vertical dimension. Vertical and/or horizontal sectorization may be used to reduce overhead and/or interference.

CSI feedback may be used in the communication system. A WTRU may measure and/or report CSI. The CSI may be reported to a base station to aid in determining configurations for multi-dimensional communications. The CSI may include a PMI, a CQI, a number of layers (rank), a reference signal received power (RSRP), a spatial covariance matrix, a precoding type indicator (PTI), a component precoder indicator (CPI), and/or the like.

CSI reporting may be implemented with a multi-component codebook. When multiple component codebooks are used to form a precoder for a two-dimensional antenna configuration, each component codebook may have different properties. For example, two component codebooks may be used for a precoder generation for a two-dimensional antenna configuration. The composite precoder V for two-dimensional antenna configuration may be defined as a function of two component precoders, such as vertical precoder $V_v$ and horizontal precoder $V_h$. The composite precoder may be expressed as $V_c = f(V_h)$. If a Kronecker product is used as the function $f(\cdot)$, the composite precoder may be defined as $V_c(i_h, i_v) = V_h(i_h) \otimes V_v(i_v)$, where $i_h$ may be the precoding matrix index for the horizontal component codebook $V_h$ and $i_v$ may be the precoding matrix index for the vertical component codebook $V_v$.

A codebook based CSI feedback may be used for each component precoder. The PMI for component precoders may be defined separately. The precoding matrix index $i_h$ for the horizontal component codebook $V_h$ may be referred to as h-PMI. The precoding matrix index $i_v$ for the horizontal component codebook $V_h$ may be referred to as v-PMI. The composite precoder $V_c$ may be identified with two indexes $i_h$ and $i_v$.

An indicator for CPI may be used in combination with PMI reporting. For example, if a WTRU sees that the preferred precoding matrix in horizontal antennas is changed faster than that in vertical antennas, the WTRU may report a precoding matrix index for the horizontal domain $V_h$ with the CPI. The component precoder indicator may include a bit to indicate the horizontal or the vertical domain. For example, the component precoder indicator '0' may indicate the horizontal domain and the component precoder indicator '1' may indicate the vertical domain, or vice versa.

A two-bit antenna domain indicator may be used to indicate the horizontal and/or vertical domain. For example, a two-bit indicator '00' may indicate both a horizontal and a vertical domain for PMI feedback. The two-bit indicator '01' may indicate a horizontal domain. The two-bit indicator '10' may indicate a vertical domain. The two-bit indicator '11' may be reserved. While the two-bit indicator examples herein may include a certain bit sequence, the bit sequence may be interchangeable among the two-bit indicators. For example, the two-bit indicator '11' may indicate both a horizontal and a vertical domain for PMI feedback. The number of feedback bits may be changed according to the CPI. The CPI may be separately coded with feedback information.

The WTRU may report the PMI of multiple component codebooks. The PMI reporting for the component codebooks may be performed differently according to the reporting containers. The reporting containers may include PUCCH and/or PUSCH formats. The PMIs for multiple component codebooks may be reported at the same time or one at a time. For example, multiple component codebooks may be reported at the same time if a PUSCH reporting mode is used. One component codebook at a time may be reported in PUCCH reporting mode.

If a PUSCH reporting mode is used, each component codebook may be reported per subband. Other component codebooks may be reported for set S bandwidth. For example, h-PMI may be reported per subband and v-PMI may be reported for set S bandwidth, or vice-versa. The configuration for the PMI for subband and/or the PMI for set S bandwidth may be configured via higher layer signaling (e.g., RRC layer signaling). The set S bandwidth may be defined as a system bandwidth or a smaller bandwidth than the system bandwidth. The set S bandwidth may be configurable via higher layer signaling (e.g., RRC layer signaling) or broadcasting.

If a PUCCH reporting mode is used, a WTRU may report h-PMI or v-PMI in a subframe. The WTRU may select a preferred PMI between component precoders. A CPI may be reported by the WTRU. A CPI may be reported with h-PMI and/or v-PMI. The h-PMI and the v-PMI may be reported at the same time. A CPI may be reported with a different reporting cycle from the cycle for the h-PMI and/or v-PMI. The WTRU may report h-PMI and/or v-PMI according to the latest reported CPI type. For example, if CPI=0 (e.g., h-PMI is selected) is reported in subframe n and a PMI is reported in the subframe n+6, a WTRU may report h-PMI since the CPI=0 is the latest reported CPI type. A CPI may be reported with the PMI and/or its associated CQI. The CPI may be reported with the PMI and/or the CQI in the same subframe if PUCCH (e.g., format 3) is used for the CSI reporting. Joint coding may be used for CPI and PMI. If a CPI is reported, a sub-sampling of a codebook may be used to reduce the number of bits for PMI reporting. If a PUCCH format (e.g., format 2/2a/2b) is used for CSI reporting, the CPI may be reported in a different subframe. If a PMI and a CPI are reported in the same subframe, a WTRU may drop the PMI.

The PMIs for multiple component codebooks may be reported. A WTRU may measure channels from V-CSI-RS and may find a preferred procoding matrix index v-PMI. The WTRU may measure channels from H-CSI-RS to find a preferred precoding matrix index h-PMI. The preferred precoding matrix may indicate a matrix/vector that may maximize received SNR according to the receiver type implemented in a WTRU. If a WTRU is triggered in subframe n with aperiodic reporting with H-CSI-RS and V-CSI-RS, the WTRU may report CSI for H-CSI-RS and V-CSI-RS regardless of the timing or the WTRU may report CSI for the CSI-RS received more recently after the subframe n-k, where the k may be a positive integer number that may be predefined and/or configured via higher layer signaling. In an example, k may be four subframes in FDD. If a WTRU reports periodically through PUCCH or PUSCH, the WTRU may report CSI for H-CSI-RS or V-CSI-RS at a given time period. The CSI-RS associated with the CSI may be defined such that the WTRU may report CSI for H-CSI-RS and V-CSI-RS regardless of the timing. The WTRU may report CSI for the CSI-RS received more recently after the subframe n-k, where the k may be a positive integer number that may be predefined and/or configured via higher layer signaling. In an example, k may be four subframes in FDD.

If the CSI reporting for composite precoder $V_c = f(g(w^h, V_h^c), g(w^v, V_v^c))$ is defined with Kronecker product for both $f(\cdot)$ and $g(\cdot)$, the composite precoder may be defined as $V_c(m_h, m_v, n_h, n_v) = (w^h(m_h) \otimes V_h^c(n_h)) \otimes (w^v(m_v) \otimes V_v^c(n_v))$, where $m_h$, $m_v$, $n_h$, and $n_v$ may denote the index for sub-component codebooks, respectively. Each of the component codebooks may have an associated PMI. A precoding matrix index $n_h$ for the horizontal sub-component codebook $V_h^c$ may be referred to as h-PMI. A precoding matrix index $n_v$ for the vertical sub-component codebook $V_v^c$ may be referred to as v-PMI. A precoding matrix index $m_h$ for the co-phasing horizontal sub-component codebook $w^h$ may be referred to as ch-PMI. The precoding matrix index $m_v$ for the co-phasing vertical sub-component codebook $w^v$ may be referred to as cv-PMI.

The CSI reporting behavior with four sub-component codebooks may be differently defined according to periodic and aperiodic reportings. For periodic reportings, a CPI may be used to indicate four different sub-component codebooks. In this case, each sub-component precoder may be reported in a different subframe. For example, the CPI may indicate that the horizontal sub-component codebook may be selected, that the vertical sub-component codebook may be selected, that the co-phasing horizontal sub-component codebook may be selected, and/or that the co-phasing vertical sub-component codebook may be selected.

One or more subcomponent pre-coders may be indicated with a two-bit indicator. The horizontal sub-component codebook selection may be indicated with a CPI that equals '00'. The vertical sub-component codebook selection may be indicated with a CPI that equals '01'. The co-phasing horizontal sub-component codebook selection may be indicated with a CPI that equals '10'. The co-phasing vertical sub-component codebook selection may be indicated with a CPI that equals '11'. Each of the two-bit indicators for the subcomponent pre-coders may be interchanged or may be indicated with different values.

A CPI may be used together with PTI to indicate four different sub-component codebooks. Two indicators may be used separately for more flexible reporting. Sub-component precoders may be reported in different subframes. CPI may be indicated with a bit indicator. CPI may equal '0', which may indicate PMIs in the vertical domain, such as v-PMI and/or cv-PMI, may be reported. CPI may equal '1', which may indicate PMIs in the horizontal domain, such as h-PMI or ch-PMI, may be reported. PTI may be indicated with a bit indicator. PTI may equal '0', which may indicate a co-phasing precoder, such as ch-PMI and/or cv-PMI, may be reported. PTI may equal '1', which may indicate that a component precoder, such as h-PMI or v-PMI, may be reported.

Figure 16:
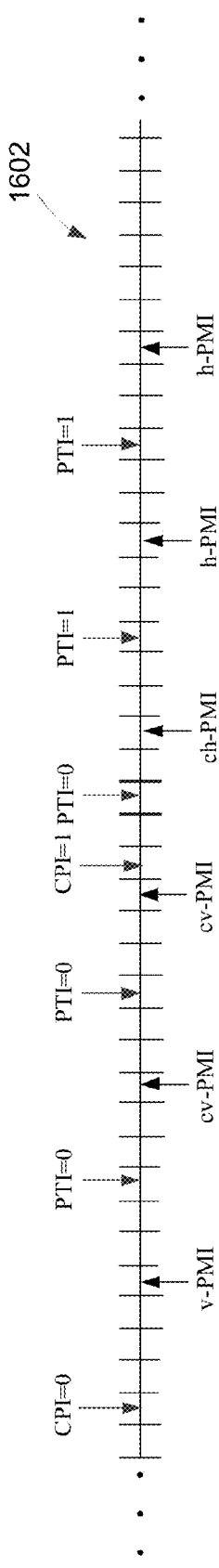
FIG. 16 is a diagram that depicts an example subframe structure for physical uplink control channel (PUCCH) reporting with four component codebooks.

FIG. 16 is a diagram that illustrates reporting with four component codebooks. The reporting may be performed on a PUCCH. As shown in FIG. 16, a number of subframes 1602 may include a CPI value, a PTI value, and/or a PMI value. The PMI may be a v-PMI, a cv-PMI, an h-PMI, or a ch-PMI. The CPI value may be '0' or '1' where a one bit indicator is used for the CPI. The PTI value may be '0' or '1' where a one-bit indicator is used for PTI. If a PMI and a CPI are reported in the same subframe (not shown), a WTRU may drop the PMI. If a CPI and PTI are reported in the same subframe (not shown), a WTRU may drop the CPI, drop the PTI, or report the CPI and the PTI with joint coding. If a PTI and a PMI are reported in the same subframe, a WTRU may drop the PMI or report the PTI and PMI with joint coding.

The CPI may have a longer duty cycle than the PTI. Since spatial channels for antenna dimensions may vary slower than that for antenna polarizations, longer reporting cycle may be used for CPI. The CPI duty cycle may be defined as an integer multiple of the PTI duty cycle. The CPI may be configured by the base station. The PTI may be reported for a WTRU.

For aperiodic reportings, a WTRU may report indexes for sub-component codebooks (e.g., four sub-component codebooks) in the same subframe. Multiple aperiodic PUSCH reporting modes may be implemented. For PUSCH mode-1, v-PMI and h-PMI may be reported for set S bandwidth and/or cv-PMI and ch-PMI may be reported for each subband. The subband for reporting cv-PMI and ch-PMI may be smaller than set S bandwidth. For PUSCH mode-2, cv-PMI, ch-PMI, v-PMI, and/or h-PMI may be reported for set S bandwidth. For PUSCH mode-3, v-PMI and h-PMI may be reported for set S bandwidth and/or cv-PMI and ch-PMI may be reported for a preferred M-subband. The M may be predefined.

CSI reporting may be performed with antenna virtualization. An antenna partitioning matrix may be used for antenna virtualization. A set of antenna partitioning matrices may be pre-defined and/or an antenna partitioning matrix may include full antenna ports transmission. An example of an antenna partitioning matrix that includes full antenna ports transmission is shown at index-7 in TABLE 10. The antenna partitioning matrix may be configured by a base station in a WTRU-specific manner. The WTRU may report a preferred antenna partitioning matrix within antenna partitioning candidates. When multiple types of CSI-RS are configured, one of the CSI-RSs may be used for a WTRU to report a preferred antenna partitioning matrix and another of the CSI-RSs may be used for PMI, CQI, and/or RI reporting. When F-CSI-RS and P-CSI-RS are used, the F-CSI-RS may be used for the WTRU to report the preferred antenna partitioning matrix and the P-CSI-RS may be used for PMI, CQI, and/or RI reporting. A WTRU may determine that antenna ports in a P-CSI-RS are a subset of F-CSI-RS antenna ports. The P-CSI-RS may be a subset of F-CSI-RS antenna ports when an antenna partitioning matrix is configured by the base station. When the antenna partitioning matrix is not configured by the base station, a WTRU may not assume that P-CSI-RS antenna ports are a subset of F-CSI-RS antenna ports.

If a configured antenna partitioning matrix from a base station is the full antenna port transmission matrix (e.g., index-7 in TABLE 10), a WTRU may determine that P-CSI-RS may not be transmitted and may measure channels from F-CSI-RS for PMI, CQI, and/or RI reporting. If a configured antenna partitioning matrix from a base station is not the full antenna port transmission matrix, a WTRU may report an antenna partitioning matrix from F-CSI-RS and may report PMI, CQI, and/or RI from P-CSI-RS.

One or more P-CSI-RSs may be configured for a WTRU when a single F-CSI-RS is configured. An F-CSI-RS may be configured in a cell-specific manner. A P-CSI-RS may be configured in a WTRU-specific manner. A WTRU may report PMI, CQI, and/or RI per P-CSI-RS, such as when multiple P-CSI-RSs are configured. If multiple P-CSI-RSs are configured, a WTRU may measure RSRP per P-CSI-RS. The WTRU may report the measured RSRP per P-CSI-RS to the base station. The base station may select one of the P-CSI-RSs for PMI, CQI, and/or RI reports. RSRP may be measured for each P-CSI-RS. A WTRU may measure RSRP from each configured P-CSI-RS. The WTRU may report CSI for a P-CSI-RS indicated by the base station. If multiple P-CSI-RSs are configured, the WTRU may determine whether the P-CSI-RSs are a V-CSI-RS or H-CSI-RS. The number of antenna ports may be different within the configured P-CSI-RSs. A duty cycle may be configured independently according to the P-CSI-RSs.

A WTRU may measure interference from the antenna ports in F-CSI-RS. The interference from the antenna ports in F-CSI-RS may not overlap with P-CSI-RS if the P-CSI-RS antenna ports are determined to be a subset of F-CSI-RS antenna ports. A WTRU may measure the intra-cell interference or co-channel interference in a subframe including F-CSI-RS. The measured intra-cell interference may be used to estimate CQI based P-CSI-RS. As an example, a P-CSI-RS may be configured with the matrix $$\begin{bmatrix} 1 & 0 & 1 & 0 \\ 0 & 1 & 0 & 1 \\ 1 & 0 & 1 & 0 \\ 0 & 1 & 0 & 1 \end{bmatrix},$$

and the antenna ports in the matrix $$\begin{bmatrix} 0 & 1 & 0 & 1 \\ 1 & 0 & 1 & 0 \\ 0 & 1 & 0 & 1 \\ 1 & 0 & 1 & 0 \end{bmatrix}$$

may indicate the antenna ports in the F-CSI-RS that may be unused in the P-CSI-RS matrix. The matrix $$\begin{bmatrix} 0 & 1 & 0 & 1 \\ 1 & 0 & 1 & 0 \\ 0 & 1 & 0 & 1 \\ 1 & 0 & 1 & 0 \end{bmatrix}$$

for the unused antenna ports in the P-CSI-RS may be used for the intra-cell interference measurements.

Figure 17:
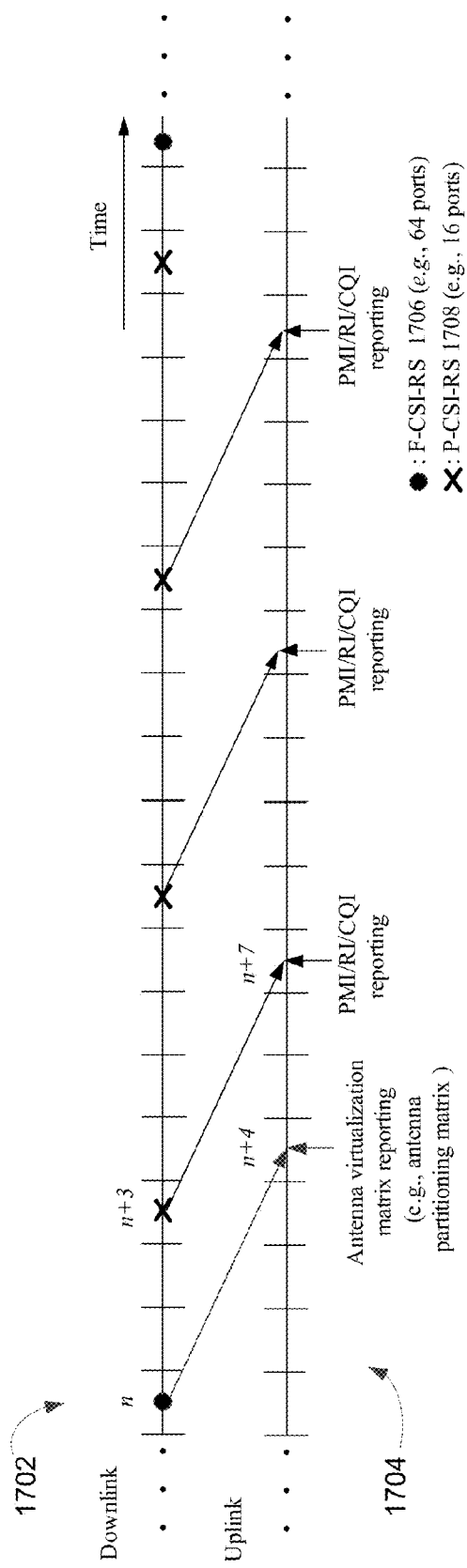
FIG. 17 is a diagram that depicts shows an example subframe structure for downlink communications and CSI feedback on the uplink.

FIG. 17 is a diagram that depicts an example subframe structure for CSI feedback based on multi-type CSI-RS. Multi-type CSI-RS may be used when F-CSI-RS 1706 and P-CSI-RS 1708 are implemented. Multiple subframes 1702 may be transmitted in the downlink over a period of time. The subframes 1702 may include the F-CSI-RS 1706 and/or the P-CSI-RS 1708. The F-CSI-RS 1706 may be for 64 ports. The P-CSI-RS 1708 may be for 16 ports. The F-CSI-RS 1706 and the first P-CSI-RS 1708 after the F-CSI-RS 1706 may be separated by three subframes in the downlink. Each subframe that includes F-CSI-RS 1706 may be separated by twenty subframes. Each subframe that includes P-CSI-RS 1708 may be separated by five subframes.

The timing of the CSI feedback transmitted in the uplink may be similar to the transmission of the CSI-RS in the downlink. The CSI feedback for each CSI-RS type may be offset by a predetermined number of subframes. As shown in FIG. 17, the CSI feedback may be offset by four subframes from the subframe within which the CSI-RS is received. The WTRU may report different types of feedback based on the type of CSI-RS received in the downlink. The antenna virtualization matrix (e.g., antenna partitioning matrix) reporting may be used in one of the uplink subframes 1704 that is used for feedback reporting for the F-CSI-RS 1706. The PMI, RI, and/or CQI reporting may be used in one of the uplink subframes 1704 that is used for feedback reporting for the P-CSI-RS 1708.

There may be unequal codebook granularity between a horizontal codebook and a vertical codebook. The WTRU may measure and/or report a preferred vertical and/or horizontal beam as a part of the CSI feedback reporting procedures. The vertical beam adaptation may be of a higher accuracy compared to that of the horizontal beam adaptation. The quantized channel state information for vertical beamforming may have a higher coding rate than that of the horizontal beamforming.

The WTRU may transmit the PMI feedback corresponding to vertical beamforming together with the PMI feedback for horizontal beamforming. The PMI feedback may be transmitted on the uplink control channel. Given the large payload size of the feedback information, one or more PUCCH formats may be insufficient to carry the CSI feedback information. For example, a PUCCH format 2 may be insufficient to carry the CSI feedback information. The WTRU may accomplish feedback reporting over several sequential reports using a PUCCH format, such as PUCCH format 2, that may be insufficient to carry the CSI information in a single report. The WTRU may transmit the CSI feedback in support of vertical beamforming on a PUCCH format that supports the size of the CSI feedback information using a single report. For example, the WTRU may transmit the CSI feedback on a PUCCH format 3, which may be used to carry downlink transmission acknowledgments for carrier aggregation. A single report may be used to carry PMI feedback for vertical beamforming and horizontal beamforming or the PMI feedback for vertical and horizontal beamforming may be carried on different reports.

The CSI feedback reported by a WTRU may include multiple PMI for horizontal beamforming and/or multiple PMI for vertical beamforming. If transmission of the PMIs is performed in subbands, for each subband the WTRU may select and/or reports multiple preferred PMIs. One PMI may be reported for horizontal beamforming and another PMI may be reported for vertical beamforming. A precoding matrix may be taken from the first codebook subset for horizontal beamforming and another precoding matrix may be taken from the second codebook subset for vertical beamforming. If there is unequal feedback granularity between the horizontal and vertical precoding, the WTRU may report a precoding matrix indicator for the horizontal precoding and a different precoding matrix indicator for the vertical precoding. The precoding matrix indicators may be selected such that the precoding matrix indicator corresponding to horizontal beamforming may be reported for the set S subbands and the precoding matrix indicator corresponding to vertical beamforming may be reported for the set S subbands, where S and S may be different sets.

A WTRU may report a wideband CQI value per codeword. The wideband CQI value may be calculated based on the corresponding selected vertical and horizontal precoding matrices in each subband in the set of S subbands. If there is unequal feedback granularity between the horizontal and the vertical precoding, the wideband CQI value may be calculated based on the corresponding selected horizontal precoding matrix in each subband in the set of S subbands and the corresponding selected vertical precoding matrix in each subband in the set of S' subbands, where S and S' may be different sets.

The WTRU may perform CSI feedback reporting with a PMI for horizontal beamforming and/or a PMI for vertical beamforming. If transmissions are performed on a set of S subbands, the WTRU may select and/or report multiple PMIs. The WTRU may report a PMI for horizontal beamforming and/or a PMI for vertical beamforming. Based on the PMIs, a precoding matrix may be used from a codebook subset for horizontal beamforming and another precoding matrix may be used from a codebook subset for vertical beamforming. The WTRU may report a subband CQI value per codeword for each set S subband. The subband CQI value may be calculated based on the use of the precoding matrix for horizontal beamforming, the precoding matrix for vertical beamforming in each subband, and/or transmission in the corresponding subband. A WTRU may report a wideband CQI value per codeword. The wideband CQI value may be calculated assuming the use of the single precoding matrix for horizontal beamforming, the single precoding matrix for vertical beamforming in each subband, and/or transmission on a set of S subbands.

The WTRU may measure, quantize, and/or report the downtilt angle. The downtilt angle may be the angle maximizes the received signal power. The downtilt angle may be used for semi-static and/or dynamic vertical beamforming. Given that the vertical beams may have smaller half-power beamwidth (HPBW) than horizontal beams, the reporting of the downtilt angle may lead to lower overhead than other forms of feedback reporting, such as codebook-based CSI feedback reporting for example. The range of HPBW may be between 5-20 degrees to provide sufficient coverage in the cell area. The WTRU may report a code from a predefined codebook. Each code may correspond to a downtilt angle or a predefined range of angles. The codebook may be a function of the cell size and/or antenna height at the base station. The WTRU may be configured semi-statically, in which the codebook may be used for quantization of downtilt angle and/or reporting.

When the rank is higher than one, the WTRU may report a downtilt value for each layer. Given that the downtilt values for different layers may be within a range. The WTRU may report a delta value or difference value for the layers above one. The WTRU may encode the downtilt angle values for other layers differentially based on their respective downtilt angle value from the first layer. This may be used to reduce the overhead when the WTRU supports ranks higher than one.

CSI feedback may be provided with a codebook subset restriction. To avoid interference toward the cell edge WTRUs of neighboring cells, the downtilt of the vertical antennas aiming at the cell-edge WTRUs may be limited by the scheduler. The cell-edge WTRUs may be limited in terms of the maximum achievable signal strength through vertical beamforming. A subset restriction may be applied by the scheduler on the codebooks for the cell-edge WTRUs. The WTRU may apply a subset of precoders from the predefined codebook to calculate its respective CSI feedback. As the WTRU moves toward the cell center, the subset restriction may be removed. The WTRU may calculate and/or report the preferred vertical and/or horizontal precoders as a part of the CSI feedback. The preferred vertical and/or horizontal precoders may maximize the received signal. The use of the subset restriction may enable the base station to apply a steeper downtilt toward the cell center WTRUs without increasing the inter-cell interference. The use of the subset restriction may strike a balance between maximizing the achievable signal strength at the desired WTRU and minimizing the overall inter-cell interference. The use of the subset restriction may result in higher spectral efficiency in interference limited scenarios.

The transmission schemes may be designed with a two-dimensional antenna configuration. The transmission schemes may include transmit diversity, open-loop MIMO, closed-loop MIMO, a single-user MIMO scheme, and/or a multi-user MIMO scheme.

Various types of transmit diversity schemes may be implemented for two-dimensional antenna configuration, such as random beamforming base, for example. A transmit diversity scheme may include two-dimensional open-loop beamforming. The open-loop beamforming scheme may be defined based on a multi-component precoder structure, such as $V_c = V_h \otimes V_v$ and $V_c = (w^h \otimes V_h^c) \otimes (w^v \otimes V_v^c)$ for example. Various types of open-loop beamforming may be used for a multi-component precoder structure. For example, a random precoder and/or a phase-shift diversity based precoder may be implemented.

Random precoding may be used with multiple component precoders. The horizontal component precoder and/or vertical component precoder may be randomly selected per resource unit. The composite codebook $V_c$ may be represented as $V_c(i_h, i_v) = V_h(i_h) \otimes V_v(i_v)$ where the horizontal index $i_h$ and the vertical index $i_v$ may denote a precoding index in a horizontal component codebook and a vertical component codebook, respectively. The precoding indexes for component precoders may be selected and/or determined according to a resource unit. The resource unit may be an RE, a group of REs, a PRB, a PRB-pair, a subband, and/or a subframe.

The precoding matrix indexes may be predefined as a function of resource unit index, subframe index, C-RNTI, and/or physical cell-ID. A component codebook may be associated with random precoding matrix. A component codebook may be configured via higher layers, a latest precoding matrix index reported by a WTRU, and/or a predefined fixed matrix. When multiple component codebooks are implemented, one component codebook may be associated with a random precoding matrix and another component codebook may be configured via higher layers, a latest precoding matrix index reported by the WTRU, and/or a predefined fixed matrix. Resource unit size may be different according to the component codebook. For example, the horizontal index $i_h$ may be changed per resource block within a subframe, while the vertical index $i_v$ may be the same over system bandwidth and/or changed according to the subframe. The horizontal index $i_h$ may be defined as a function of the PRB index and/or the subframe index. The vertical index $i_v$ may be may be defined as a function of the PRB index and/or the subframe index.

The random precoding may be used for the horizontal index $i_h$ and/or the vertical index $i_v$. The index may be changed according to the resource unit to randomize the precoding vector/matrix. A precoder cycling may be used as a random precoding. The precoder cycling may be defined as $i_h = k \mod N_{total}^h$, where k may denote resource unit index and $N_{total}^h$ may denote the codebook size for a horizontal component codebook. The precoder cycling may be defined as $i_v = k \mod N_{total}^v$ where $N_{total}^v$ may denote the codebook size for a vertical component codebook. For the component codebooks, a subset of each component codebook may be used for precoder cycling to reduce WTRU receiver complexity. A subset of each component codebook may be predefined and/or configured via higher layer signaling.

The random precoding may be used partially so that the horizontal index $i_h$ and/or the vertical index $i_v$ may be randomly selected according to the resource unit. The resource unit may be an RE, a group of REs, a PRB, a PRB-pair, a subband, and/or a subframe. A precoder cycling may be used as a random precoding. The precoder cycling may be defined as $i_h = k \mod N_{total}^k$, where k may denote a resource unit index and $N_{total}^h$ may denote the codebook size for a horizontal component codebook. The precoder cycling may be defined as $i_v = k \mod N_{total}^v$, where $N_{total}^v$ may denote the codebook size for vertical component codebook. A random matrix index within the component codebook may be selected for random precoding by using a random sequence generator, such as a gold sequence.

If the horizontal precoding index $i_h$ or the vertical precoding index $i_v$ is selected for random precoding, the precoding index (e.g., $i_h$ or $i_v$) not selected for random precoding may include various properties. For example, the precoding index (e.g., $i_h$ or $i_v$) not selected for random precoding may be a predefined fixed precoder index. The random precoding index and the predefined precoding index may be used if a base station uses an antenna dimension as a sector (e.g., vertical or horizontal sectorization). The precoding index (e.g., $i_h$ or $i_v$) not selected for random precoding may be a higher-layer configured precoder index, where higher-layer signaling for higher-layer configuration may include, but is not limited to, RRC and/or MAC CE. A precoding index may be selected for random precoding and another precoding index may be a higher-layer precoding index if an antenna dimension is used for long-term beamforming. The precoding index not selected for random precoding may be the latest reported precoder index. A component codebook may be used as closed-loop and/or another component codebook may be used as open-loop. This may be beneficial when an antenna dimension between vertical and horizontal may suffer from high Doppler frequency due to a WTRU's moving direction. The WTRU may select a component precoder for random precoding. The WTRU may report which component precoder is selected. The selected component precoder may be reported together with CQI and/or RI.

Random precoding may be used with four sub-component procoders. The sub-component precoders may include co-phasing sub-component procoders. The sub-component precoders and/or co-phasing sub-component precoders may be randomly selected per resource unit. The precoders may be randomly selected as shown in Equation 16:

$$V_c(m_h, m_v, n_h, n_v) = (w^h(m_h) \otimes V_h^c(n_h)) \otimes (w^v(m_v) \otimes V_v^c(n_v)),$$ Equation 16 where $n_h$ may be a horizontal sub-component precoder, $n_v$ may be a vertical sub-component precoder, $m_h$ may be a horizontal co-phasing precoder, and/or $m_v$ may be a vertical co-phasing precoder. The precoding matrix indexes for co-phasing and/or sub-component precoders may be selected according to the resource unit. The precoding matrix indexes may be predefined as a function of resource unit index, subframe index, C-RNTI, and/or physical cell-ID. The horizontal sub-component precoder $n_h$ and/or the vertical sub-component precoder $n_v$ may be used for random precoding. The horizontal co-phasing precoder $m_h$ and/or the vertical co-phasing precoder $m_v$ may be selected by at least one of a predefined fixed matrix, a latest precoding matrix index reported by a WTRU, and/or a precoding matrix index configured by higher layer signaling.

Resource unit size may be different between component precoder and co-phasing precoder. The horizontal sub-component precoder $n_h$ and/or the vertical sub-component precoder $n_v$ may be changed per resource block within a subframe. The horizontal co-phasing precoder $m_h$ and/or the vertical co-phasing precoder $m_v$ may be the same, or similar, over system bandwidth. The horizontal co-phasing precoder $m_h$ and/or the vertical co-phasing precoder $m_v$ may be changed according to the subframe. The horizontal sub-component precoder $n_h$ and/or the vertical sub-component precoder $n_v$ may be defined as a function of the PRB index. The horizontal co-phasing precoder $m_h$ and/or the vertical co-phasing precoder $m_v$ may be defined as a function of the subframe index. The horizontal co-phasing precoder $m_h$ and/or the vertical co-phasing precoder $m_v$ may be defined as a function of the PRB index. The horizontal sub-component precoder $n_h$ and/or the vertical sub-component precoder $n_v$ may be as a function of the subframe index. The horizontal sub-component precoder $n_h$ and/or the vertical sub-component precoder $n_v$ may be defined as a function of the PRB index and the subframe index.

The resource unit size may be differentiated according to component precoders and/or co-phasing precoders. The horizontal sub-component precoder $n_h$ may be defined as a function of a PRB index and/or the vertical sub-component precoder $n_v$ may be defined as a function of a subframe index. The vertical sub-component precoder $n_v$ may be defined as a function of a PRB index and/or the horizontal sub-component precoder $n_h$ may be defined as a function of a subframe index. The horizontal sub-component precoder $n_h$ may be defined as a function of the PRB index and/or the subframe index. The vertical sub-component precoder $n_v$ may be defined as a function of the subframe index. The horizontal co-phasing precoder $m_h$ may be defined as a function of the PRB index and/or the vertical co-phasing precoder $m_v$ may be defined as a function of a subframe index. The vertical co-phasing precoder $m_v$ may be defined as a function of the PRB index and/or the horizontal co-phasing precoder $m_h$ may be defined as a function of a subframe index. The horizontal co-phasing precoder $m_h$ may be defined as a function of the PRB index and/or the subframe index. The vertical co-phasing precoder $m_v$ may be defined as a function of the subframe index.

Random precoding may be used in combination with antenna partitioning matrices. A set of antenna partitioning matrices may be randomly selected according to a resource unit. The set of antenna partitioning matrices may be randomly selected according to the resource unit so that antenna ports used for random precoding may be changed per resource unit. If an antenna partitioning matrix is used, the number of antenna ports may be reduced from the total number of antenna ports $N_t$ to a reduced number of antenna ports $N_L$. Subgroups of the antenna partitioning matrices may be defined according to the size of the reduced number of antenna ports $N_L$. If multiple antenna partitioning subgroups are defined, the antenna partitioning matrices may be randomly selected from the antenna partitioning subgroups. The antenna subgroup for random selection may be configured by the base station, such that a WTRU may measure CQI and/or RI based on the index within the configured subgroup. The antenna partitioning matrix may be predefined per resource unit as a function of a resource unit index, a subframe index, a C-RNTI, and/or a physical cell-ID. A WTRU may measure CQI and/or RI based on the reduced number of antenna ports $N_L$ in a given resource. The reduced number of antenna ports $N_L$ may be the same within a subframe. A WTRU may assume that the subgroup $N_L$ may be the same as long as another subgroup may not be configured by the base station. The random precoding may be used for the reduced number of antenna ports $N_L$.

TABLE 15 shows an example of a sub-grouping of antenna partitioning matrices according to the reduced number of antenna ports $N_L$.

TABLE 15

Example of Sub-grouping of Antenna Partitioning Matrices with 4 × 4 Two-Dimensional Configuration

| Subgroup-1 ($N_L$ = 2) | | | |
|---|---|---|---|
| Index-0 | Index-1 | Index-2 | Index-3 |
| $\begin{bmatrix} 1 & 0 & 1 & 0 \\ 0 & 0 & 0 & 0 \\ 0 & 0 & 0 & 0 \\ 0 & 0 & 0 & 0 \end{bmatrix}$ | $\begin{bmatrix} 1 & 0 & 0 & 0 \\ 0 & 0 & 0 & 0 \\ 1 & 0 & 0 & 0 \\ 0 & 0 & 0 & 0 \end{bmatrix}$ | $\begin{bmatrix} 0 & 1 & 0 & 1 \\ 0 & 0 & 0 & 0 \\ 0 & 0 & 0 & 0 \\ 0 & 0 & 0 & 0 \end{bmatrix}$ | $\begin{bmatrix} 0 & 0 & 0 & 0 \\ 1 & 0 & 0 & 0 \\ 0 & 0 & 0 & 0 \\ 1 & 0 & 0 & 0 \end{bmatrix}$ |

| Subgroup-2 ($N_L$ = 4) | | | |
|---|---|---|---|
| Index-0 | Index-1 | Index-2 | Index-3 |
| $\begin{bmatrix} 1 & 0 & 1 & 0 \\ 0 & 0 & 0 & 0 \\ 1 & 0 & 1 & 0 \\ 0 & 0 & 0 & 0 \end{bmatrix}$ | $\begin{bmatrix} 0 & 1 & 0 & 1 \\ 0 & 0 & 0 & 0 \\ 0 & 1 & 0 & 1 \\ 0 & 0 & 0 & 0 \end{bmatrix}$ | $\begin{bmatrix} 0 & 0 & 0 & 0 \\ 1 & 0 & 1 & 0 \\ 0 & 0 & 0 & 0 \\ 1 & 0 & 1 & 0 \end{bmatrix}$ | $\begin{bmatrix} 0 & 0 & 0 & 0 \\ 0 & 1 & 0 & 1 \\ 0 & 0 & 0 & 0 \\ 0 & 1 & 0 & 1 \end{bmatrix}$ |

| Subgroup-3 ($N_L$ = 8) | | | |
|---|---|---|---|
| Index-0 | Index-1 | Index-2 | Index-3 |
| $\begin{bmatrix} 1 & 1 & 1 & 1 \\ 0 & 0 & 0 & 0 \\ 1 & 1 & 1 & 1 \\ 0 & 0 & 0 & 0 \end{bmatrix}$ | $\begin{bmatrix} 1 & 0 & 1 & 0 \\ 1 & 0 & 1 & 0 \\ 1 & 0 & 1 & 0 \\ 1 & 0 & 1 & 0 \end{bmatrix}$ | $\begin{bmatrix} 1 & 0 & 1 & 0 \\ 0 & 1 & 0 & 1 \\ 1 & 0 & 1 & 0 \\ 0 & 1 & 0 & 1 \end{bmatrix}$ | $\begin{bmatrix} 0 & 1 & 0 & 1 \\ 1 & 0 & 1 & 0 \\ 0 & 1 & 0 & 1 \\ 1 & 0 & 1 & 0 \end{bmatrix}$ |

| Subgroup-4 ($N_L$ = 16) | | | |
|---|---|---|---|
| Index-0 | Index-1 | Index-2 | Index-3 |
| $\begin{bmatrix} 1 & 1 & 1 & 1 \\ 1 & 1 & 1 & 1 \\ 1 & 1 & 1 & 1 \\ 1 & 1 & 1 & 1 \end{bmatrix}$ | — | — | — |

As shown in subgroup-1 to subgroup-3 in TABLE 15, a subgroup may include reduced number of antenna ports $N_L$ that is equal to two, four, or eight, respectively. Subgroup-4 in TABLE 15 shows a full antenna partitioning matrix that is equal to 16. The reduced number of antenna ports $N_L$ may be in the same row or column. The reduced number of antenna ports $N_L$ may be randomly selected throughout the matrix.

A phase shift diversity (PSD)-based precoder may be implemented to increase frequency diversity gain by exploiting delay diversity gain in the frequency domain. A PSD scheme may be defined with multi-component precoder structure, such as $V_c = V_h \otimes V_v$. The two-dimensional phase shift diversity scheme may be expressed as shown in Equation 17:

$$V_c(k) = D_h(k) \cdot V_h(i_h) \otimes D_v(k) \cdot V_v(i_v), \quad \text{Equation 17}$$

where the $D_v(k)$ and $D_h(k)$ may denote $N_v \times N_v$ and $N_h \times N_h$ phase diagonal matrices, respectively. If a 4×4 (e.g., $N_h \times N_v$) two-dimensional antenna configuration is used, the two-dimensional phase-shift diversity scheme may be expressed as shown in Equation 18:

$$V_c(k) = \begin{pmatrix} 1 & 0 & 0 & 0 \\ 0 & e^{j\theta k} & 0 & 0 \\ 0 & 0 & e^{j2\theta k} & 0 \\ 0 & 0 & 0 & e^{j3\theta k} \end{pmatrix}.$$ Equation 18

$$V_h(i_h) \otimes \begin{pmatrix} 1 & 0 & 0 & 0 \\ 0 & e^{j\phi k} & 0 & 0 \\ 0 & 0 & e^{j2\theta\phi k} & 0 \\ 0 & 0 & 0 & e^{j3\theta\phi k} \end{pmatrix} \cdot V_v(i_v),$$

where $\theta$ and/or $\phi$ may be defined as $-2\pi/N_{\mathit{fft}} \cdot \tau$. The resource unit index k may be associated with an RE, a group of REs, a PRB, a PRB-pair, a subband, and/or a subframe. The component precoder may be selected using the horizontal index $i_h$ and/or the vertical index $i_v$. The horizontal index $i_h$ and/or the vertical index $i_v$ may be selected as a function of the resource unit index k. The horizontal index $i_h$ and/or the vertical index $i_v$ may be reported from a WTRU and/or configured by a base station. When the $\theta$ and $\phi$ are defined as $-2\pi/N_{\mathit{fft}} \cdot \tau$, the delay value $\tau$ may be independently configured for $\theta$ and $\phi$. The delay value $\tau$ may include '0' and/or may be configurable. $\tau = N_{\mathit{fft}}/2$ may be used as a delay CDD parameter.

If multiple types of CSI-RS are configured, such as {V-CSI-RS and H-CSI-RS} and/or {F-CSI-RS and P-CSI-RS}, a WTRU may report MU-MIMO related information to minimize co-channel interference. A WTRU may report MU-CQI, which may be estimated at a WTRU receiver if the same time/frequency resources may be shared with another WTRU in a spatial domain. If a WTRU reports a preferred precoding vector/matrix index for the composite codebook $V_c$ and its associated CQI, the WTRU may report a PMI for MU-MIMO support. The WTRU may report a PMI as a companion precoding vector/matrix $V_{Pref}$ and/or its associated MU-CQI, which may satisfy a predefined rule to select the companion precoding vector/matrix for MU-MIMO support at the WTRU. For example, the predefined rule may include a preferred companion precoding vector/matrix which may provide a minimum co-channel interference and/or a largest CQI value among the candidates. The predefined rule may include a less preferred or least preferred companion precoding vector/matrix $V_{L\text{-}Pref}$ and/or its associated MU-CQI, which may provide a maximum co-channel interference or smallest CQI value among the candidates. The $V_{Pref}$ may provide the smallest co-channel interference among the precoding matrix candidates. An MU-CQI may be calculated based on the composite codebook $V_c$ and/or the preferred companion precoding vector/matrix $V_{Pref}$. For MU-CQI calculation, the composite codebook $V_c$ and/or the preferred companion precoding vector/matrix $V_{Pref}$ may be considered as a rank-1 precoder. The less preferred or least preferred companion precoding vector/matrix $V_{L\text{-}Pref}$ may provide the largest co-channel interference among the possible precoding matrix candidates. An MU-CQI may be calculated based on the composite codebook $V_c$ and/or the less preferred or least preferred companion precoding vector/matrix $V_{L\text{-}Pref}$.

SU-MIMO based feedback, for a rank higher than one, may be used for MU-MIMO. The composite codebook $V_c$ and its associated CQI may be calculated based on rank-R, where R may be a positive integer number larger than one for example. The composite codebook $V_c$ and its associated CQI may be reported on top of rank-adaptive SU-MIMO based feedback, where rank-R may be larger than '1'. The rank-R may be predefined and/or configured via higher layers, such as the RRC and/or MAC CE for example. The rank-R based MU-MIMO feedback may be reported if the selected rank of rank-adaptive SU-MIMO based feedback is equal to '1'. The rank-R based MU-MIMO feedback may be reported in a different time instance with rank-adaptive SU-MIMO based feedback.

MU-MIMO may be implemented with a multi-component codebook. A WTRU may report MU-MIMO related feedback information per component codebook if a multi-component codebook is used, such as $V_c = V_h \otimes V_v$ and/or $V_c = (w^i \otimes V_h^c) \otimes (w^j \otimes V_v^c)$. The MU-MIMO related feedback may include preferred companion precoding vectors/matrices $V_{Pref}$ for horizontal component precoder $V_h$ and/or vertical component precoder $V_v$. The preferred companion precoding vector/matrix for horizontal and vertical component precoders may be expressed as $V_{Pref}^h$ and $V_{Pref}^v$, respectively. The MU-MIMO related feedback may include a less preferred or least preferred companion precoding vector/matrix $V_{L\text{-}Pref}$ for a horizontal component precoder $V_h$ and/or vertical component precoder $V_v$. The MU-MIMO related feedback may be the less preferred or least preferred companion precoding vector/matrix $V_{L\text{-}Pref}$ for horizontal and vertical component precoders that may be may be expressed as $V_{L\text{-}Pref}^h$ and $V_{L\text{-}Pref}^v$ respectively. The MU-MIMO related feedback may be rank-R based MU-MIMO feedback for each component precoder.

The MU-MIMO transmission may be performed in a single antenna dimension. For example, the MU-MIMO transmission may be performed in a single antenna dimension when the co-channel interference is relatively low compared to MU-MIMO in a multi-antenna dimension. A WTRU may report MU-MIMO related feedback information in a multi-antenna dimension to avoid co-channel interference. A WTRU may report MU-MIMO related feedback information associated with a horizontal component precoder and/or a vertical component precoder. The associated component precoder between horizontal and vertical component precoders for MU-MIMO related feedback may be configured via higher layer signaling. A WTRU may report the MU-MIMO related feedback for the configured component precoder. The associated component precoder between horizontal and vertical component precoders for MU-MIMO related feedback may be selected by a WTRU so that the WTRU may report a preferred component precoder for MU-MIMO transmission. The associated component precoder between horizontal and vertical component precoders for MU-MIMO related feedback may be predefined with one of the component precoders. For example, a WTRU may determine that MU-MIMO is performed in horizontal antenna dimension so that the WTRU may report MU-MIMO related feedback for the horizontal component precoder. The MU-MIMO related feedback may be tied with a CSI-RS. If multiple types of CSI-RS are configured, a WTRU may report MU-MIMO related feedback based on at least one type of CSI-RS. A WTRU may report MU-MIMO related feedback for V-CSI-RS and/or H-CSI-RS. H-CSI-RS may be used for MU-MIMO related CSI reporting. A WTRU may report MU-MIMO related feedback for P-CSI-RS.

Antenna partitioning may be used for MU-MIMO transmission. The $N_v \times N_h$ antenna ports may be partitioned into J subsets. A WTRU may be configured with at least one of the subsets. The WTRU may report MU-MIMO related feedback for the subsets, except for the configured subsets. For example, if 4×4 ($N_v \times N_h$) antenna configuration is used and four subsets are defined for MU-MIMO, the antenna subsets may be defined as shown in TABLE 16.

TABLE 16

Antenna Subsets for MU-MIMO (J = 4) in 4 × 4 Antennas Configuration

| Subset-0 | Subset-1 | Subset-2 | Subset-3 |
|---|---|---|---|
| $\begin{bmatrix} 1 & 0 & 1 & 0 \\ 0 & 0 & 0 & 0 \\ 1 & 0 & 1 & 0 \\ 0 & 0 & 0 & 0 \end{bmatrix}$ | $\begin{bmatrix} 0 & 1 & 0 & 1 \\ 0 & 0 & 0 & 0 \\ 0 & 1 & 0 & 1 \\ 0 & 0 & 0 & 0 \end{bmatrix}$ | $\begin{bmatrix} 0 & 0 & 0 & 0 \\ 1 & 0 & 1 & 0 \\ 0 & 0 & 0 & 0 \\ 1 & 0 & 1 & 0 \end{bmatrix}$ | $\begin{bmatrix} 0 & 0 & 0 & 0 \\ 0 & 1 & 0 & 1 \\ 0 & 0 & 0 & 0 \\ 0 & 1 & 0 & 1 \end{bmatrix}$ |

A WTRU may report MU-MIMO related feedback for the subsets not configured for the WTRU. If subset-0 may be configured for a WTRU, the WTRU may report MU-MIMO related feedback for the rest of subsets {subset-1, subset-2, subset-3}. If a WTRU may report MU-MIMO related feedback for multiple subsets, a preferred and/or a less preferred or least preferred subset may be selected by the WTRU. The preferred antenna subset may be selected if a subset provides minimum co-channel interference. The less preferred or least preferred antenna subset may be selected if a subset provides maximum co-channel interference. A WTRU may measure the subsets not configured for the WTRU as interference measurement resources for its CSI estimation.

The DM-RS scrambling sequence may be different according to the antenna subset. The DM-RS scrambling sequence may be different so that quasi-orthogonal reference signal may be supported according the antenna partitioning/subsets. The scrambling sequence may be based on a pseudo-random sequence. The generator of this pseudo-random sequence may be initialized with a value $c_{init}$ at the beginning of each subframe, such that a DM-RS generated using different values of $c_{init}$ may have low cross-correlation. The value of $c_{init}$ may be a function of the slot number ($n_s$) and of different parameters, as shown in Equation 19:

$$c_{init} = (\lfloor n_s/2 \rfloor + 1) \cdot (2N_{ID}^X + 1) \cdot 2^{16} + n_{SCID}, \quad \text{Equation 19}$$

where the $n_s$ may be the slot number for a subframe and may range from zero to 19. The value of (ns/2+1) may be a subframe number. $n_{SCID}$ may be tied with antenna partitioning matrix index or subset index as shown in TABLE 17 and the $N_{ID}^X$ may be physical cell-ID or configured/broadcasted value from the serving base station.

TABLE 17

$n_{SCID}$ According to the Subset

| Subset-0 | Subset-1 | Subset-2 | Subset-3 |
|---|---|---|---|
| $n_{SCID} = 0$ | $n_{SCID} = 1$ | $n_{SCID} = 2$ | $n_{SCID} = 3$ |

While the embodiments herein may be described in connection with exemplary embodiments, they may not be limited thereto. For example, while examples may be provided herein for a two-dimensional and/or four-dimensional antenna configuration, other types of multi-dimensional antenna configurations may be implemented. Although features and elements are described above in particular combinations, each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for enabling feedback from a wireless transmit receive unit (WTRU), the method comprising:
    when the WTRU is configured with a full first channel state information (CSI) reference signal (CSI-RS) and without a second CSI-RS that is associated with less antenna ports than the first CSI-RS, reporting CSI feedback comprising a precoding matrix index (PMI), a channel quality indicator (CQI), and a rank indicator (RI) to a base station using the first CSI-RS;
    when the WTRU is configured with the first CSI-RS and the second CSI-RS that is associated with less antenna ports than the first CSI-RS, reporting the CSI feedback comprising the PMI, the CQI, and the RI to the base station using the second CSI-RS.

2. The method of claim 1, further comprising reporting a precoding matrix using the first CSI-RS when the WTRU is configured with the first CSI-RS and the second CSI-RS.

3. The method of claim 1, wherein the first CSI-RS is a full CSI-RS with a cell-specific configuration and the second CSI-RS is a partial CSI-RS with a WTRU-specific configuration.

4. The method of claim 1, further comprising determining the PMI for each component codebook of a plurality of component codebooks when the WTRU is configured with the first CSI-RS and the second CSI-RS that is associated with less antenna ports than the first CSI-RS.

5. The method of claim 4, wherein the CSI feedback for each component codebook of the plurality of component codebooks is indicated by a composite codebook calculated as a function of the plurality of component codebooks.

6. The method of claim 4, further comprising:
    generating a composite precoding matrix based on the PMIs;
    determining the CQI based on the composite precoding matrix; and
    reporting the PMIs for each component codebook of the plurality of component codebooks and the CQI to the base station.

7. The method of claim 4, wherein the CSI feedback comprises the PMIs for each component codebook of the plurality of component codebooks, and the PMIs being sent separately to the base station.

8. The method of claim 1, wherein the first CSI-RS comprises at least one of a cell-specific CSI-RS, a full dimensional CSI-RS, a larger CSI-RS than the second CSI-RS, or a long-term CSI-RS.

9. The method of claim 1, wherein the second CSI-RS comprises at least one of a WTRU-specific CSI-RS, a partial dimensional CSI-RS, a smaller CSI-RS than the first CSI-RS, or a short-term CSI-RS.

10. A wireless transmit/receive unit (WTRU) for reporting feedback, the WTRU comprising:

a transmitter comprising a plurality of antennas; and a processor in communication with the transmitter and configured to:

when the processor is configured with a first channel state information (CSI) reference signal (CSI-RS) and without a second CSI-RS that is associated with less antenna ports than the first CSI-RS, report CSI feedback comprising a precoding matrix index (PMI), a channel quality indicator (CQI), and a rank indicator (RI) to a base station using the first CSI-RS;

when the processor is configured with the first CSI-RS and the second CSI-RS that is associated with less antenna ports than the first CSI-RS, report the CSI feedback comprising the PMI, the CQI, and the RI to the base station using the second CSI-RS.

11. The WTRU of claim 10, wherein the processor is further configured to report a precoding matrix using the first CSI-RS when the WTRU is configured with the first CSI-RS and the second CSI-RS.

12. The WTRU of claim 10, wherein the first CSI-RS is a full CSI-RS with a cell-specific configuration and the second CSI-RS is a partial CSI-RS with a WTRU-specific configuration.

13. The WTRU of claim 10, wherein the processor is further configured to determine the PMI for each component codebook of a plurality of component codebooks when the WTRU is configured with the first CSI-RS and the second CSI-RS that is associated with less antenna ports than the first CSI-RS.

14. The WTRU of claim 13, wherein the CSI feedback for each component codebook of the plurality of component codebooks is indicated by a composite codebook calculated as a function of the plurality of component codebooks.

15. The WTRU of claim 13, wherein the processor is further configured to:

generate a composite precoding matrix based on the PMIs;

determine the CQI based on the composite precoding matrix; and cause the transmitter to report the PMIs for each component codebook of the plurality of component codebooks and the CQI to the base station.

16. The WTRU of claim 13, wherein the CSI feedback comprises the PMIs for each component codebook of the plurality of component codebooks, and wherein the PMIs are sent separately to the base station.

17. The WTRU of claim 10, wherein the first CSI-RS comprises at least one of a cell-specific CSI-RS, a full dimensional CSI-RS, a larger CSI-RS than the second CSI-RS, or a long-term CSI-RS.

18. The WTRU of claim 10, wherein the second CSI-RS comprises at least one of a WTRU-specific CSI-RS, a partial dimensional CSI-RS, a smaller CSI-RS than the first CSI-RS, or a short-term CSI-RS.

* * * * *

UNITED STATES PATENT AND TRADEMARK OFFICE
CERTIFICATE OF CORRECTION

PATENT NO. : 9,918,240 B2
APPLICATION NO. : 14/039669
DATED : March 13, 2018
INVENTOR(S) : Moon-il Lee et al.

Page 1 of 1

It is certified that error appears in the above-identified patent and that said Letters Patent is hereby corrected as shown below:

In the Claims

Column 54, Line 16, Claim 1:
Replace "enabling" with "reporting"

Signed and Sealed this
Twenty-third Day of October, 2018

Andrei Iancu
*Director of the United States Patent and Trademark Office*